(12) United States Patent
Wakazono

(10) Patent No.: US 8,179,609 B2
(45) Date of Patent: May 15, 2012

(54) ZOOM LENS AND IMAGE PICKUP APPARATUS INCLUDING THE SAME

(75) Inventor: Tsuyoshi Wakazono, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 12/906,344

(22) Filed: Oct. 18, 2010

(65) Prior Publication Data

US 2011/0090373 A1 Apr. 21, 2011

(30) Foreign Application Priority Data

Oct. 19, 2009 (JP) ................................ 2009-240325

(51) Int. Cl.
*G02B 15/17* (2006.01)
*G02B 15/14* (2006.01)
*H04N 5/262* (2006.01)

(52) U.S. Cl. ...... 359/684; 359/676; 359/683; 348/240.3

(58) Field of Classification Search .............. 348/240.3; 359/676, 683, 684, 685
See application file for complete search history.

(56) References Cited

U.S. PATENT DOCUMENTS

| 4,874,231 | A | 10/1989 | Aono |
| 5,808,809 | A | 9/1998 | Yahagi |
| 7,064,903 | B2 | 6/2006 | Yakita |
| 2005/0219712 | A1 | 10/2005 | Yakita |
| 2011/0037878 | A1* | 2/2011 | Wakazono et al. ........ 348/240.3 |
| 2011/0080651 | A1* | 4/2011 | Sakamoto ..................... 359/683 |

FOREIGN PATENT DOCUMENTS

| EP | 2312365 A1 * | 4/2011 |
| JP | 61-270716 A | 12/1986 |
| JP | 10-010440 A | 1/1998 |
| JP | 2005-292605 A | 10/2005 |

OTHER PUBLICATIONS

Feb. 14, 2011 European Search Report in European Patent Appln. No. 10188057.3.

* cited by examiner

*Primary Examiner* — David N Spector
(74) *Attorney, Agent, or Firm* — Fitzpatrick, Cella, Harper & Scinto

(57) ABSTRACT

Provided is a zoom lens including, in order from an object side to an image side: a positive first lens unit without moving for zooming; a negative second lens unit moving during zooming; a negative third lens unit moving during zooming; a positive fourth lens unit moving during zooming; and a positive fifth lens unit without moving for zooming, in which the second lens unit moves to the image side during zooming from a wide angle end to a telephoto end, while the third lens unit moves along a locus convex toward the object side, and, when fw denotes a focal length of the entire system at the wide angle end, Z a zoom ratio, and fz a focal length of the entire system at a zoom position where the third lens unit is in the position closest to the object side, the following conditional expression is satisfied: $fw \times Z^{0.07} < fz < fw \times Z^{0.5}$.

12 Claims, 40 Drawing Sheets

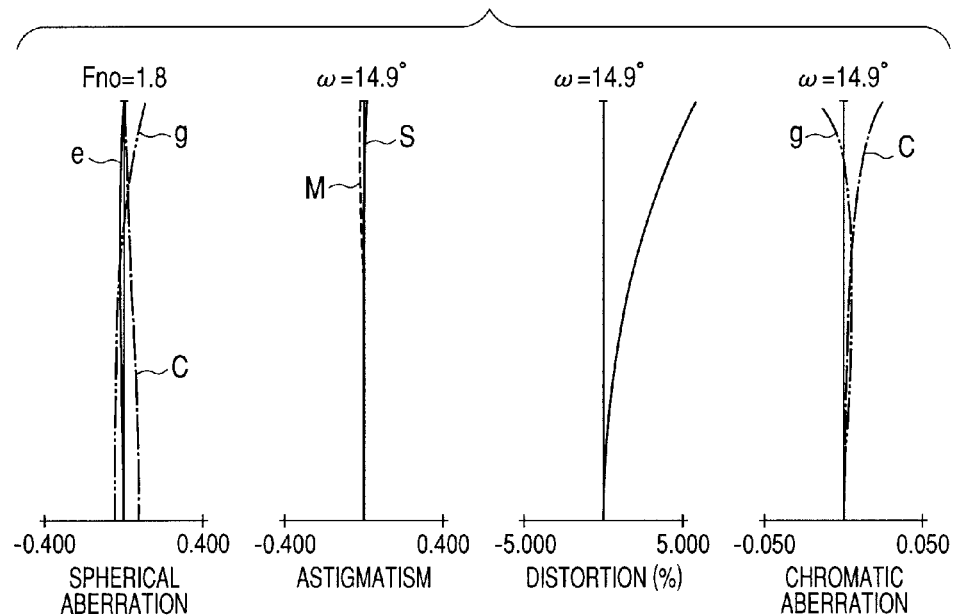
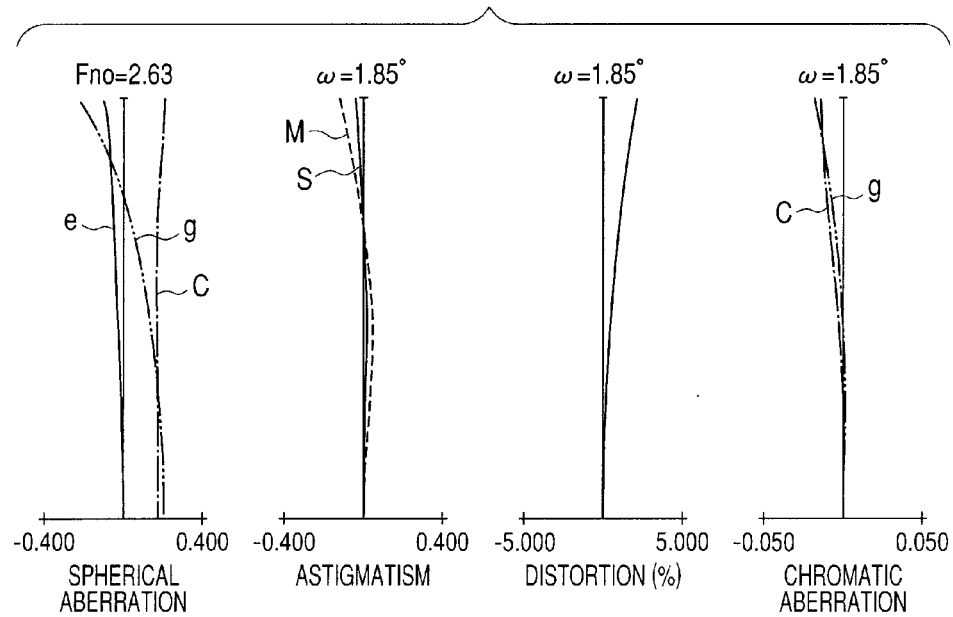

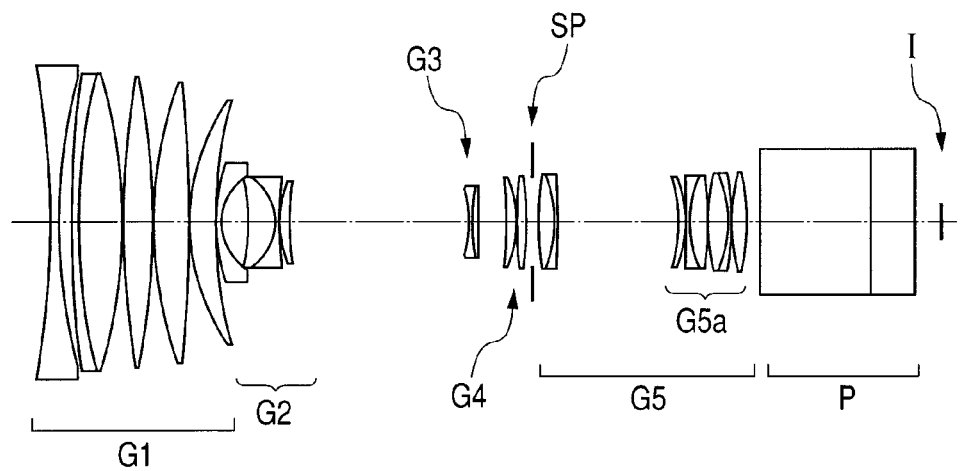
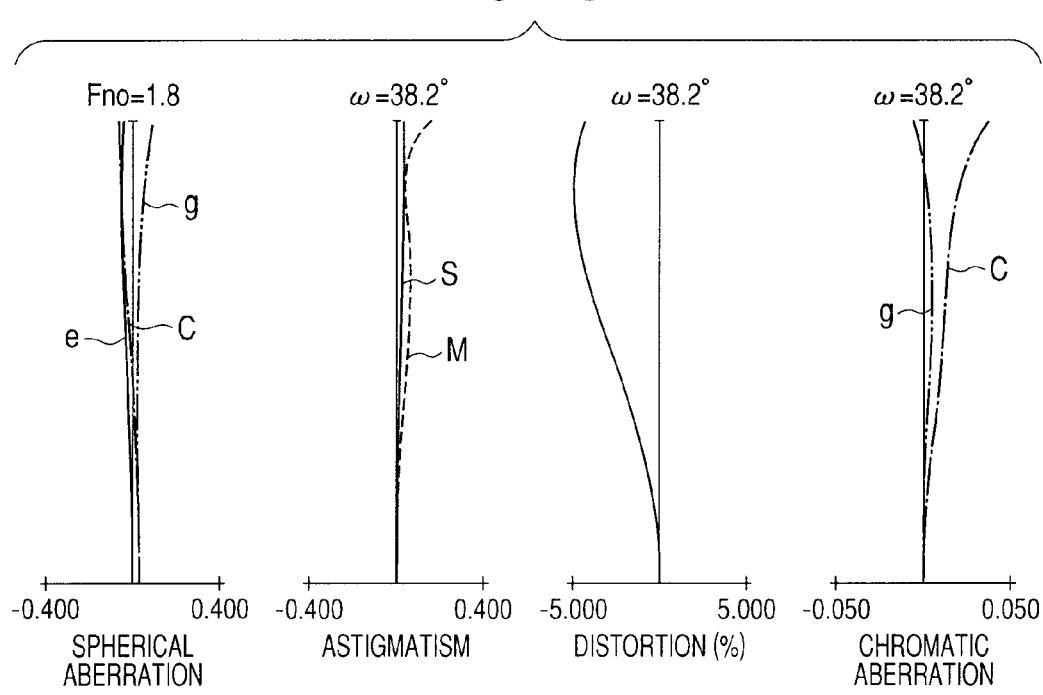

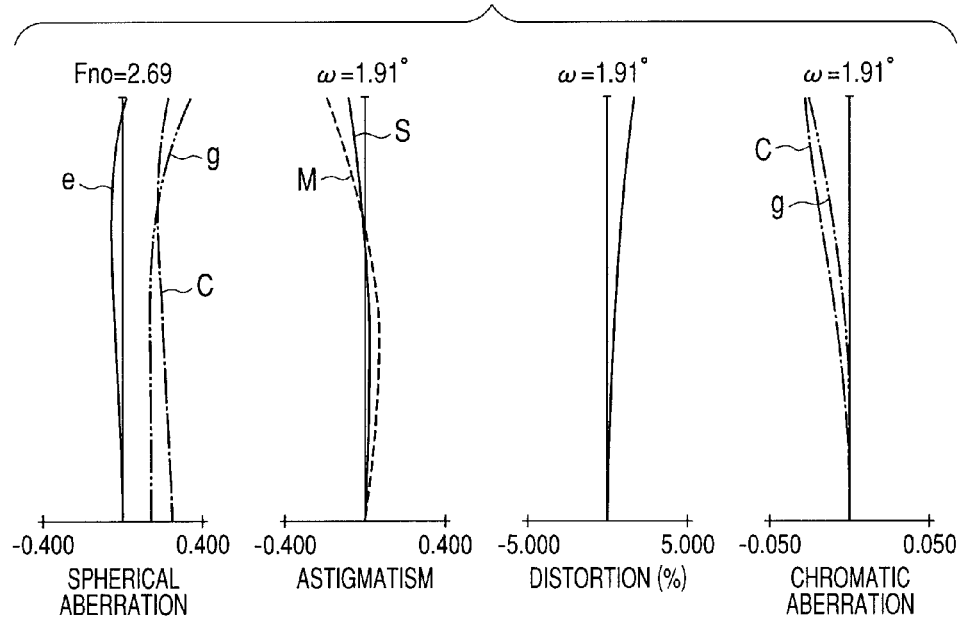
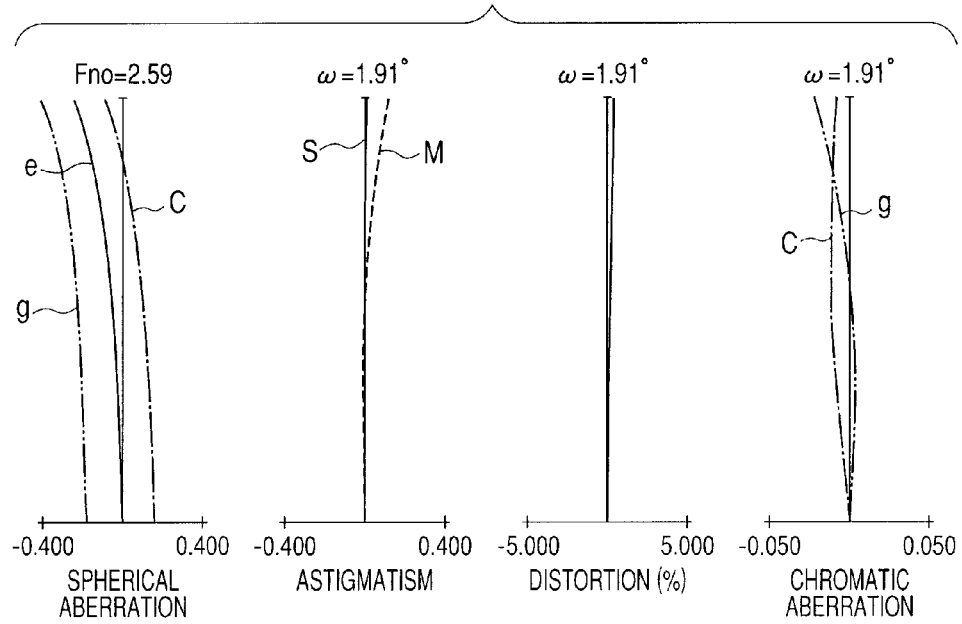

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, and more particularly, to a zoom lens having a wide angle, high magnification, small size, and light weight, which is suitable for a broadcasting television camera, a video camera, a digital still camera, a silver halide film camera, and the like.

2. Related Background Art

In recent years, a zoom lens having a wide field angle, a high zoom ratio, and high optical performance is required for an image pickup apparatus such as a television camera, a silver halide film camera, a digital camera, or a video camera. As a zoom lens having a wide field angle and a high zoom ratio, there is known a positive lead type five-unit zoom lens constituted of five lens units including a positive refractive power lens unit disposed closest to the object side. As this positive lead type zoom lens, there is known the five-unit zoom lens that is particularly suitable for a television camera, in which a zooming lens unit having functions as a variator and a compensator is constituted of three movable lens units, which move in different loci (see U.S. Pat. Nos. 4,874,231 and 5,808,809).

U.S. Pat. No. 4,874,231 proposes a zoom lens constituted of a first lens unit having a positive refractive power, a second lens unit having a negative refractive power for zooming, a third lens unit having a negative refractive power, a fourth lens unit having a positive refractive power, and a fifth lens unit having a positive refractive power for imaging. In addition, U.S. Pat. No. 5,808,809 proposes a five-unit zoom lens in which a second lens unit for zooming (variator) is constituted of a second A lens unit having a negative refractive power and a second B lens unit having a positive refractive power, which move in different loci during zooming.

Further, various types of so-called rear-focus zoom lenses in which focusing is performed by a lens unit other than the first lens unit are proposed. Japanese Patent Application Laid-Open No. 2005-292605, for example, proposes a lens device which includes a first lens unit which has a positive refractive power, a second lens unit for zooming which has a negative refractive power, a third lens unit for image plane compensation, and a fourth lens unit for imaging which has a positive refractive power, in which a focusing operation is performed by the fourth lens unit.

In order to obtain high optical performance while maintaining wide field angle and high zoom ratio in the five-unit zoom lens, it is important to set appropriately refractive powers of the second, third, and fourth lens units as zooming lens units, movement conditions during zooming, and the like.

In particular, it is important to set appropriately an imaging magnification and a moving locus of the second lens unit for zooming, and a moving locus of the third lens unit from the wide angle end to an intermediate zoom position.

If such structures are not set appropriately, it is difficult to realize a small size of the entire system and to obtain a zoom lens having a wide field angle, a high zoom ratio, and high optical performance over the entire zoom range.

Further, in a conventional four-unit zoom lens for a television camera, when even wider angle and higher magnification are to be achieved with reductions in size and weight, the refractive power of each unit needs to be increased, which results in a problem of larger variations of various aberrations.

In U.S. Pat. No. 4,874,231, when zooming is performed from the wide angle end to the telephoto end, two zooming units move in different loci to thereby compensate optical performance appropriately at the intermediate zoom position, but reductions in size and weight are not achieved. Further, in the conventional four-unit zoom lens for a television camera, when the reductions in size and weight are to be achieved for the first lens unit, it is necessary to reduce the number of lenses in the first lens unit or to increase the refractive power, which results in difficulty in suppressing variations of various aberrations due to focusing.

In Japanese Patent Application Laid-Open No. 2005-292605, the rear-focus method is employed to achieve the reductions in size and weight of the first lens unit. However, generally in the zoom lens for broadcasting, an optical system for converting a focal length is detachably disposed inside the fourth lens unit for imaging, which poses a problem that the movement amount accompanying focusing on the telephoto side at an object distance of proximity is increased when the optical system for converting a focal length is attached.

SUMMARY OF THE INVENTION

The present invention provides a zoom lens including, in order from an object side to an image side, a first lens unit having a positive refractive power which does not move for zooming, a second lens unit having a negative refractive power which moves during zooming, a third lens unit having a negative refractive power which moves during zooming, a fourth lens unit having a positive refractive power which moves during zooming, and a fifth lens unit having a positive refractive power which does not move for zooming, in which the second lens unit moves to the image side during zooming from a wide angle end to a telephoto end, while the third lens unit moves so as to take a locus convex toward the object side, and in which, when fw denotes a focal length of the entire system at the wide angle end, Z denotes a zoom ratio, and fz denotes a focal length of the entire system at a zoom position where the third lens unit is in the position closest to the object side, the following conditional expression is satisfied: $fw \times Z^{0.07} < fz < fw \times Z^{0.5}$.

The present invention also provides an image pickup apparatus, including: the above-mentioned zoom lens which forms a light image of a subject; and a solid-state image pickup element which receives the light image formed by the zoom lens.

Further features of the present invention will become apparent from the following description of exemplary embodiments with reference to the attached drawings.

BRIEF DESCRIPTION OF THE DRAWINGS

FIGS. 2A, 2B, and 2C are aberration diagrams at the wide angle end, at a focal length fz, and at a telephoto end, respectively, according to Embodiment 1.

FIG. 7 is a lens cross-sectional view at a wide angle end according to Embodiment 4.

FIGS. 8A, 8B, and 8C are aberration diagrams at the wide angle end, at a focal length fz, and at a telephoto end, respectively, according to Embodiment 4.

FIGS. 31A, 31B, 31C, 31D, and 31E are aberration diagrams at the wide angle end and an object distance of 3.0 m, at a focal length fz of 18.23 mm and the object distance of 3.0 m, at a telephoto end and the object distance of 3.0 m, at the telephoto end and an object distance of infinity, and at the telephoto end and an object distance of proximity (0.9 m), respectively, according to Embodiment 14.

DESCRIPTION OF THE EMBODIMENTS

Preferred embodiments of the present invention will now be described in detail in accordance with the accompanying drawings.

It is an object of the present invention to provide a zoom lens having a wide field angle, a high zoom ratio, and high optical performance over the entire zoom range, and an image pickup apparatus including the zoom lens.

Hereinafter, embodiments according to the present invention are described in detail with reference to the attached drawings. The zoom lens according to the present invention includes, in order from an object side to an image side, a first lens unit, a second lens unit, a third lens unit, a fourth lens unit, and a fifth lens unit. The first lens unit, the second lens unit, the third lens unit, the fourth lens unit, and the fifth lens unit have a positive refractive power, a negative refractive power, a negative refractive power, a positive refractive power, and a positive refractive power, respectively. Here, the first lens unit and the fifth lens unit do not move for zooming, while the second lens unit, the third lens unit, and the fourth lens unit move during zooming. In a zooming operation from the wide angle end (short focal length end) to the telephoto end (long focal length end), the second lens unit moves to the image side, while the third lens unit and the fourth lens unit move so as to take a locus convex toward the object side.

The zoom lens according to this embodiment is a zoom lens including only five lens units including the above-mentioned first to fifth lens units, but the present invention is not limited to this structure. For instance, a lens unit having a negative (or positive) refractive power which moves during zooming may be disposed between the second lens unit and the third lens unit. In addition, another lens unit may be disposed between the first lens unit and the second lens unit, between the third lens unit and the fourth lens unit, or between the fourth lens unit and the fifth lens unit. However, in the zoom lens according to the present invention, the lens unit disposed closest to the object side is the first lens unit, the lens unit disposed closest to the image side is the fifth lens unit, and it is desired that the second lens unit of this embodiment is adjacent to the first lens unit.

Figure 1:
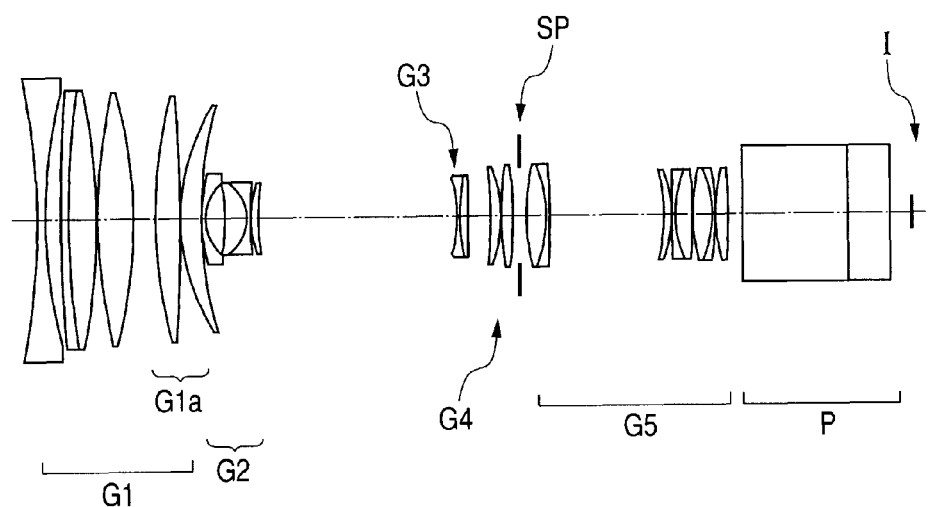
FIG. 1 is a lens cross-sectional view at a wide angle end according to Embodiment 1.
Figure 2A:
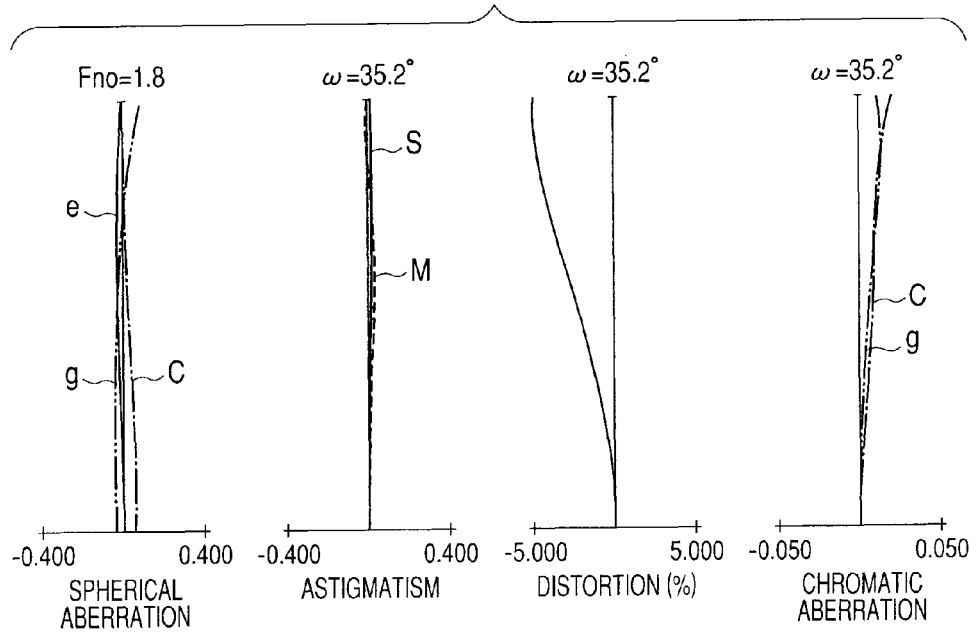
Figure 3:
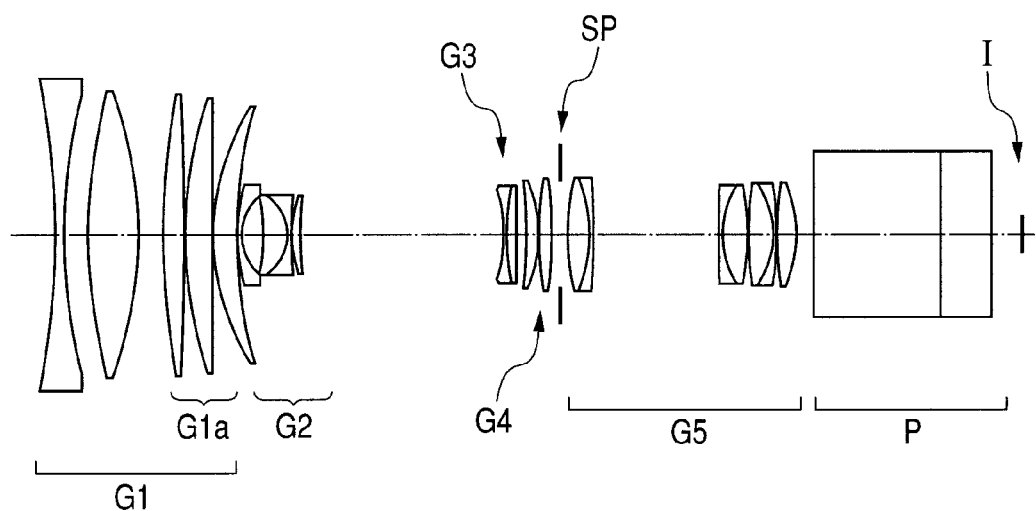
FIG. 3 is a lens cross-sectional view at a wide angle end according to Embodiment 2.
Figure 4A:
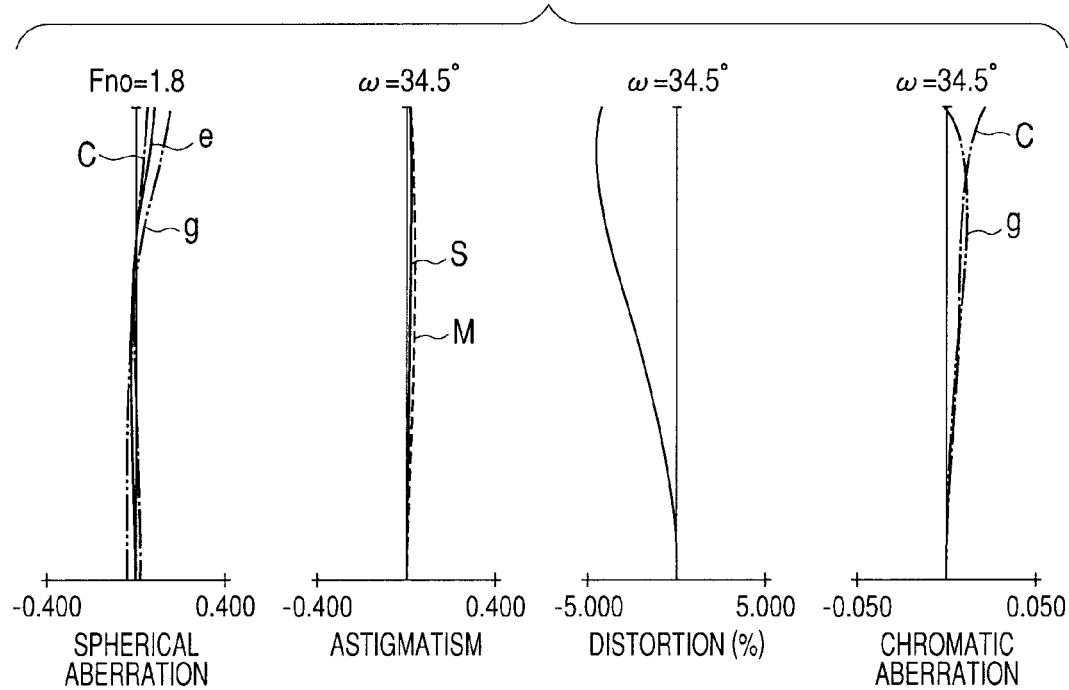
FIGS. 4A, 4B, and 4C are aberration diagrams at the wide angle end, at a focal length fz, and at a telephoto end, respectively, according to Embodiment 2.
Figure 4B:
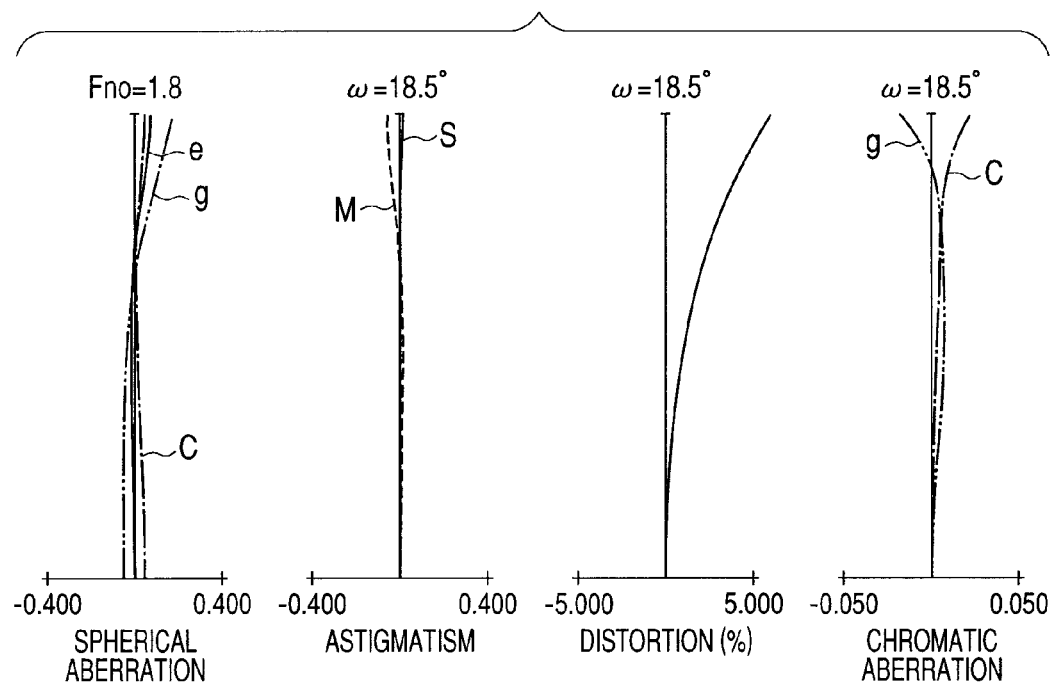
Figure 4C:
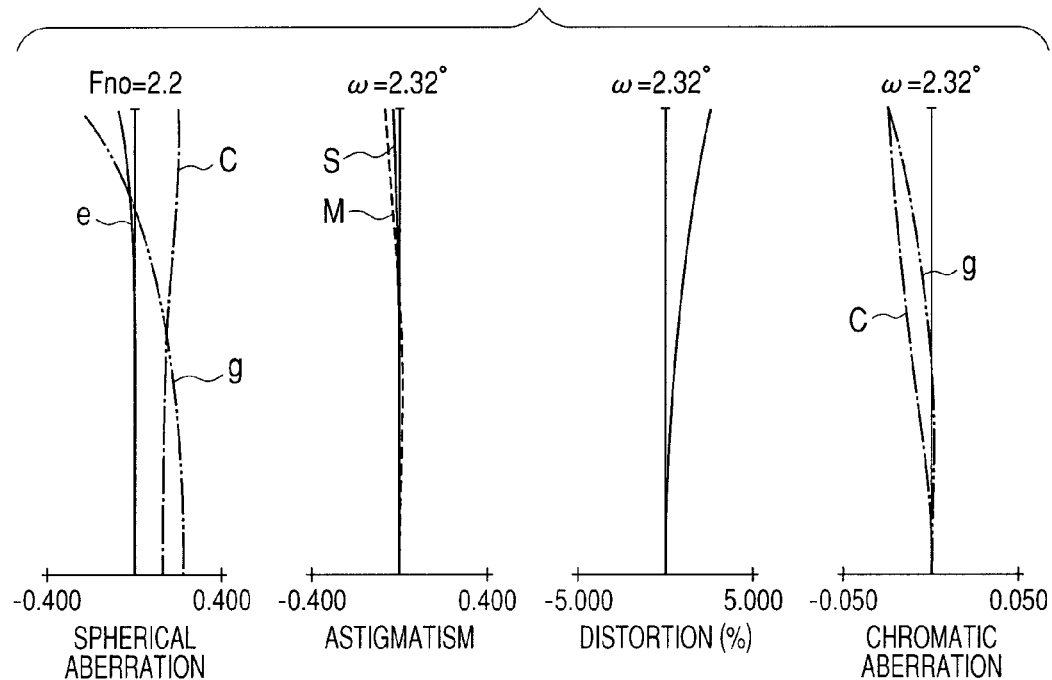

FIG. 1 is a cross-sectional view of the zoom lens according to Embodiment 1 (Numerical Embodiment 1) of the present invention, in focus on an infinite distance object at the wide angle end. FIGS. 2A, 2B, and 2C are vertical aberration diagrams according to Numerical Embodiment 1 in focus on an infinite distance object at the wide angle end, at the focal length of 20.67 mm, and at the telephoto end, respectively. Numerical Embodiment 1 is a zoom lens having an imaging field angle of 35.19 degrees (focal length of 7.8 mm) at the wide angle end and a zoom ratio of 21.88. However, a value of the focal length and a value of an object distance are values in numerical embodiments described later expressed in mm. The object distance is a distance from the image plane. Those apply equally in the following embodiments. FIG. 3 is a cross-sectional view of the zoom lens according to Embodiment 2 (Numerical Embodiment 2) of the present invention, in focus on an infinite distance object at the wide angle end. FIGS. 4A, 4B, and 4C are vertical aberration diagrams according to Numerical Embodiment 2 in focus on an infinite distance object at the wide angle end, at the focal length of 16.45 mm, and at the telephoto end, respectively. Numerical Embodiment 2 is a zoom lens having an imaging field angle of 34.51 degrees (focal length of 8.0 mm) at the wide angle end and a zoom ratio of 17.00.

Figure 5:
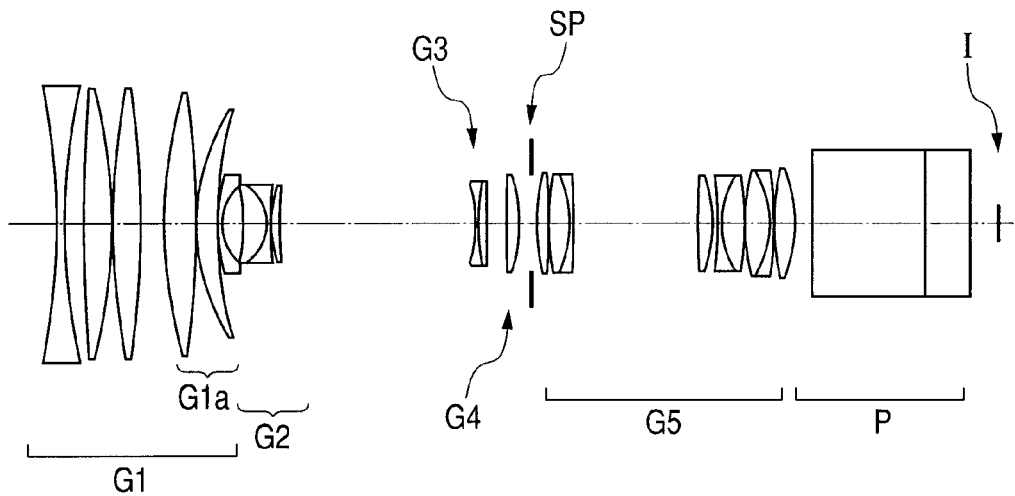
FIG. 5 is a lens cross-sectional view at a wide angle end according to Embodiment 3.
Figure 6A:
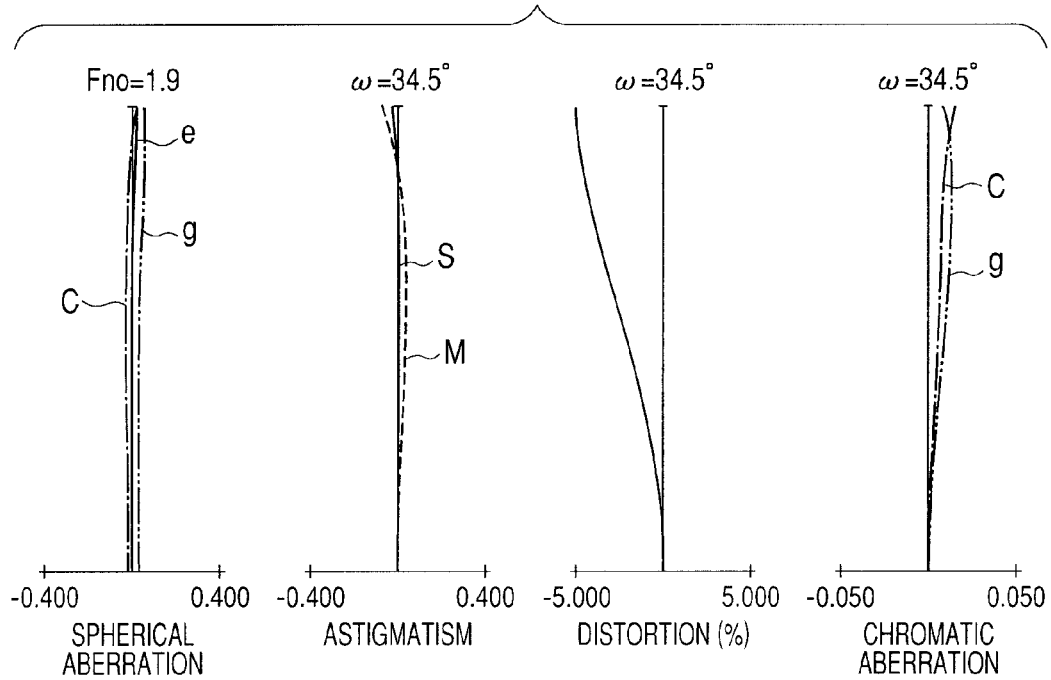
FIGS. 6A, 6B, and 6C are aberration diagrams at the wide angle end, at a focal length fz, and at a telephoto end, respectively, according to Embodiment 3.
Figure 6B:
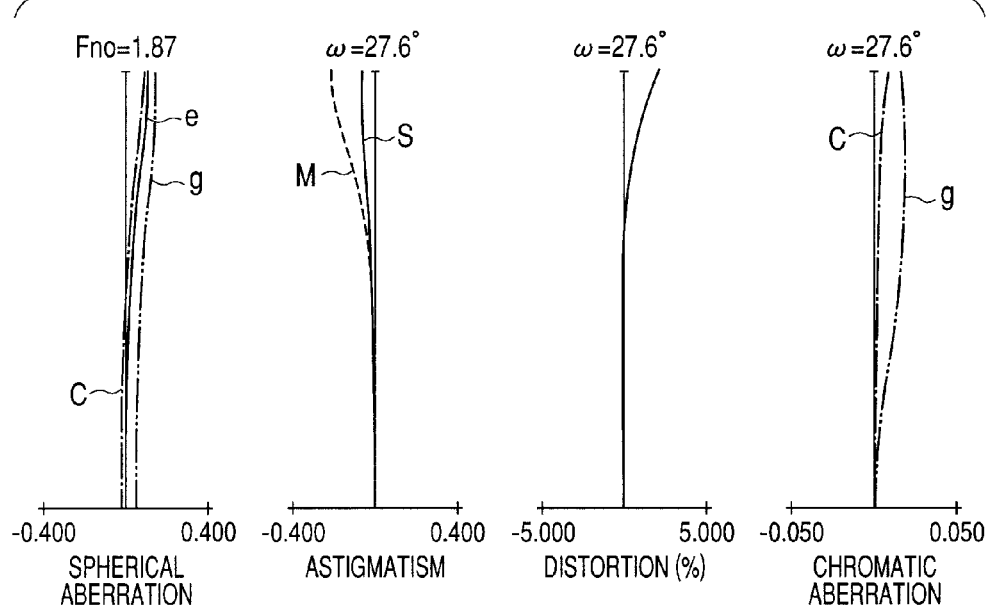
Figure 6C:
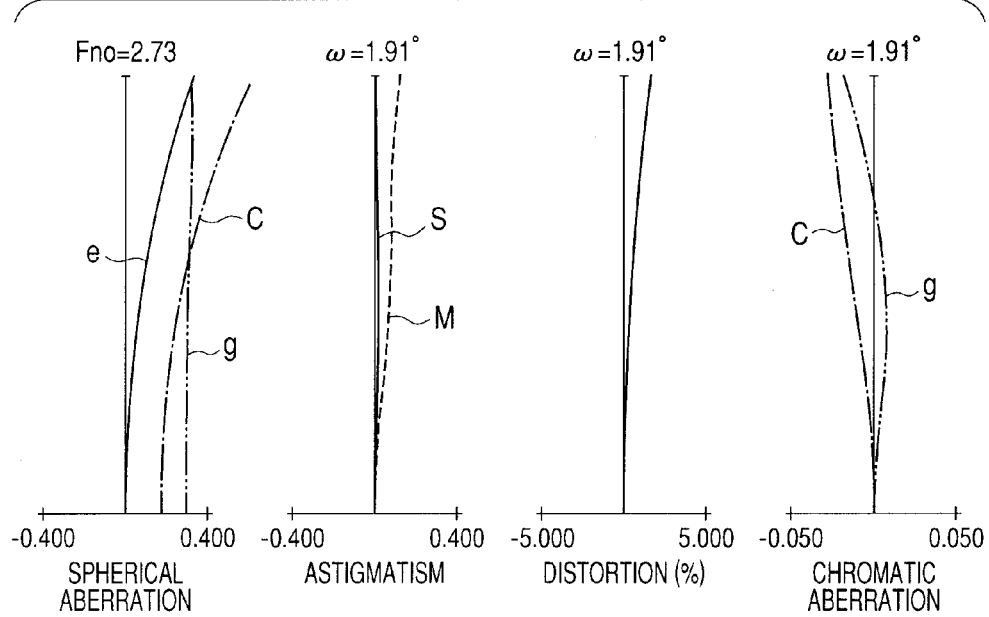
Figure 8B:
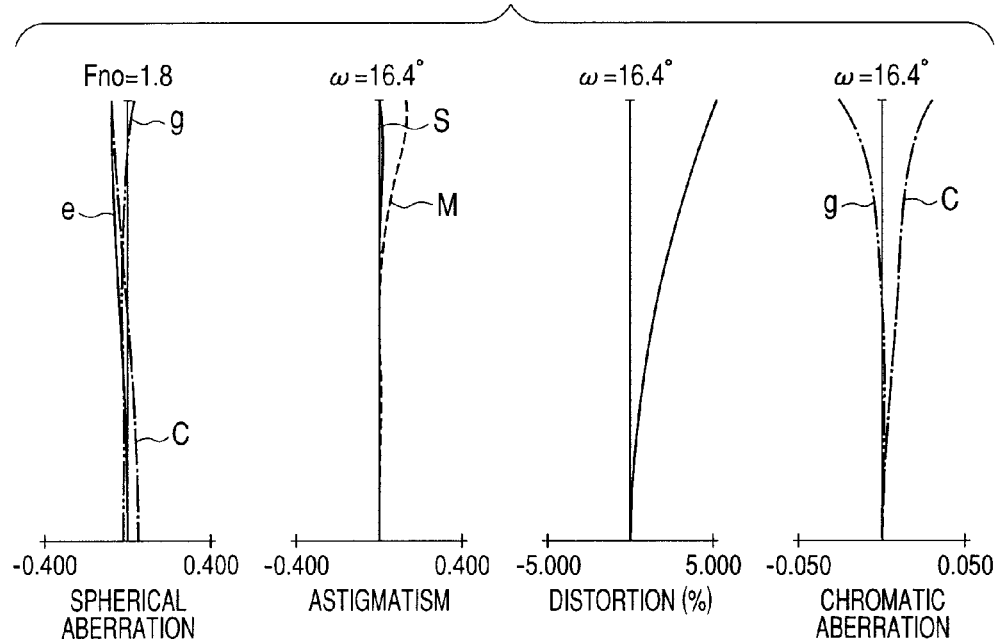
Figure 8C:
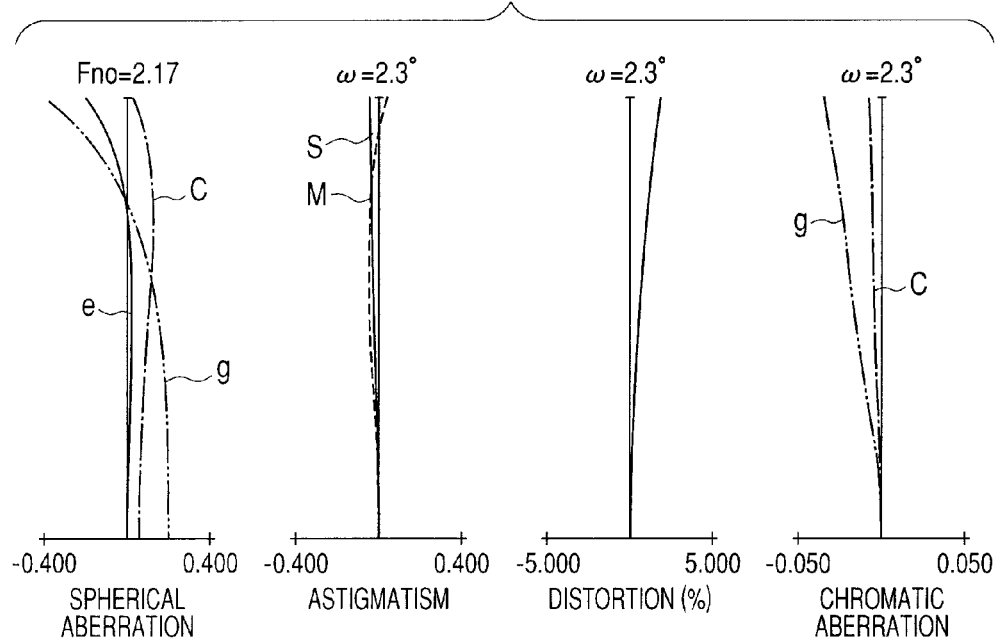

FIG. 5 is a cross-sectional view of the zoom lens according to Embodiment 3 (Numerical Embodiment 3) of the present invention, in focus on an infinite distance object at the wide angle end. FIGS. 6A, 6B, and 6C are vertical aberration diagrams according to Numerical Embodiment 3 in focus on an infinite distance object at the wide angle end, at the focal length of 10.51 mm, and at the telephoto end, respectively. Numerical Embodiment 3 is a zoom lens having an imaging field angle of 34.51 degrees (focal length of 8.0 mm) at the wide angle end and a zoom ratio of 20.65. FIG. 7 is a cross-sectional view of the zoom lens according to Embodiment 4 (Numerical Embodiment 4) of the present invention, in focus on an infinite distance object at the wide angle end. FIGS. 8A, 8B, and 8C are vertical aberration diagrams according to Numerical Embodiment 4 in focus on an infinite distance object at the wide angle end, at the focal length of 18.66 mm, and at the telephoto end, respectively. Numerical Embodiment 4 is a zoom lens having an imaging field angle of 38.16 degrees (focal length of 7.0 mm) at the wide angle end and a zoom ratio of 19.54.

Figure 9:
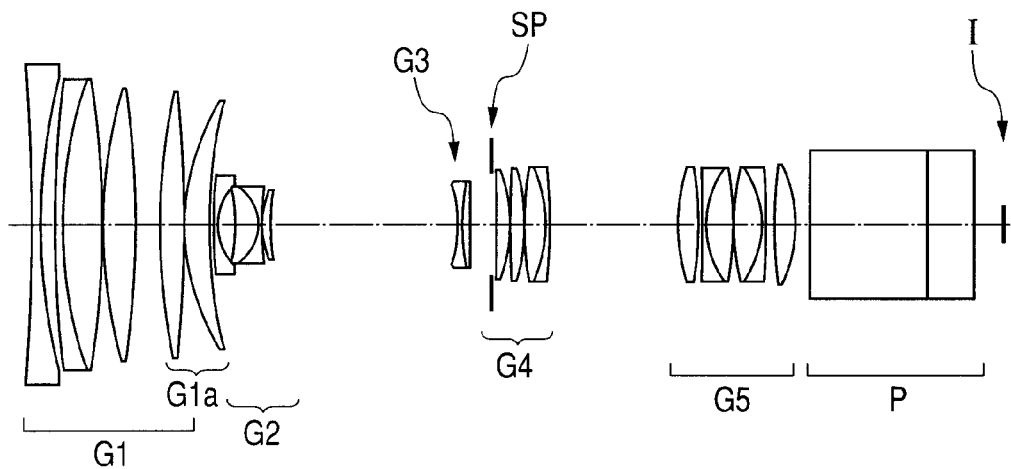
FIG. 9 is a lens cross-sectional view at a wide angle end according to Embodiment 5.
Figure 10A:
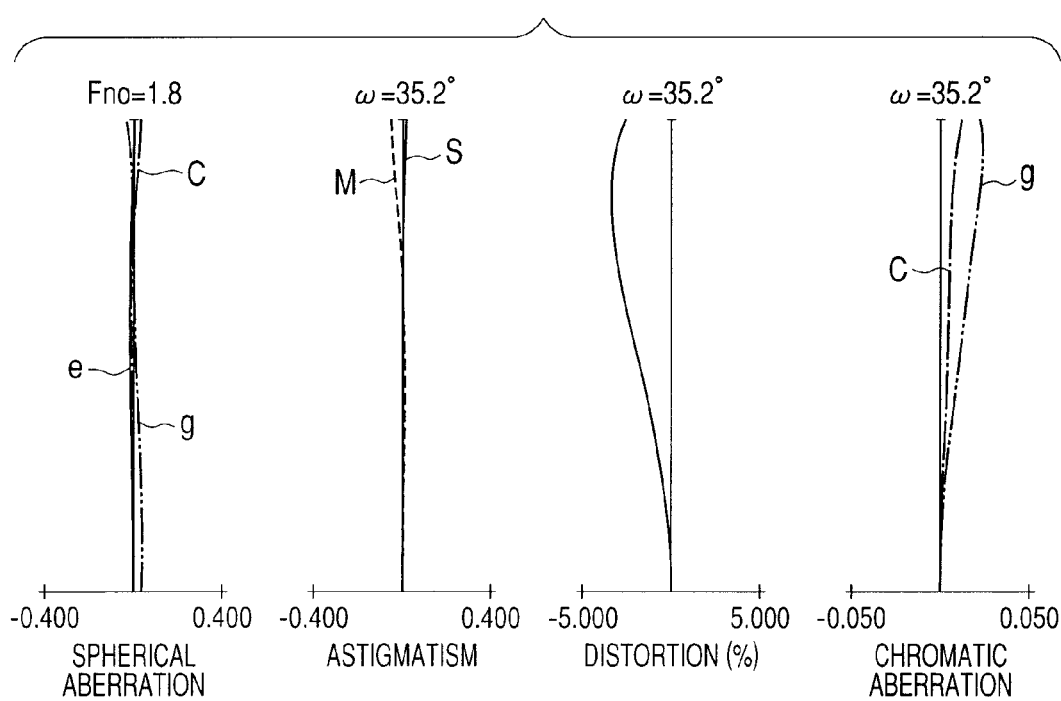
FIGS. 10A, 10B, and 10C are aberration diagrams at the wide angle end, at a focal length fz, and at a telephoto end, respectively, according to Embodiment 5.
Figure 10B:
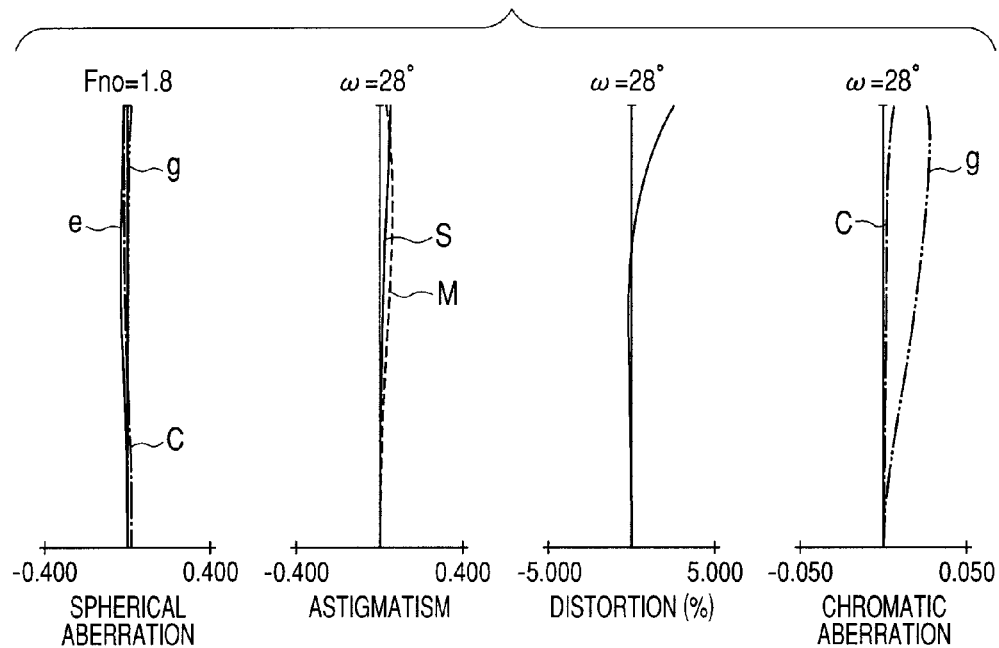
Figure 10C:
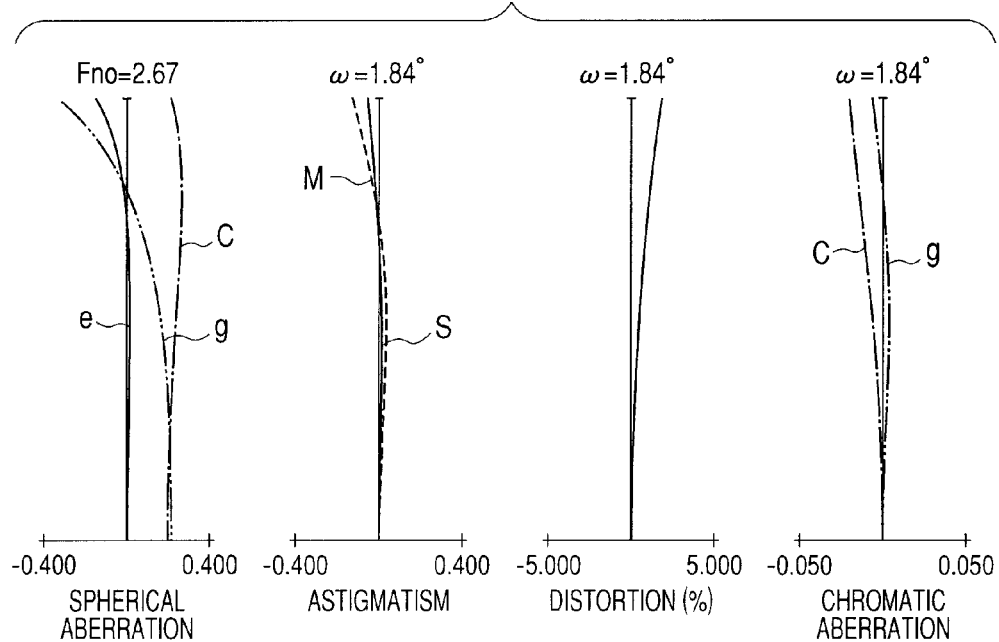
Figure 11:
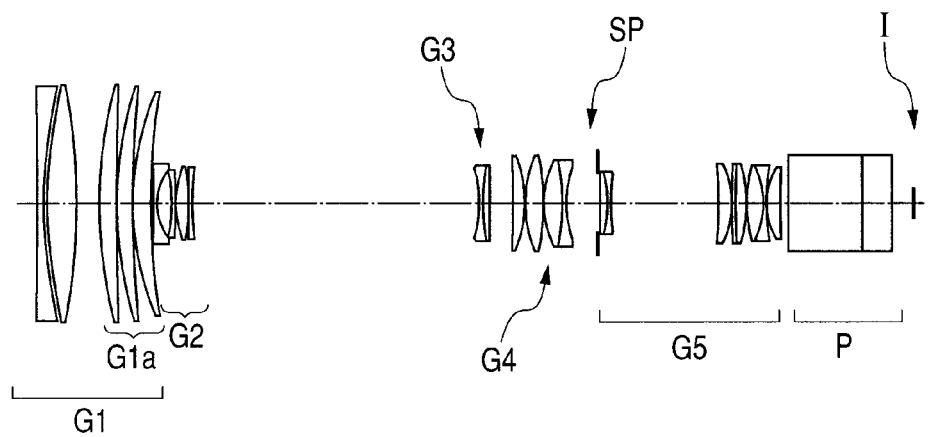
FIG. 11 is a lens cross-sectional view at a wide angle end according to Embodiment 6.
Figure 12A:
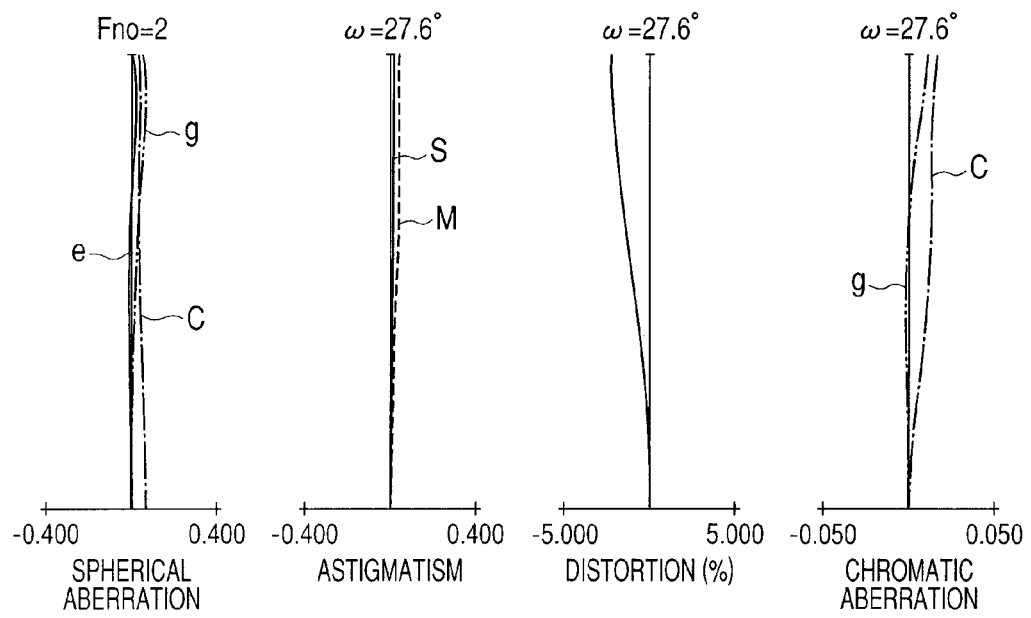
FIGS. 12A, 12B, and 12C are aberration diagrams at the wide angle end, at a focal length fz, and at a telephoto end, respectively, according to Embodiment 6.
Figure 12B:
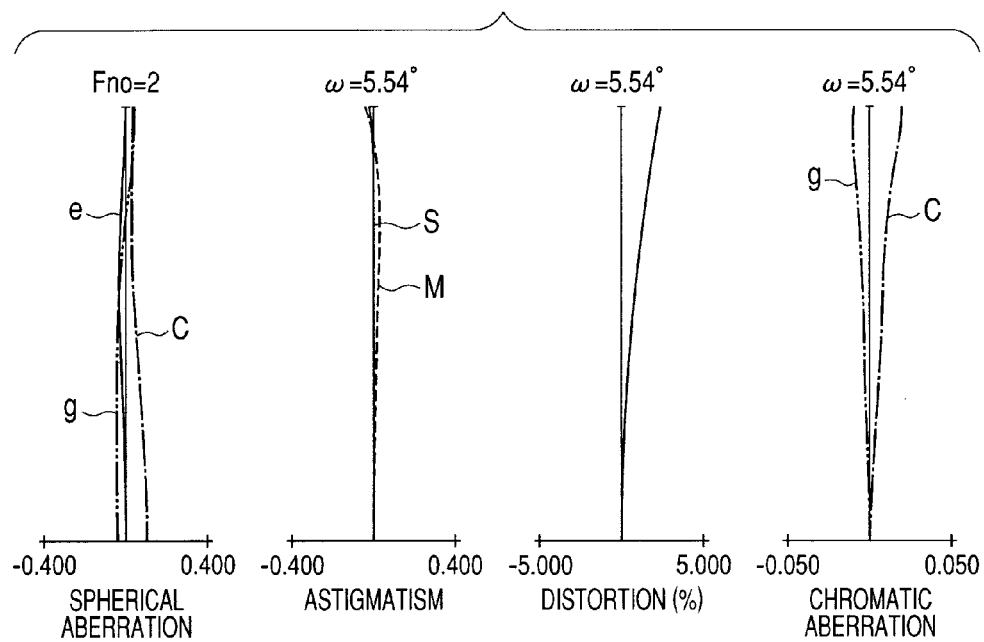
Figure 12C:
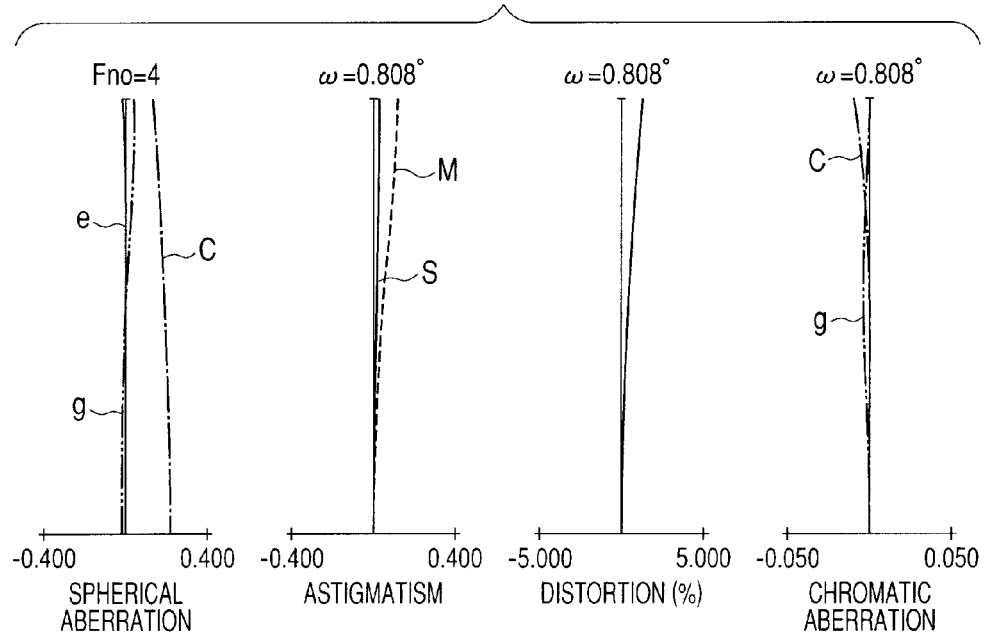

FIG. 9 is a cross-sectional view of the zoom lens according to Embodiment 5 (Numerical Embodiment 5) of the present invention, in focus on an infinite distance object at the wide angle end. FIGS. 10A, 10B, and 10C are vertical aberration diagrams according to Numerical Embodiment 5 in focus on an infinite distance object at the wide angle end, at the focal length of 10.34 mm, and at the telephoto end, respectively. Numerical Embodiment 5 is a zoom lens having an imaging field angle of 35.19 degrees (focal length of 7.8 mm) at the wide angle end and a zoom ratio of 21.94. FIG. 11 is a cross-sectional view of the zoom lens according to Embodiment 6 (Numerical Embodiment 6) of the present invention, in focus on an infinite distance object at the wide angle end. FIGS. 12A, 12B, and 12C are vertical aberration diagrams according to Numerical Embodiment 6 in focus on an infinite distance object at the wide angle end, at the focal length of 56.74 mm, and at the telephoto end, respectively. Numerical Embodiment 6 is a zoom lens having an imaging field angle of 27.65 degrees (focal length of 10.5 mm) at the wide angle end and a zoom ratio of 37.12.

Figure 13:
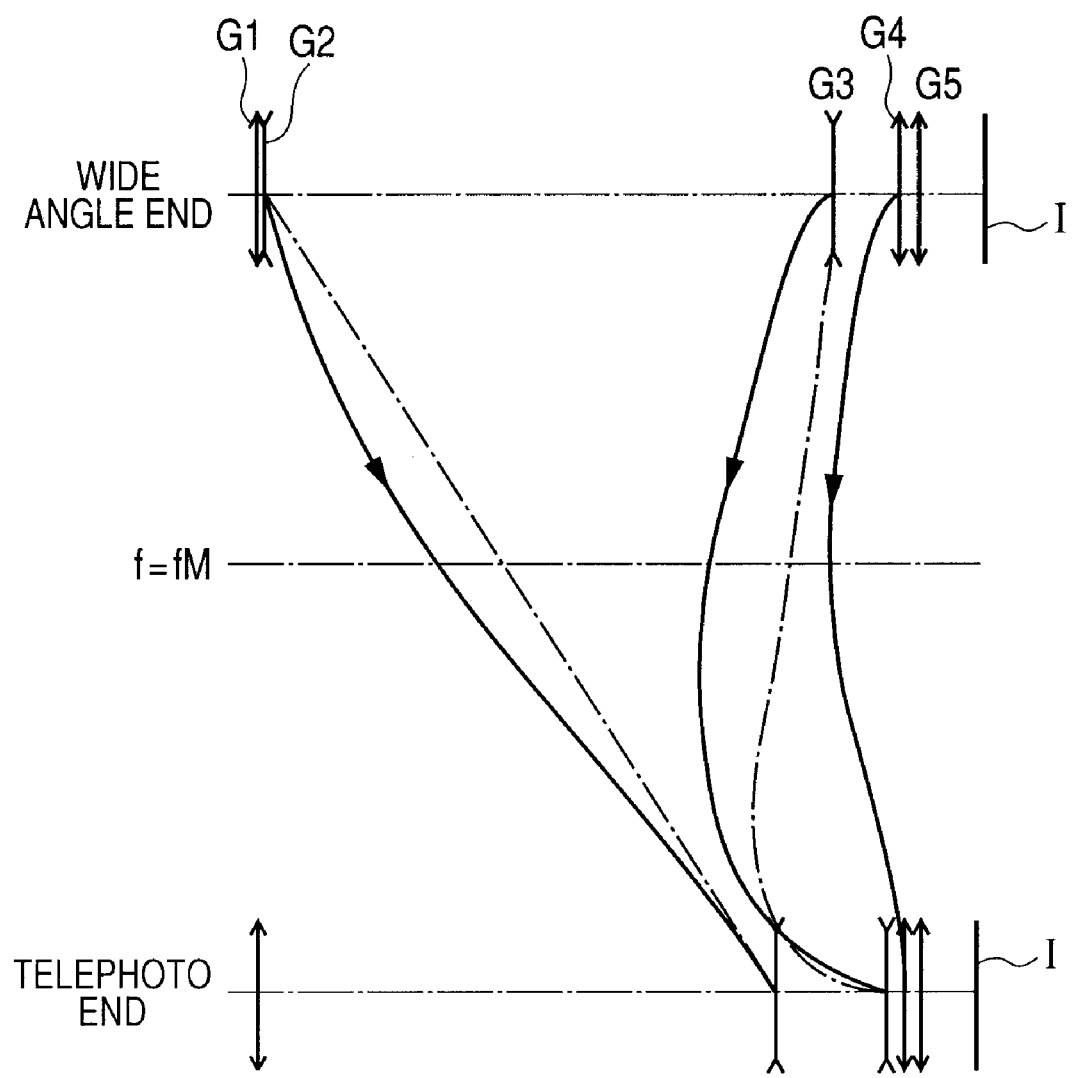
FIG. 13 is an explanatory diagram of a paraxial refractive power arrangement of a zoom lens according to the present invention.

FIG. 13 is an explanatory diagram of moving loci accompanying a zooming operation of the lens units of the zoom lens according to the present invention.

Figure 14:
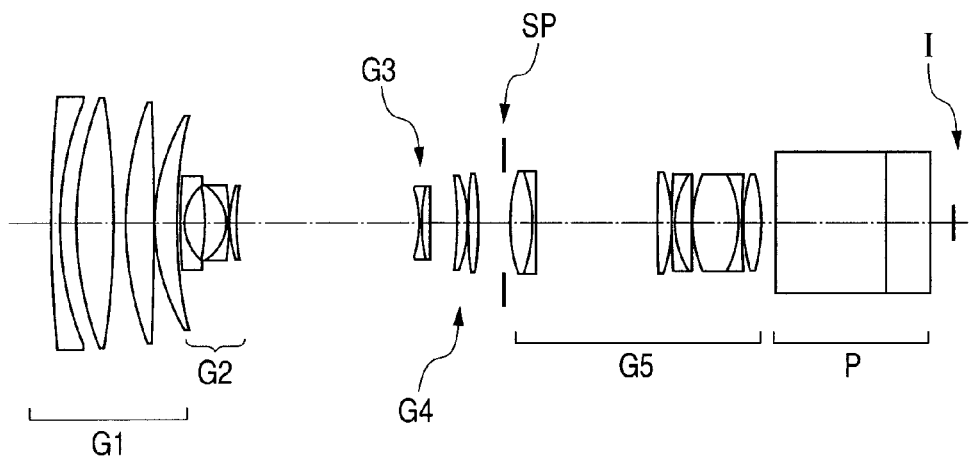
FIG. 14 is a lens cross-sectional view at a wide angle end according to Embodiment 7.
Figure 15A:
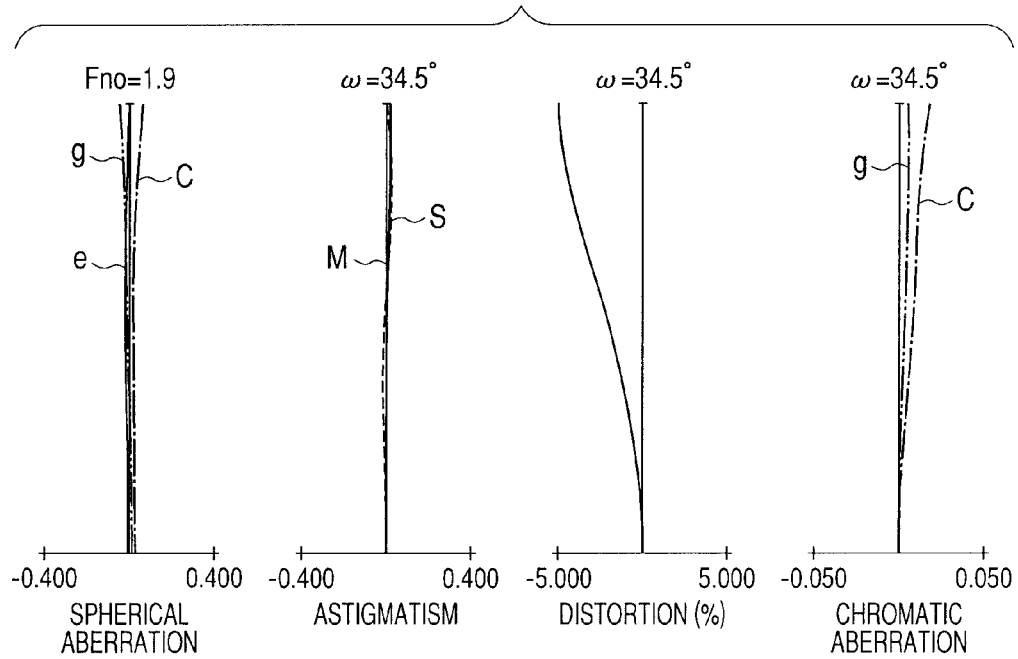
FIGS. 15A, 15B, 15C, 15D, and 15E are aberration diagrams at the wide angle end and an object distance of 3.5 m, at a focal length fz of 14.77 mm and the object distance of 3.5 m, at a telephoto end and the object distance of 3.5 m, at the telephoto end and an object distance of infinity, and at the telephoto end and an object distance of proximity (0.8 m), respectively, according to Embodiment 7.
Figure 15B:
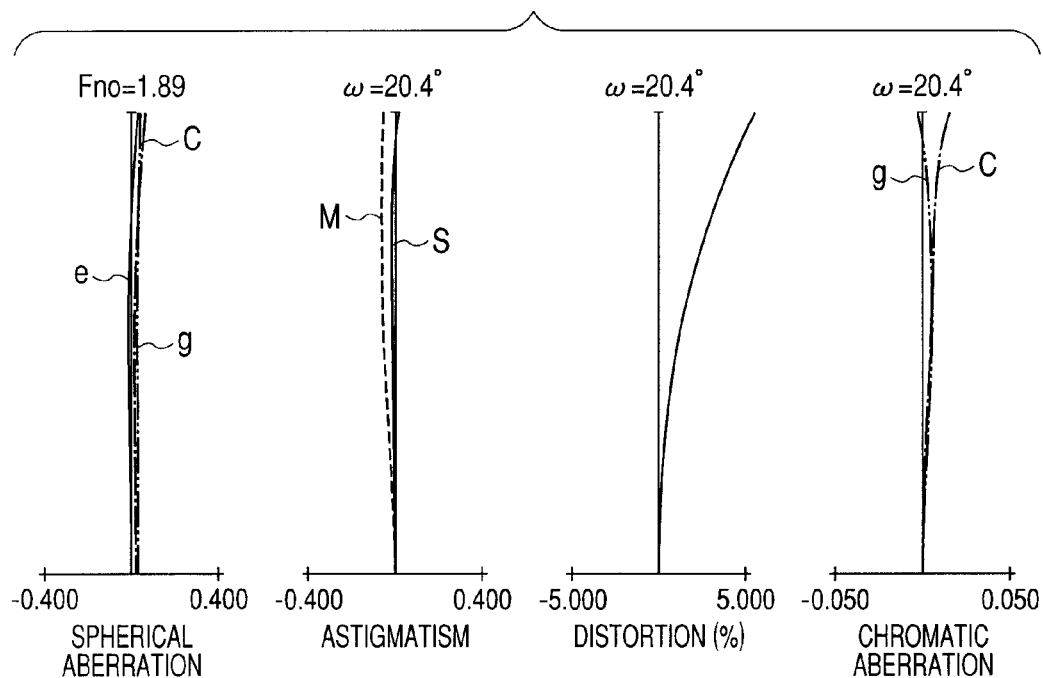
Figure 15C:
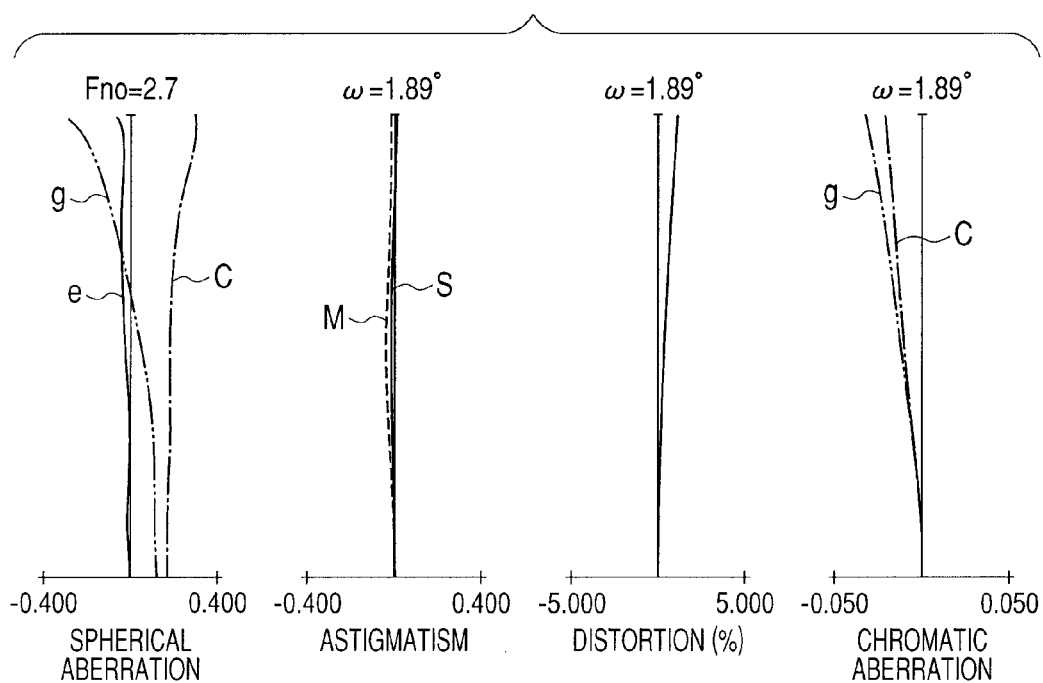
Figure 15D:
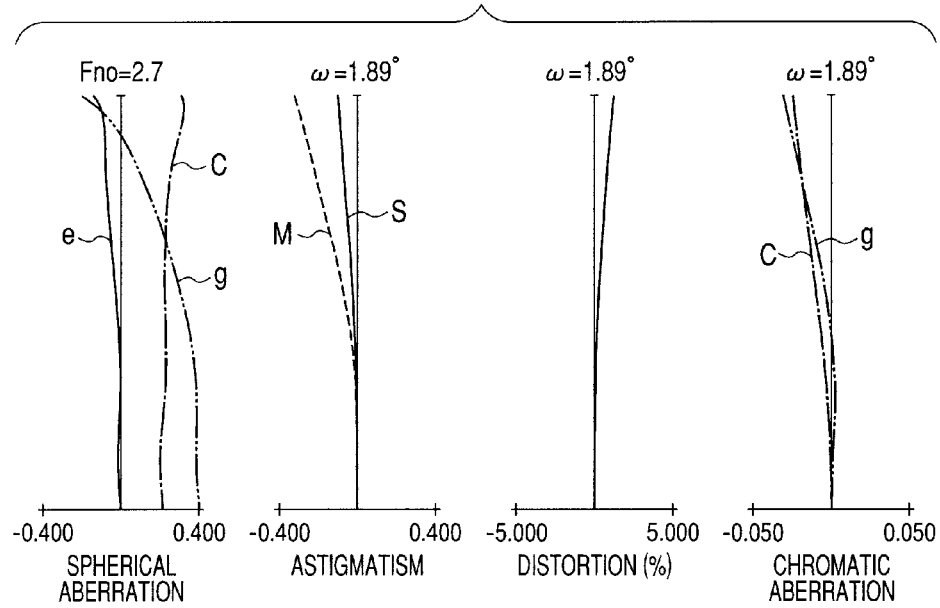
Figure 15E:
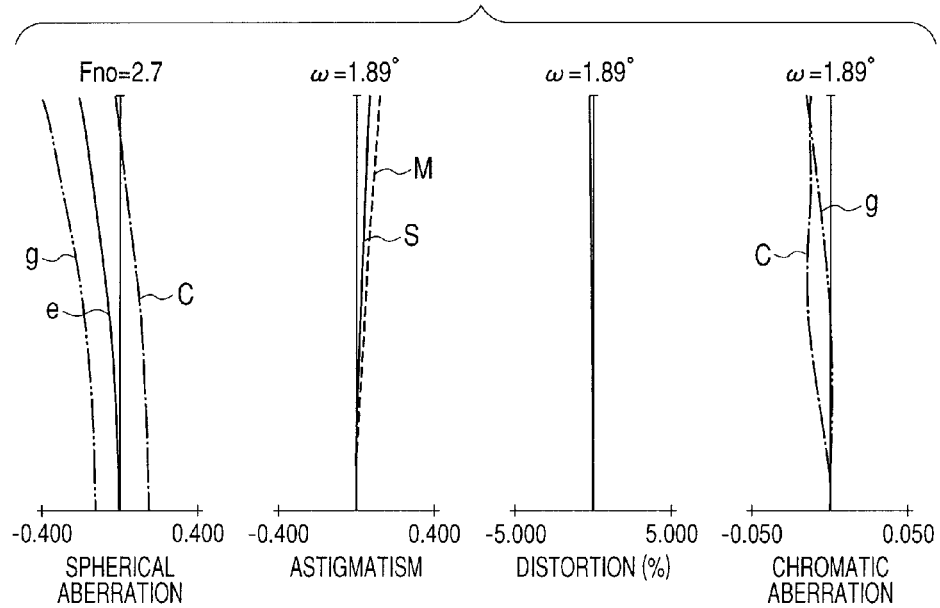

FIG. 14 is a schematic diagram of an image pickup apparatus according to the present invention. This image pickup apparatus includes a zoom lens as an image pickup optical system which forms an image of a subject, and an image pickup element (photoelectric transducer such as a CCD) which receives the subject image formed by the zoom lens. As a matter of course, the zoom lens provided to the image pickup apparatus is the zoom lens of one of the above-mentioned Embodiments 1 to 6. In FIG. 14, the left side is the object side (front, subject side), and the right side is the image side (rear, image pickup element side). In the explanatory diagram of the paraxial refractive power arrangement of the zoom lens illustrated in FIG. 13, the arrows indicate moving loci of individual lens units in the zooming operation from the wide angle end to the telephoto end.

In the individual lens cross-sectional views and FIG. 13, the zoom lens includes: a first lens unit G1 having a positive refractive power; a variator (second lens unit) G2 having a negative refractive power for zooming, which is moved on the optical axis to the image plane side, so that zooming from the wide angle end to the telephoto end is performed; a variator (third lens unit) G3 having a negative refractive power for zooming, which moves so as to take a locus convex toward the object side from the wide angle end to the telephoto end; and a compensator (fourth lens unit) G4 having a positive refractive power, which moves non-linearly on the optical axis for compensating for image plane variation due to zooming (so as to take a locus convex toward the object side). In each embodiment, the lens unit which compensates for the image plane variation due to zooming is the fourth lens unit, but the third lens unit may be the lens unit for compensating for image plane variation. The zoom lens further includes: an aperture stop SP, which is disposed on the image side of the fourth lens unit G4; and a relay unit (fifth lens unit) G5 having a positive refractive power with an imaging function which does not move for zooming. A converter (zooming optical system) for converting a focal length of the entire system may be disposed in an air interval of the fifth lens unit G5. The zoom lens further includes: a color separation prism or an optical filter P, which is illustrated as a glass block in the diagram; and an image plane I, which corresponds to an imaging surface of a solid-state image pickup element (photoelectric transducer).

In the aberration diagram, spherical aberration indicates a g-line, an e-line, and a C-line. Astigmatism indicates a meridional image plane (M) of the e-line and a sagittal image plane (S) of the e-line. Lateral chromatic aberration is indicated by the g-line and the C-line. Fno denotes an F number, ω denotes a half field angle. In the zoom lens of each embodiment, in a zooming operation from a wide angle end to a telephoto end, the second lens unit G2 moves to the image side while the third lens unit G3 moves so as to take a locus convex toward the object side. The fourth lens unit G4 moves so as to take a locus convex toward the object side. Thus, a high zoom ratio can be realized easily. A focal length of the entire system at the wide angle end is denoted by fw, a zoom ratio is denoted by Z, and a focal length of the entire system at a zoom position fM where the third lens unit G3 is positioned closest to the object side is denoted by fz. Then, the following conditional expression is satisfied.

$$fw \times Z^{0.07} < fz < fw \times Z^{0.5} \quad (1)$$

In many cases, a four-unit zoom lens that can easily realize a high zoom ratio is used for a broadcasting television camera. This four-unit zoom lens includes, in order from the object side to the image side, a first lens unit having a positive refractive power which does not move during zooming, and a second lens unit having a negative refractive power for zooming which moves to the image side during zooming from a wide angle end to a telephoto end. The four-unit zoom lens further includes a third lens unit having a positive or negative refractive power, which moves on the optical axis so as to cooperate with the movement of the second lens unit, for compensating image plane variation due to zooming, and a fourth lens unit having a positive refractive power which performs imaging function without moving during zooming. In order to increase the magnification at the wide angle side in this four-unit zoom lens, it is necessary to move the second lens unit largely to the image side. Then, an interval between the first lens unit and the second lens unit increases, so that an incident height of an off-axis light beam entering the first lens unit increases. For this reason, the incident height of the off-axis light beam entering the first lens unit becomes highest at the zoom position fM a little closer to the telephoto side from the wide angle end. An effective diameter of the first lens unit is determined at the zoom position fM.

In addition, in the four-unit zoom lens, a moving locus of the third lens unit in the zooming operation is determined uniquely for image point compensation. Specifically, the third lens unit moves so as to take a locus convex toward the object side, and becomes closest to the object side at a zoom position where an imaging magnification of the second lens unit passes through −1 point. In contrast, if the zooming lens unit according to the present invention is constituted of three movable lens units, it is preferred to adopt a structure in which the image plane variation due to zooming is compensated by the fourth lens unit G4, so that a moving locus of the third lens unit in the zooming operation can be set arbitrarily. In each embodiment, moving loci of the second lens unit G2 and the third lens unit G3 in the zooming operation are set appropriately, so that the effective diameter of the first lens unit G1 is reduced, and the entire system is downsized.

In the zoom lens of each embodiment, the third lens unit G3 at the zoom position fM moves closer to the object side in the locus thereof. When the third lens unit G3 moves closer to the object side, a magnification increasing effect by the third lens unit G3 can be obtained. By the magnification increasing effect by the third lens unit G3, a magnification increasing contribution value of the second lens unit G2 during zooming is reduced, so that a movement amount of the second lens unit G2 can be reduced. As a result, the incident height of the off-axis light beam entering the first lens unit G1 at the zoom position fM is decreased, so that the effective diameter of the first lens unit G1 can be reduced. In addition, when the effective diameter of the first lens unit G1 is reduced, a lens thickness is also reduced consequently. Therefore, the size and weight of the first lens unit G1 that is dominant in the lens mass can be reduced.

In FIG. 13, the moving loci of the second lens unit G2, the third lens unit G3, and the fourth lens unit G4 in the zooming operation from the wide angle end to the telephoto end in the zoom lens according to the present invention are illustrated by solid line arrows. In addition, the moving loci of the second lens unit G2 and the third lens unit G3 during zooming from a wide angle end to a telephoto end in the four-unit zoom lens described above for reference are illustrated by dot lines. In the zoom lens according to the present invention, it can be seen that the movement amount of the second lens unit G2 is decreased while the movement amount of the third lens G3 is increased at the zoom position fM with respect to the four-unit zoom lens.

Hereinafter, technical meaning of the conditional expression (1) is described in detail. The conditional expression (1) defines a range of the focal length fz of the entire system at the zoom position fM where the third lens unit G3 moves to the position closest to the object side. When the focal length fz is set to the zoom position fM or vicinity thereof, size and weight of the first lens unit G1 can be easily reduced. Above the upper limit of the conditional expression (1), the effect of reducing the effective diameter of the first lens unit G1 is decreased, and it is difficult to achieve small size and light weight. Below the lower limit of the conditional expression (1), the third lens unit G3 moves rapidly on the wide angle side so that variations of spherical aberration, coma aberration, and the like increase. As a result, it becomes difficult to suppress the aberrations. In each embodiment, it is further preferred to satisfy one or more of the following conditional expressions. Then, effects corresponding to the conditional expressions can be obtained. The imaging magnification of the second lens unit G2 at the wide angle end is denoted by β2w, and the imaging magnification of the second lens unit G2 at the zoom position of the focal length fz is denoted by β2z.

The focal length of the first lens unit G1 is denoted by f1, the focal length of the second lens unit G2 is denoted by f2, the focal length of the third lens unit G3 is denoted by f3, and the focal length of the fourth lens unit G4 is denoted by f4. Then, it is more preferred to satisfy one or more of the following conditional expressions.

$$0.03 < \beta 2w/\beta 2z/Z < 0.12 \quad (2)$$

$$4.0 < |f1/f2| < 7.0 \quad (3)$$

$$1.1 < |f1/f3| < 2.0 \quad (4)$$

$$0.9 < f1/f4 < 4.0 \quad (5)$$

The conditional expression (2) defines the imaging magnification of the second lens unit G2 at the wide angle end and at the zoom position fz. Above the upper limit of the conditional expression (2), the magnification increasing contribution value of the second lens unit G2 at the zoom position fz for zooming is increased, so that the movement amount of the second lens unit G2 during zooming is increased. Thus, the interval between the first lens unit G1 and the second lens unit G2 is increased, so that the incident height of the off-axis light beam entering the first lens unit G1 is increased. Below the lower limit value of the conditional expression (2), the magnification increasing contribution value of the second lens unit G2 for zooming becomes too small. Therefore, it is necessary to increase excessively the magnification increasing contribution value of the third lens unit G3. Thus, it is necessary to move the third lens unit G3 rapidly during zooming. As a result, variation due to zooming such as spherical aberration or coma aberration increases, and it is difficult to suppress the aberration.

The conditional expressions (3), (4), and (5) define, respectively, ratios of the focal lengths of the second lens unit G2, the third lens unit G3, and the fourth lens unit G4 to the focal length of the first lens unit G1. The refractive power of each lens unit is defined by a reciprocal of the focal length of each lens unit. Above the upper limit of the conditional expression (3), the refractive power of the second lens unit G2 becomes too large relative to the refractive power of the first lens unit G1. As a result, variations of various aberrations in the zooming operation increase, and it is difficult to compensate for the various aberrations. Below the lower limit of the conditional expression (3), the refractive power of the second lens unit G2 is too small relative to the refractive power of the first lens unit G1. As a result, it is difficult to achieve a high zoom ratio. Above the upper limit of the conditional expression (4), the refractive power of the third lens unit G3 becomes too large relative to the refractive power of the first lens unit G1. As a result, variations of the spherical aberration, the coma aberration, and the like in the zooming operation increase, and it is difficult to compensate for the aberrations. Below the lower limit of the conditional expression (4), the refractive power of the third lens unit G3 becomes too small relative to the refractive power of the first lens unit G1. As a result, the magnification increasing contribution value of the third lens unit G3 at the zoom position fz is decreased. Therefore, the effective diameter of the first lens unit G1 increases inappropriately. Above the upper limit of the conditional expression (5), the refractive power of the fourth lens unit G4 becomes too large relative to the refractive power of the first lens unit G1. As a result, variations of the spherical aberration, the coma aberration, and the like in the zooming operation increase, and it is difficult to compensate for the aberrations.

Below the lower limit of the conditional expression (5), the refractive power of the fourth lens unit G4 becomes too small relative to the refractive power of the first lens unit G1. As a result, the movement amount for compensation for image point variation due to zooming increases, and it is difficult to achieve small size and light weight. It is more preferred to set the numerical value ranges of the conditional expressions (2) to (5) as follows.

$$0.04<\beta 2w/\beta 2z/Z<0.11 \quad (2a)$$

$$4.20<|f1/f2|<6.80 \quad (3a)$$

$$1.20<|f1/f3|<1.90 \quad (4a)$$

$$1.1<f1/f4<3.8 \quad (5a)$$

As described above, according to the individual embodiments, the moving loci of the second lens unit G2 and the third lens unit G3 in the zooming operation, power arrangements of the individual lens units, and the like are set appropriately. Thus, it is possible to obtain a high performance zoom lens having a wide field angle and a high zoom ratio which is small in size and light in weight as the entire system while achieving high optical performance.

Next, a lens structure of each lens unit of each embodiment is described. Hereinafter, it is supposed that the individual lenses are disposed in order from the object side to the image side. The first lens unit G1 is constituted of a negative lens and four positive lenses. Alternatively, the first lens unit G1 is constituted of a negative lens, a cemented lens in which a negative lens and a positive lens are cemented, and three positive lenses. The second lens unit G2 is constituted of a negative lens, a cemented lens in which a positive lens and a negative lens are cemented, and a positive lens. The third lens unit G3 is constituted of a cemented lens in which a negative lens and a positive lens are cemented. The fourth lens unit G4 is constituted of one positive lens or two positive lenses. Alternatively, the fourth lens unit G4 is constituted of two positive lenses and a cemented lens in which a positive lens and a negative lens are cemented. The fifth lens unit G5 is constituted of seven to ten lenses as a whole. In addition, when the zoom lens of each embodiment is used for the image pickup apparatus including the solid-state image pickup element which receives the image formed by the zoom lens, a diagonal length of an image size of the solid-state image pickup element is denoted by φ. Then, it is preferred to satisfy the following conditional expressions.

$$0.45<fw/\phi \quad (6)$$

$$7<Z \quad (7)$$

The conditional expressions (6) and (7) define preferred ranges of the focal length of the entire system at the wide angle end and the zoom ratio. Below the lower limit of the conditional expression (6), the imaging field angle at the wide angle end becomes too large. In addition, the effective diameter of the first lens unit G1 is determined at the wide angle end. Therefore, the effective diameter of the first lens unit G1 increases inappropriately. It is more preferred that the conditional expression (6) satisfy the following range.

$$0.55<fw/\phi<1.20 \quad (6a)$$

Below the lower limit of the conditional expression (7), the zoom ratio becomes too short for a television camera for broadcasting. It is more preferred to satisfy the numerical value range of the conditional expression (7) as follows.

$$15<Z<40 \quad (7a)$$

Next, features of the lens structures of the individual embodiments other than the feature described above are described. In Embodiments 1 to 3, 5, and 6 illustrated in FIGS. 1, 3, 5, 9, and 11, a part G1a inside the first lens unit G1 is a lens unit for focusing which is constituted of two or three positive lenses. The lens unit G1a for focusing is moved to the object side so as to perform a focusing operation from the infinite distance to the object distance of 0.8 m as the short distance.

In Embodiment 4 illustrated in FIG. 7, a part G5a inside the fifth lens unit G5 is a lens unit for focusing. The lens unit G5a for focusing is moved to the object side so as to perform a focusing operation from the infinite distance to the object distance of 0.8 m as the short distance.

In Embodiments 1 to 4, and 6 illustrated in FIGS. 1, 3, 5, 7, and 11, the aperture stop SP does not move for zooming. In Embodiment 5 illustrated in FIG. 9, the aperture stop SP moves together with the fourth lens unit G4 as one unit during zooming.

Hereinafter, Numerical Embodiments 1 to 6 corresponding to Embodiments 1 to 6 according to the present invention are described. In the respective numerical embodiments, a surface number "i" is counted from the object side. In addition, ri indicates a curvature radius of an i-th surface counted from the object side, and di indicates an interval between the i-th surface and an (i+1)-th surface which are counted from the object side. Further, ndi and vdi indicate a refractive index and an Abbe number of an i-th optical material, respectively.

Last three surfaces correspond to a glass block such as a filter. Table 1 shows a correspondence relationship between the respective embodiments and the conditional expressions described above.

(Numerical Embodiment 1)

| Surface Number (i) | r | d | nd | vd | Effective diameter |
|---|---|---|---|---|---|
| 1 | −210.024 | 2.30 | 1.72047 | 34.7 | 82.63 |
| 2 | 145.102 | 4.91 | | | 77.63 |
| 3 | 491.656 | 2.20 | 1.84666 | 23.8 | 77.24 |
| 4 | 236.100 | 8.88 | 1.43875 | 95.0 | 76.67 |
| 5 | −196.805 | 0.40 | | | 76.63 |
| 6 | 152.079 | 11.02 | 1.43387 | 95.1 | 75.76 |
| 7 | −147.909 | 6.94 | | | 75.65 |
| 8 | 136.777 | 7.72 | 1.59240 | 68.3 | 73.35 |
| 9 | −441.404 | 0.15 | | | 73.09 |
| 10 | 62.631 | 6.49 | 1.72916 | 54.7 | 67.82 |
| 11 | 131.205 | (Variable) | | | 67.13 |
| 12 | 72.053 | 1.00 | 1.88300 | 40.8 | 26.69 |
| 13 | 14.820 | 6.20 | | | 21.30 |
| 14 | −45.643 | 6.88 | 1.80809 | 22.8 | 20.98 |
| 15 | −12.496 | 0.75 | 1.88300 | 40.8 | 20.60 |
| 16 | 94.745 | 0.18 | | | 20.49 |
| 17 | 30.451 | 2.41 | 1.66680 | 33.0 | 20.72 |
| 18 | 82.062 | (Variable) | | | 20.48 |
| 19 | −38.647 | 0.75 | 1.75700 | 47.8 | 21.65 |
| 20 | 60.193 | 2.42 | 1.84649 | 23.9 | 22.99 |
| 21 | −1560.081 | (Variable) | | | 23.43 |
| 22 | −172.490 | 3.22 | 1.64000 | 60.1 | 27.72 |
| 23 | −44.456 | 0.15 | | | 28.38 |
| 24 | 84.388 | 3.66 | 1.51633 | 64.1 | 29.60 |
| 25 | −130.776 | (Variable) | | | 29.73 |
| 26 (Stop) | ∞ | 2.00 | | | 29.78 |
| 27 | 63.114 | 6.26 | 1.51742 | 52.4 | 29.82 |
| 28 | −38.329 | 1.00 | 1.83400 | 37.2 | 29.58 |
| 29 | −187.721 | 36.00 | | | 29.64 |
| 30 | −56.536 | 2.41 | 1.51633 | 64.1 | 26.08 |
| 31 | −35.722 | 0.10 | | | 26.22 |
| 32 | −503.242 | 0.80 | 1.80100 | 35.0 | 25.72 |
| 33 | 30.789 | 5.54 | 1.50127 | 56.5 | 25.72 |
| 34 | −125.107 | 0.15 | | | 26.12 |
| 35 | 61.177 | 5.93 | 1.48749 | 70.2 | 26.53 |
| 36 | −36.075 | 0.85 | 1.88300 | 40.8 | 26.48 |
| 37 | −84.336 | 0.23 | | | 26.82 |
| 38 | 53.704 | 3.66 | 1.51633 | 64.1 | 26.78 |
| 39 | −144.281 | 4.50 | | | 26.54 |
| 40 | ∞ | 33.00 | 1.60859 | 46.4 | 40.00 |
| 41 | ∞ | 13.20 | 1.51633 | 64.1 | 40.00 |
| 42 | ∞ | | | | 40.00 |

Various data

Zoom ratio  21.88

| | Wide angle | Intermediate | Telephoto |
|---|---|---|---|
| Focal length | 7.80 | 20.67 | 170.68 |
| F number | 1.80 | 1.80 | 2.63 |
| Field angle | 35.19 | 14.90 | 1.85 |
| Image height | 5.50 | 5.50 | 5.50 |
| Total lens length | 272.06 | 272.06 | 272.06 |
| BF | 7.01 | 7.01 | 7.01 |
| d11 | 0.41 | 27.98 | 55.17 |
| d18 | 61.23 | 18.97 | 11.88 |
| d21 | 6.98 | 15.28 | 1.94 |
| d25 | 2.17 | 8.56 | 1.79 |
| Entrance pupil position | 48.98 | 120.60 | 765.75 |
| Exit pupil position | 1826.32 | 1826.32 | 1826.32 |
| Front principal point position | 56.82 | 141.51 | 952.44 |
| Rear principal point position | −0.79 | −13.66 | −163.67 |

-continued

Zoom lens unit data

| Unit | First surface | Focal length | Lens structure length | Front principal point position | Rear principal point position |
|---|---|---|---|---|---|
| 1 | 1 | 71.50 | 51.01 | 33.46 | 1.92 |
| 2 | 12 | −13.80 | 17.42 | 2.44 | −9.45 |
| 3 | 19 | −57.00 | 3.17 | −0.09 | −1.82 |
| 4 | 22 | 48.00 | 7.03 | 2.82 | −1.69 |
| 5 | 26 | 52.87 | 115.63 | 54.40 | −48.14 |

(Numerical Embodiment 2)

| Surface Number (i) | r | d | nd | vd | Effective diameter |
|---|---|---|---|---|---|
| 1 | −227.435 | 2.20 | 1.78470 | 26.3 | 76.01 |
| 2 | 138.218 | 6.29 | | | 71.77 |
| 3 | 148.718 | 12.89 | 1.43387 | 95.1 | 70.38 |
| 4 | −103.869 | 6.68 | | | 70.46 |
| 5 | 184.340 | 5.02 | 1.43387 | 95.1 | 69.44 |
| 6 | −1372.972 | 0.45 | | | 69.38 |
| 7 | 104.339 | 6.86 | 1.59240 | 68.3 | 68.77 |
| 8 | 3343.803 | 0.15 | | | 68.39 |
| 9 | 56.116 | 6.26 | 1.77250 | 49.6 | 63.51 |
| 10 | 112.801 | (Variable) | | | 62.78 |
| 11 | 72.784 | 0.90 | 1.88300 | 40.8 | 23.10 |
| 12 | 13.639 | 5.39 | | | 18.60 |
| 13 | −33.777 | 6.08 | 1.80809 | 22.8 | 18.23 |
| 14 | −10.873 | 0.70 | 1.88300 | 40.8 | 17.89 |
| 15 | 117.634 | 0.20 | | | 17.85 |
| 16 | 31.031 | 2.19 | 1.66680 | 33.0 | 18.49 |
| 17 | 91.395 | (Variable) | | | 18.63 |
| 18 | −32.813 | 0.70 | 1.75700 | 47.8 | 21.35 |
| 19 | 64.159 | 2.38 | 1.84649 | 23.9 | 22.97 |
| 20 | −683.326 | (Variable) | | | 23.48 |
| 21 | −145.606 | 3.26 | 1.63854 | 55.4 | 24.84 |
| 22 | −35.516 | 0.15 | | | 25.58 |
| 23 | 102.061 | 3.39 | 1.51633 | 64.1 | 26.85 |
| 24 | −91.407 | (Variable) | | | 27.08 |
| 25 (Stop) | ∞ | 1.80 | | | 27.30 |
| 26 | 44.586 | 5.88 | 1.51742 | 52.4 | 27.58 |
| 27 | −42.605 | 0.90 | 1.83481 | 42.7 | 27.33 |
| 28 | −308.506 | 32.40 | | | 27.26 |
| 29 | −1696.626 | 0.80 | 1.80100 | 35.0 | 23.40 |
| 30 | 20.859 | 6.74 | 1.51823 | 58.9 | 23.14 |
| 31 | −58.596 | 0.15 | | | 23.52 |
| 32 | 101.955 | 6.46 | 1.49700 | 81.5 | 23.67 |
| 33 | −19.978 | 0.90 | 1.88300 | 40.8 | 23.61 |
| 34 | −64.751 | 0.20 | | | 24.57 |
| 35 | 94.895 | 5.07 | 1.54814 | 45.8 | 24.93 |
| 36 | −28.534 | 4.00 | | | 25.04 |
| 37 | ∞ | 33.00 | 1.60859 | 46.4 | 40.00 |
| 38 | ∞ | 13.20 | 1.51633 | 64.1 | 40.00 |
| 39 | ∞ | | | | 40.00 |

Various data

| Zoom ratio | 17.00 | | |
|---|---|---|---|
| | Wide angle | Intermediate | Telephoto |
| Focal length | 8.00 | 16.45 | 135.98 |
| F number | 1.80 | 1.80 | 2.20 |
| Field angle | 34.51 | 18.49 | 2.32 |
| Image height | 5.50 | 5.50 | 5.50 |
| Total lens length | 248.13 | 248.13 | 248.13 |
| BF | 7.61 | 7.61 | 7.61 |
| d10 | 0.50 | 19.05 | 46.44 |
| d17 | 52.27 | 22.17 | 6.52 |
| d20 | 2.12 | 7.71 | 1.72 |
| d24 | 1.97 | 7.93 | 2.18 |

-continued

| | | | |
|---|---|---|---|
| Entrance pupil position | 45.96 | 88.99 | 545.25 |
| Exit pupil position | 346.42 | 346.42 | 346.42 |
| Front principal point position | 54.14 | 106.23 | 735.80 |
| Rear principal point position | −0.39 | −8.83 | −128.37 |

Zoom lens unit data

| Unit | First surface | Focal length | Lens structure length | Front principal point position | Rear principal point position |
|---|---|---|---|---|---|
| 1 | 1 | 63.00 | 46.80 | 30.38 | 0.40 |
| 2 | 11 | −12.00 | 15.47 | 2.15 | −8.47 |
| 3 | 18 | −49.00 | 3.08 | −0.13 | −1.82 |
| 4 | 21 | 41.00 | 6.80 | 2.91 | −1.46 |
| 5 | 25 | 49.43 | 111.50 | 56.50 | −48.83 |

(Numerical Embodiment 3)

| Surface Number (i) | r | d | nd | vd | Effective diameter |
|---|---|---|---|---|---|
| 1 | −194.969 | 2.30 | 1.75520 | 27.5 | 75.58 |
| 2 | 151.569 | 5.79 | | | 73.66 |
| 3 | 526.478 | 7.89 | 1.43875 | 95.0 | 74.00 |
| 4 | −155.307 | 0.40 | | | 74.10 |
| 5 | 183.311 | 8.31 | 1.43387 | 95.1 | 73.57 |
| 6 | −217.520 | 6.54 | | | 73.51 |
| 7 | 121.218 | 9.13 | 1.59240 | 68.3 | 71.68 |
| 8 | −285.619 | 0.15 | | | 71.15 |
| 9 | 57.054 | 5.51 | 1.75500 | 52.3 | 62.19 |
| 10 | 103.207 | (Variable) | | | 61.27 |
| 11 | 61.128 | 1.00 | 1.88300 | 40.8 | 26.06 |
| 12 | 13.805 | 6.23 | | | 20.63 |
| 13 | −46.148 | 7.20 | 1.80809 | 22.8 | 20.32 |
| 14 | −12.311 | 0.75 | 1.88300 | 40.8 | 19.92 |
| 15 | 91.239 | 0.18 | | | 19.87 |
| 16 | 28.434 | 2.36 | 1.66680 | 33.0 | 20.14 |
| 17 | 69.828 | (Variable) | | | 19.90 |
| 18 | −36.701 | 0.75 | 1.74320 | 49.3 | 20.28 |
| 19 | 61.864 | 2.50 | 1.84649 | 23.9 | 21.49 |
| 20 | −13098.195 | (Variable) | | | 22.02 |
| 21 | 161.505 | 4.17 | 1.71999 | 50.2 | 26.06 |
| 22 | −41.459 | (Variable) | | | 26.49 |
| 23 (Stop) | ∞ | 1.50 | | | 26.66 |
| 24 | 68.204 | 2.93 | 1.53172 | 48.8 | 26.75 |
| 25 | 6294.210 | 0.15 | | | 26.55 |
| 26 | 68.581 | 6.18 | 1.48749 | 70.2 | 26.30 |
| 27 | −32.653 | 1.00 | 1.88300 | 40.8 | 25.74 |
| 28 | −2158.784 | 36.00 | | | 25.71 |
| 29 | 301.023 | 4.32 | 1.48749 | 70.2 | 25.23 |
| 30 | −39.066 | 1.17 | | | 25.42 |
| 31 | −109.789 | 1.00 | 1.83489 | 42.6 | 24.93 |
| 32 | 21.791 | 6.98 | 1.48749 | 70.2 | 24.94 |
| 33 | −94.905 | 0.15 | | | 25.73 |
| 34 | 61.773 | 7.17 | 1.49700 | 81.5 | 26.72 |
| 35 | −25.764 | 1.00 | 1.88300 | 40.8 | 26.93 |
| 36 | −121.376 | 0.27 | | | 28.24 |
| 37 | 57.366 | 6.14 | 1.57501 | 41.5 | 29.50 |
| 38 | −38.473 | 4.50 | | | 29.57 |
| 39 | ∞ | 33.00 | 1.60859 | 46.4 | 40.00 |
| 40 | ∞ | 13.20 | 1.51633 | 64.1 | 40.00 |
| 41 | ∞ | | | | 40.00 |

(Numerical Embodiment 3)

Various data
Zoom ratio 20.65

| | Wide angle | Intermediate | Telephoto |
|---|---|---|---|
| Focal length | 8.00 | 10.51 | 165.22 |
| F number | 1.90 | 1.90 | 2.73 |
| Field angle | 34.51 | 27.62 | 1.91 |
| Image height | 5.50 | 5.50 | 5.50 |
| Total lens length | 271.64 | 271.64 | 271.64 |
| BF | 8.25 | 8.25 | 8.25 |
| d10 | 0.09 | 7.54 | 51.77 |
| d17 | 56.33 | 38.02 | 7.62 |
| d20 | 5.34 | 8.48 | 1.26 |
| d22 | 3.81 | 11.53 | 4.91 |
| Entrance pupil position | 46.19 | 58.66 | 677.16 |
| Exit pupil position | 156.40 | 156.40 | 156.40 |
| Front principal point position | 54.62 | 69.91 | 1026.64 |
| Rear principal point position | 0.25 | −2.26 | −156.96 |

Zoom lens unit data

| Unit | First surface | Focal length | Lens structure length | Front principal point position | Rear principal point position |
|---|---|---|---|---|---|
| 1 | 1 | 68.50 | 46.02 | 30.52 | 1.13 |
| 2 | 11 | −13.30 | 17.71 | 2.45 | −9.56 |
| 3 | 18 | −54.00 | 3.25 | −0.05 | −1.82 |
| 4 | 21 | 46.00 | 4.17 | 1.94 | −0.50 |
| 5 | 23 | 52.24 | 126.65 | 69.97 | −49.76 |

(Numerical Embodiment 4)

| Surface Number (i) | r | d | nd | vd | Effective diameter |
|---|---|---|---|---|---|
| 1 | −236.060 | 2.30 | 0.00000 | 0.0 | 86.45 |
| 2 | 142.928 | 4.06 | | | 81.45 |
| 3 | 283.542 | 2.20 | 1.75520 | 27.5 | 81.48 |
| 4 | 156.534 | 12.97 | 1.43875 | 95.0 | 80.98 |
| 5 | −144.961 | 0.15 | | | 80.95 |

(Numerical Embodiment 4)

| | | | | | |
|---|---|---|---|---|---|
| 6 | 199.773 | 8.70 | 1.43387 | 95.1 | 80.09 |
| 7 | −232.422 | 0.15 | | | 80.08 |
| 8 | 107.546 | 10.63 | 1.59240 | 68.3 | 78.28 |
| 9 | −350.605 | 0.15 | | | 77.86 |
| 10 | 59.885 | 7.43 | 1.77250 | 49.6 | 68.55 |
| 11 | 142.443 | (Variable) | | | 67.88 |
| 12 | 52.733 | 1.00 | 1.88300 | 40.8 | 32.32 |
| 13 | 14.088 | 7.97 | | | 23.81 |
| 14 | −68.272 | 8.38 | 1.80809 | 22.8 | 23.46 |
| 15 | −13.273 | 0.75 | 1.88300 | 40.8 | 22.63 |
| 16 | 59.423 | 0.18 | | | 21.73 |
| 17 | 27.047 | 2.48 | 1.71736 | 29.5 | 21.91 |
| 18 | 60.961 | (Variable) | | | 21.57 |
| 19 | −28.974 | 0.75 | 1.75700 | 47.8 | 17.62 |
| 20 | 57.107 | 1.94 | 1.84649 | 23.9 | 18.73 |
| 21 | −663.798 | (Variable) | | | 19.11 |
| 22 | −147.492 | 2.95 | 1.64000 | 60.1 | 23.50 |
| 23 | −34.689 | 0.15 | | | 24.07 |
| 24 | 219.302 | 2.61 | 1.51633 | 64.1 | 24.77 |
| 25 | −91.482 | (Variable) | | | 24.96 |
| 26 (Stop) | ∞ | 2.00 | | | 25.16 |
| 27 | 77.337 | 4.84 | 1.53172 | 48.8 | 25.35 |
| 28 | −36.200 | 1.00 | 1.83400 | 37.2 | 25.23 |
| 29 | −141.705 | 36.00 | | | 25.39 |
| 30 | −38.908 | 1.71 | 1.54814 | 45.8 | 24.02 |
| 31 | −34.787 | 0.40 | | | 24.31 |
| 32 | −210.132 | 0.80 | 1.80100 | 35.0 | 24.10 |
| 33 | 31.924 | 5.67 | 1.50127 | 56.5 | 24.21 |
| 34 | −59.445 | 0.15 | | | 24.89 |
| 35 | 80.956 | 5.50 | 1.48749 | 70.2 | 25.64 |
| 36 | −32.606 | 0.85 | 1.88300 | 40.8 | 25.81 |
| 37 | −73.476 | 0.17 | | | 26.39 |
| 38 | 53.019 | 4.61 | 1.48749 | 70.2 | 26.86 |
| 39 | −53.330 | 4.00 | | | 26.77 |
| 40 | ∞ | 33.00 | 1.60859 | 46.4 | 40.00 |
| 41 | ∞ | 13.20 | 1.51633 | 64.1 | 40.00 |
| 42 | ∞ | | | | 40.00 |

Various data
Zoom ratio 19.54

| | Wide angle | Intermediate | Telephoto |
|---|---|---|---|
| Focal length | 7.00 | 18.66 | 136.75 |
| F number | 1.80 | 1.80 | 2.17 |
| Field angle | 38.16 | 16.43 | 2.30 |
| Image height | 5.50 | 5.50 | 5.50 |
| Total lens length | 262.60 | 262.60 | 262.60 |
| BF | 7.51 | 7.51 | 7.51 |
| d11 | 0.40 | 24.63 | 47.01 |
| d18 | 53.12 | 17.36 | 10.35 |
| d21 | 8.06 | 13.02 | 1.68 |
| d25 | 1.72 | 8.28 | 4.26 |
| Entrance pupil position | 45.71 | 113.23 | 647.11 |
| Exit pupil position | 204.88 | 204.88 | 204.88 |
| Front principal point position | 52.96 | 133.65 | 878.61 |
| Rear principal point position | 0.51 | −11.15 | −129.24 |

Zoom lens unit data

| Unit | First surface | Focal length | Lens structure length | Front principal point position | Rear principal point position |
|---|---|---|---|---|---|
| 1 | 1 | 63.00 | 48.74 | 29.66 | 2.60 |
| 2 | 12 | −14.00 | 20.76 | 3.20 | −10.61 |
| 3 | 19 | −43.00 | 2.69 | −0.11 | −1.59 |
| 4 | 22 | 45.00 | 5.72 | 2.62 | −1.04 |
| 5 | 26 | 46.16 | 113.89 | 56.69 | −43.82 |

(Numerical Embodiment 5)

| Surface Number (i) | r | d | nd | vd | Effective diameter |
|---|---|---|---|---|---|
| 1 | −755.347 | 2.30 | 1.72047 | 34.7 | 82.52 |
| 2 | 145.373 | 4.33 | | | 77.56 |
| 3 | 369.343 | 2.30 | 1.75520 | 27.5 | 76.94 |
| 4 | 118.563 | 10.40 | 1.43875 | 95.0 | 74.33 |
| 5 | −276.990 | 0.40 | | | 73.62 |
| 6 | 131.718 | 8.84 | 1.43387 | 95.1 | 71.56 |
| 7 | −255.375 | 6.75 | | | 71.31 |
| 8 | 155.085 | 6.73 | 1.59240 | 68.3 | 69.67 |
| 9 | −423.339 | 0.15 | | | 69.43 |
| 10 | 59.560 | 7.03 | 1.75500 | 52.3 | 64.99 |
| 11 | 142.467 | (Variable) | | | 64.19 |
| 12 | 119.523 | 1.00 | 1.88300 | 40.8 | 24.33 |
| 13 | 13.720 | 5.35 | | | 19.28 |
| 14 | −50.166 | 6.48 | 1.84666 | 23.8 | 18.99 |
| 15 | −11.379 | 0.75 | 1.88300 | 40.8 | 18.68 |
| 16 | 82.736 | 0.18 | | | 18.28 |
| 17 | 26.449 | 2.20 | 1.66680 | 33.0 | 18.38 |
| 18 | 66.763 | (Variable) | | | 18.23 |
| 19 | −28.997 | 0.75 | 1.74320 | 49.3 | 19.55 |
| 20 | 46.522 | 2.88 | 1.84649 | 23.9 | 21.19 |
| 21 | −5964.013 | (Variable) | | | 21.84 |
| 22 (Stop) | ∞ | 1.00 | | | 26.41 |
| 23 | 2830.368 | 3.64 | 1.65844 | 50.9 | 27.19 |
| 24 | −49.377 | 0.15 | | | 27.88 |
| 25 | 288.177 | 3.90 | 1.53172 | 48.8 | 28.72 |
| 26 | −60.383 | 0.15 | | | 29.03 |
| 27 | 88.897 | 5.82 | 1.48749 | 70.2 | 29.07 |
| 28 | −36.965 | 1.00 | 1.88300 | 40.8 | 28.90 |
| 29 | −133.791 | (Variable) | | | 29.21 |
| 30 | 45.023 | 5.93 | 1.48749 | 70.2 | 29.79 |
| 31 | −81.516 | 0.72 | | | 29.57 |
| 32 | 687.959 | 1.00 | 1.88300 | 40.8 | 28.80 |
| 33 | 23.357 | 7.68 | 1.48749 | 70.2 | 27.72 |
| 34 | −94.760 | 0.15 | | | 28.00 |
| 35 | 65.588 | 8.00 | 1.48749 | 70.2 | 28.15 |
| 36 | −24.357 | 1.00 | 1.88300 | 40.8 | 27.93 |
| 37 | −414.432 | 2.32 | | | 29.00 |
| 38 | 114.894 | 6.03 | 1.56732 | 42.8 | 30.19 |
| 39 | −33.513 | 4.00 | | | 30.34 |
| 40 | ∞ | 33.00 | 1.60859 | 46.4 | 40.00 |
| 41 | ∞ | 13.20 | 1.51633 | 64.1 | 40.00 |
| 42 | ∞ | | | | 40.00 |

Various data
Zoom ratio 21.94

| | Wide angle | Intermediate | Telephoto |
|---|---|---|---|
| Focal length | 7.80 | 10.34 | 171.17 |
| F number | 1.80 | 1.80 | 2.67 |
| Field angle | 35.19 | 28.00 | 1.84 |
| Image height | 5.50 | 5.50 | 5.50 |
| Total lens length | 270.39 | 270.39 | 270.39 |
| BF | 8.03 | 8.03 | 8.03 |
| d11 | 0.68 | 6.74 | 51.77 |
| d18 | 52.45 | 34.45 | 6.58 |
| d21 | 5.96 | 8.57 | 1.44 |
| d29 | 35.74 | 45.07 | 35.05 |
| Entrance pupil position | 48.99 | 58.75 | 643.97 |
| Exit pupil position | 205.02 | 123.55 | 215.92 |
| Front principal point position | 57.10 | 70.02 | 956.08 |
| Rear principal point position | 0.23 | −2.32 | −163.14 |

-continued (Numerical Embodiment 5)

Zoom lens unit data

| Unit | First surface | Focal length | Lens structure length | Front principal point position | Rear principal point position |
|---|---|---|---|---|---|
| 1 | 1 | 69.00 | 49.24 | 31.21 | −0.87 |
| 2 | 12 | −13.00 | 15.96 | 1.67 | −9.21 |
| 3 | 19 | −43.00 | 3.63 | −0.06 | −2.04 |
| 4 | 22 | 39.00 | 15.66 | 3.79 | −6.64 |
| 5 | 30 | 50.77 | 83.03 | 17.33 | −41.92 |

(Numerical Embodiment 6)

| Surface Number (i) | r | d | nd | νd | Effective diameter |
|---|---|---|---|---|---|
| 1 | −19301.780 | 3.00 | 1.80610 | 40.9 | 98.26 |
| 2 | 202.516 | 0.88 | | | 98.11 |
| 3 | 194.296 | 13.71 | 1.43387 | 95.1 | 98.59 |
| 4 | −243.941 | 10.21 | | | 98.83 |
| 5 | 188.011 | 7.81 | 1.43387 | 95.1 | 98.33 |
| 6 | 1582.239 | 0.20 | | | 98.01 |
| 7 | 157.477 | 7.02 | 1.43387 | 95.1 | 96.57 |
| 8 | 466.036 | 0.20 | | | 95.93 |
| 9 | 117.921 | 7.91 | 1.43387 | 95.1 | 93.07 |
| 10 | 304.547 | (Variable) | | | 92.10 |
| 11 | 1604.466 | 1.00 | 1.88300 | 40.8 | 32.36 |
| 12 | 21.661 | 7.46 | | | 27.93 |
| 13 | −51.352 | 0.90 | 1.81600 | 46.6 | 27.93 |
| 14 | 307.087 | 0.70 | | | 28.73 |
| 15 | 42.981 | 5.33 | 1.80809 | 22.8 | 30.47 |
| 16 | −91.985 | 0.45 | | | 30.39 |
| 17 | −256.169 | 1.10 | 1.81600 | 46.6 | 29.88 |
| 18 | 102.422 | (Variable) | | | 29.46 |
| 19 | −62.236 | 1.30 | 1.71700 | 47.9 | 29.08 |
| 20 | 69.568 | 2.69 | 1.84649 | 23.9 | 30.50 |
| 21 | 462.652 | (Variable) | | | 30.81 |
| 22 | 1889.513 | 5.28 | 1.60738 | 56.8 | 39.08 |
| 23 | −54.718 | 0.15 | | | 39.59 |
| 24 | 50.333 | 7.92 | 1.51823 | 58.9 | 40.34 |
| 25 | −107.561 | 0.35 | | | 39.91 |
| 26 | 37.750 | 9.01 | 1.48749 | 70.2 | 35.95 |
| 27 | −67.300 | 1.50 | 1.83400 | 37.2 | 34.29 |
| 28 | 48.501 | (Variable) | | | 31.37 |
| 29 (Stop) | ∞ | 1.00 | | | 25.70 |
| 30 | 704.545 | 3.50 | 1.48749 | 70.2 | 25.39 |
| 31 | −45.672 | 1.50 | 1.88300 | 40.8 | 25.07 |
| 32 | 151.874 | 48.91 | | | 24.94 |
| 33 | −101.801 | 5.47 | 1.51742 | 52.4 | 32.08 |
| 34 | −38.679 | 0.15 | | | 32.96 |
| 35 | 537.796 | 1.20 | 1.77250 | 49.6 | 32.80 |
| 36 | 129.740 | 5.30 | 1.51742 | 52.4 | 32.70 |
| 37 | −60.602 | 0.40 | | | 32.67 |
| 38 | 50.575 | 7.42 | 1.51742 | 52.4 | 31.01 |
| 39 | −40.018 | 1.20 | 1.88300 | 40.8 | 30.13 |
| 40 | 81.560 | 0.15 | | | 29.20 |
| 41 | 31.270 | 5.90 | 1.48749 | 70.2 | 29.20 |
| 42 | 152.056 | 3.80 | | | 28.21 |
| 43 | ∞ | 33.00 | 1.60859 | 46.4 | 40.00 |
| 44 | ∞ | 13.20 | 1.51680 | 64.2 | 40.00 |
| 45 | ∞ | | | | 40.00 |

Various data
Zoom ratio 37.12

| | Wide angle | Intermediate | Telephoto |
|---|---|---|---|
| Focal length | 10.50 | 56.74 | 389.75 |
| F number | 2.00 | 2.00 | 4.00 |
| Field angle | 27.65 | 5.54 | 0.81 |
| Image height | 5.50 | 5.50 | 5.50 |
| Total lens length | 392.33 | 392.33 | 392.33 |
| BF | 9.84 | 9.84 | 9.84 |
| d10 | 1.11 | 87.62 | 123.45 |
| d18 | 128.18 | 21.70 | 9.43 |
| d21 | 10.75 | 27.82 | 2.17 |
| d28 | 14.29 | 17.19 | 19.28 |
| Entrance pupil position | 68.70 | 458.96 | 3097.67 |
| Exit pupil position | 302.02 | 302.02 | 302.02 |
| Front principal point position | 79.58 | 526.72 | 4007.33 |
| Rear principal point position | −0.66 | −46.90 | −379.91 |

Zoom lens unit data

| Unit | First surface | Focal length | Lens structure length | Front principal point position | Rear principal point position |
|---|---|---|---|---|---|
| 1 | 1 | 160.00 | 50.92 | 28.15 | −9.50 |
| 2 | 11 | −23.60 | 16.94 | 0.75 | −12.27 |
| 3 | 19 | −86.80 | 3.99 | 0.23 | −1.97 |
| 4 | 22 | 43.00 | 24.21 | −3.77 | −16.30 |
| 5 | 29 | 46.41 | 132.10 | 54.50 | −10.85 |

TABLE 1

Correspondence values of conditional expressions in
Numerical Embodiments 1 to 6

| Conditional Number | expression | Embodiment 1 | Embodiment 2 | Embodiment 3 | Embodiment 4 | Embodiment 5 | Embodiment 6 |
|---|---|---|---|---|---|---|---|
| (1) | fz | 20.67 | 16.45 | 10.51 | 18.66 | 10.34 | 56.74 |
| (2) | β2z/β2w/Z | 0.09 | 0.09 | 0.06 | 0.10 | 0.05 | 0.09 |
| (3) | |f1/f2| | 5.18 | 5.25 | 5.15 | 4.5 | 5.31 | 6.78 |
| (4) | |f1/f3| | 1.25 | 1.29 | 1.27 | 1.47 | 1.6 | 1.84 |
| (5) | f1/f4 | 1.49 | 1.54 | 1.49 | 1.4 | 1.77 | 3.72 |
| (6) | fw/φ | 0.71 | 0.73 | 0.73 | 0.64 | 0.71 | 0.95 |
| (7) | Z | 21.88 | 17.00 | 20.65 | 19.54 | 21.94 | 37.12 |

According to the embodiments described above, it is possible to obtain the zoom lens having a wide field angle, a high zoom ratio, and high optical performance in the entire zoom range.

Next, Embodiments 7 and 13 of the present invention are described. In the embodiments, the fourth lens unit is moved, more specifically, the fourth lens unit is moved from the object side to the image side so as to perform a focusing operation over the object distances of infinity to proximity.

The following embodiments define that the fourth lens unit, which is a zooming unit, performs focusing. The fourth lens unit is disposed on the object side with respect to the optical system for converting the focal length, and hence its movement amount accompanying focusing is not changed by attachment or detachment of the optical system for converting the focal length. Further, object point variation of the fourth lens unit due to object distance variation is suppressed by the second and third lens units each having a negative refractive power, and hence the movement amount of the fourth lens unit is small. Accordingly, the structure of the first lens unit may be simplified without increasing the dead space in the fourth lens unit and fifth lens unit, to thereby achieve a zoom lens of small size and light weight.

Further, by defining the movement locus of the third lens unit, conditions for reducing the effective diameter of the first lens unit are defined.

In the embodiments, the second lens unit moves to the image side from the wide angle end to the telephoto end, while the third lens unit moves so as to take a locus convex toward the object side, and, when fw denotes a focal length at the wide angle end, Z denotes a zoom ratio, and fz denotes a focal length at a zoom position where the third lens unit moves to the position closest to the object side, the following conditional expression (1) is satisfied similarly to the above-mentioned embodiments.

$$fw \times Z^{0.07} < fz < fw \times Z^{0.5} \qquad (1)$$

A zoom lens having the basic structure described above is described.

Figure 29:
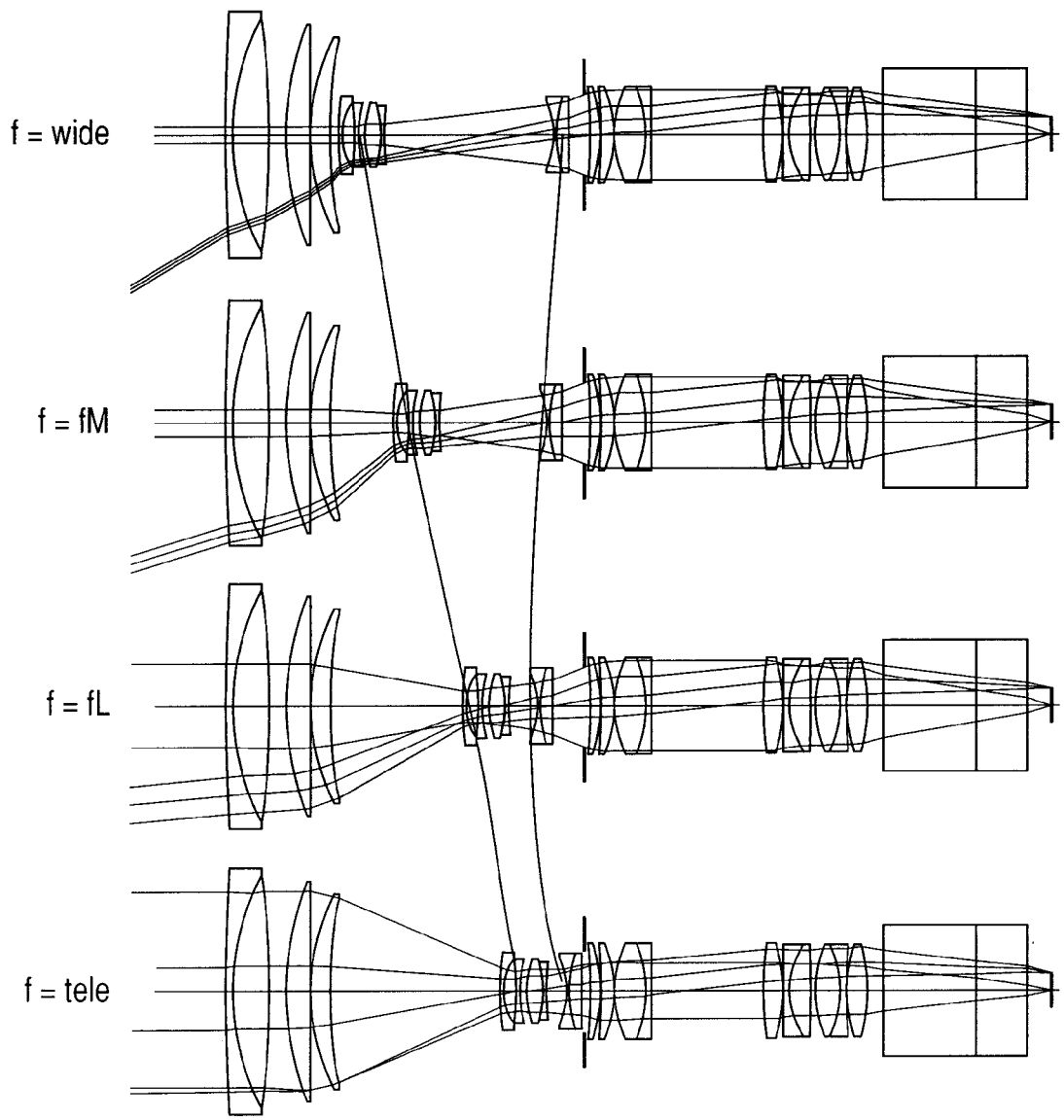
FIG. 29 is an optical path diagram of a conventional four-unit zoom lens.

First, referring to FIG. 29, a conventional four-unit zoom lens is described. FIG. 29 is an optical path diagram of the conventional four-unit zoom lens. In order to perform an operation of increasing the magnification at the wide angle side in the conventional four-unit zoom lens, it is necessary to move a second lens unit largely to the image side. This increases an interval between a first lens unit and the second lens unit, and hence an incident height of an off-axis light beam on the first lens unit increases. For this reason, the incident height of the off-axis light beam on the first lens unit becomes highest at the zoom position fM a little closer to the telephoto side from the wide angle end, and a diameter of the first lens unit is determined. In addition, in the conventional four-unit zoom lens, a moving locus of a third lens unit is determined uniquely for image point compensation. Specifically, the third lens unit moves so as to take a locus convex toward the object side, and becomes closest to the object side at a zoom position fL where an imaging magnification of the second lens unit passes through −1 point.

If the zooming unit is constituted of three movable units, it is preferred to adopt a structure in which the image point is compensated by the fourth lens unit, so that a moving locus of the third lens unit can be set arbitrarily.

In the present invention, the third lens unit at the zoom position fM moves closer to the object side in the locus thereof. When the third lens unit moves closer to the object side, a magnification increasing effect by the third lens unit can be obtained. By the magnification increasing effect by the third lens unit, a magnification increasing contribution value of the second lens unit is reduced, so that a movement amount of the second lens unit can be reduced. As a result, the incident height of the off-axis light beam on the first lens unit at the zoom position fM is decreased, so that the diameter of the first lens unit can be reduced. In addition, when the diameter is reduced, a lens thickness is also reduced consequently. Therefore, the size and weight of the first lens unit that is dominant in the lens mass can be reduced.

Figure 28:
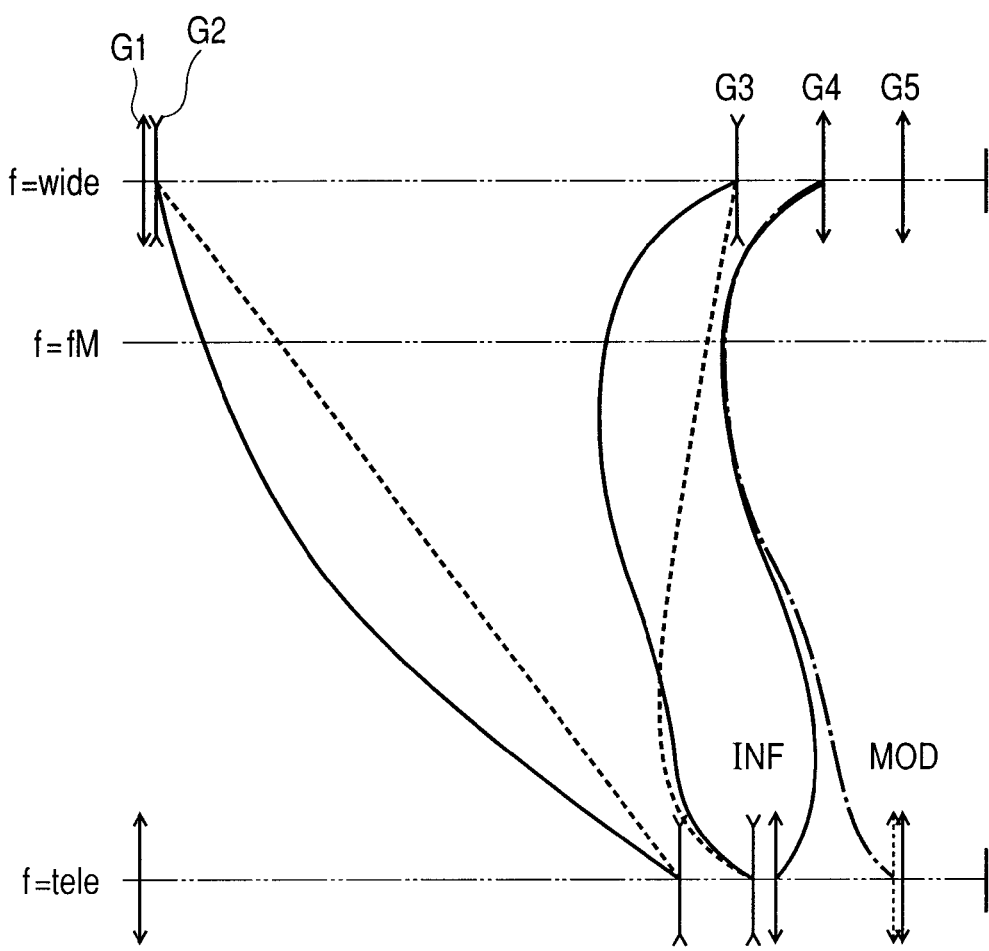
FIG. 28 is an explanatory diagram of a paraxial refractive power arrangement of a zoom lens according to Embodiments 7 to 13 of the present invention.

FIG. 28 is an explanatory diagram of a paraxial refractive power arrangement of a zoom lens described in the following embodiments. In FIG. 28, the moving loci of the second lens unit G2, the third lens unit G3, and the fourth lens unit G4 at an object distance of infinity from the wide angle end to the telephoto end according to the present invention are illustrated by the solid lines, and the moving locus of the fourth lens unit G4 at an object distance of proximity is illustrated by the dashed line. In addition, the moving loci of the second lens unit G2 and the third lens unit G3 in the conventional four-unit zoom lens are illustrated by the dot lines.

It can be seen that, in Embodiments 7 to 13, the fourth lens unit moves from the object side to the image side over the range from the wide angle end to the telephoto end at the time of short-distance image taking. It can also be seen that the movement amount of the second lens unit is decreased while the movement amount of the third lens unit is increased at the zoom position fM with respect to the conventional four-unit zoom lens.

Hereinafter, conditional expressions of the following embodiments are described again in detail.

The above-mentioned conditional expression (1) defines a range of the focal length fz of the entire system at the zoom position where the third lens unit moves to the position closest to the object side. When the focal length fz is set to the vicinity of the zoom position fM, size and weight of the first lens unit can be reduced.

Above the upper limit of the conditional expression (1), the effect of reducing the diameter of the first lens unit is decreased, and it is difficult to achieve small size and light weight.

Below the lower limit of the conditional expression (1), the third lens unit moves rapidly on the wide angle side so that variations of spherical aberration and coma aberration increase. As a result, it becomes difficult to suppress the aberrations.

Further, the present invention defines that the optical system for converting the focal length is detachably disposed inside the fifth lens unit. In a zoom lens without the optical system for converting the focal length, the fifth lens unit may be used for focusing. As a result, the significant effects of the present invention cannot be obtained.

Further, the imaging magnification of the second lens unit at the wide angle end and at the zoom position fz is defined. When the imaging magnification of the second lens unit at the wide angle end is denoted by $\beta 2w$, and the imaging magnification of the second lens unit at the zoom position fz is denoted by $\beta 2z$, a conditional expression (2') similar to the above-mentioned conditional expression is satisfied.

$$0.04 < \beta 2z/\beta 2w/Z < 0.12 \qquad (2')$$

Above the upper limit of the conditional expression (2'), the magnification increasing contribution value of the second lens unit at the zoom position fz is increased, so that the movement amount of the second lens unit is increased. Thus, the interval between the first lens unit and the second lens unit is increased, so that the incident height of the off-axis light beam on the first lens unit is increased disadvantageously.

Below the lower limit value of the conditional expression (2'), the magnification increasing contribution value of the second lens unit becomes too small. Therefore, it is necessary to increase excessively the magnification increasing contribution value of the third lens unit. Thus, it is necessary to move the third lens unit rapidly. As a result, variations of spherical aberration and coma aberration increase, and it is difficult to suppress the aberrations.

Further, the present invention also defines the ratios of the focal lengths of the second lens unit, the third lens unit, and the fourth lens unit to the focal length of the first lens unit.

Specifically, when the focal length of the first lens unit is denoted by f1, the focal length of the second lens unit is denoted by f2, the focal length of the third lens unit is denoted by f3, and the focal length of the fourth lens unit is denoted by f4, conditional expressions (3) to (5) similar to the conditional expressions of the above-mentioned embodiments are satisfied.

$$4.0<|f1/f2|<7.0 \quad (3)$$

$$1.1<|f1/f3|<2.5 \quad (4)$$

$$0.9<|f1/f4|<4.0 \quad (5)$$

The refractive power of each lens unit is defined by a reciprocal of the focal length of each lens unit.

Above the upper limit of the conditional expression (3), the refractive power of the second lens unit becomes too large relative to the refractive power of the first lens unit. As a result, variations of various aberrations increase, and it is difficult to compensate for the various aberrations.

Below the lower limit of the conditional expression (3), the refractive power of the second lens unit is too small relative to the refractive power of the first lens unit. As a result, it is difficult to achieve an increase in magnification.

Above the upper limit of the conditional expression (4), the refractive power of the third lens unit becomes too large relative to the refractive power of the first lens unit. As a result, variations of the spherical aberration and the coma aberration increase, and it is difficult to compensate for the aberrations.

Below the lower limit of the conditional expression (4), the refractive power of the third lens unit becomes too small relative to the refractive power of the first lens unit. As a result, the magnification increasing contribution value of the third lens unit at the zoom position fz is decreased disadvantageously. Therefore, the diameter of the first lens unit increases disadvantageously.

Above the upper limit of the conditional expression (5), the refractive power of the fourth lens unit becomes too large relative to the refractive power of the first lens unit. As a result, variations of the spherical aberration and the coma aberration increase, and it is difficult to compensate for the aberrations.

Below the lower limit of the conditional expression (5), the refractive power of the fourth lens unit becomes too small relative to the refractive power of the first lens unit. As a result, the movement amount for image point compensation increases, and it is difficult to achieve small size and light weight.

The present invention also defines the preferred ranges of the focal length of the entire system at the wide angle end and the zoom ratio. When a diagonal length of the image pickup element is denoted by $\phi$, similarly to the conditional expressions described above, the following conditional expressions (6) and (7) are satisfied.

$$0.45<fw/\phi \quad (6)$$

$$7<Z \quad (7)$$

Below the lower limit of the conditional expression (6), the field angle at the wide angle end becomes too large. In addition, the diameter of the first lens unit is determined at the wide angle end. Therefore, the effects of the present invention cannot be obtained.

It is more preferred in the following embodiments that the conditional expression (6) satisfy the following range.

$$0.63<fw/\phi<1.10 \quad (6a')$$

Below the lower limit of the conditional expression (7), the reduction in size and weight can be achieved even with the conventional structure, and the effects of the present invention cannot be obtained.

Further, the present invention defines that the image pickup apparatus including the above-mentioned zoom lens is also encompassed by the present invention.

FIG. 14 is a lens cross-sectional view at a wide angle end according to Numerical Embodiment 7 as Embodiment 7 of the present invention. FIGS. 15A, 15B, 15C, 15D, and 15E are aberration diagrams for various conditions at the wide angle end, at a focal length fz of 14.77 mm, and at a telephoto end of Numerical Embodiment 7.

Note that, in numerical embodiments, r indicates a curvature radius, d indicates a lens thickness or a lens interval, nd indicates a refractive index at the wavelength of 546 nm, vd indicates an Abbe number, and * indicates an aspherical surface. The aspherical surface is defined by the following expression.

$$x=cy^2/[1+[1-(1+K)c^2y^2]^{1/2}]+A_3y^3+A_4y^4+A_5y^5+A_6y^6+A_7y^7+A_8y^8+A_9y^9..$$

provided that c denotes a curvature (1/r), y denotes a height from the optical axis, K denotes a constant of the cone, and A3, A4, A5, A6 . . . are aspherical coefficients of each order.

Further, in the aberration diagrams, e-lines and g-lines of axial chromatic aberration diagrams and lateral chromatic aberration diagrams are aberrations with respect to the wavelengths of 546 nm and 436 nm, respectively. $\Delta S$ denotes a sagittal image plane, and $\Delta M$ denotes a meridional image plane. Further, in the diagrams, Fno denotes an F number, and $\omega$ denotes a half field angle)(°).

In FIG. 14, the zoom lens includes: a first lens unit G1 which is a lens unit having a positive refractive power; a second lens unit G2 which is a variator having a negative refractive power for zooming and is moved on the optical axis to the image plane side, so that zooming from the wide angle end to the telephoto end is performed; a third lens unit G3 which is a variator having a negative refractive power for zooming and moves so as to take a locus convex toward the object side from the wide angle end to the telephoto end; and a fourth lens unit G4 which is a compensator having a negative refractive power, which moves non-linearly on the optical axis for compensating for image plane variation due to zooming. In this embodiment of the present invention, the lens unit which compensates for the image plane variation is the fourth lens unit G4, but the third lens unit G3 may be the lens unit for compensating for image plane variation. By moving the fourth lens unit G4 by 10.12 mm to the image side for focusing, it is possible to perform a focusing operation from the vertex of the first lens unit G1 to the object distance of 0.8 m at the telephoto end. The zoom lens further includes: an aperture stop SP; and a fifth lens unit G5 which is a relay unit having a positive refractive power with an imaging function. A converter for converting a focal length may be disposed in an air interval of the fifth lens unit G5. The zoom lens further includes: a color separation prism or an optical filter P, which is illustrated as a glass block in the diagram; and an image plane I. Table 2 shows correspondence values of conditional expressions in this embodiment. In this numerical embodiment, all the conditional expressions are satisfied, and hence good optical performance is achieved while achieving reductions in size and weight with the wide angle and high magnification measured as the focal length at the wide angle end of 8.0 mm and the zoom ratio of 20.87.

(Numerical Embodiment 7)

| Surface number | r | d | nd | vd | Effective diameter |
|---|---|---|---|---|---|
| 1 | 368.794 | 2.54 | 2.00069 | 25.46 | 72.72 |
| 2 | 90.833 | 4.88 | | | 70.63 |
| 3 | 100.134 | 11.23 | 1.49700 | 81.5 | 72.08 |
| 4 | −240.899 | 3.34 | | | 71.99 |
| 5 | 97.198 | 8.19 | 1.60300 | 65.4 | 69.16 |
| 6 | −1316.184 | 0.23 | | | 68.58 |
| 7 | 59.850 | 6.68 | 1.75500 | 52.3 | 61.88 |
| 8 | 154.022 | (Variable) | | | 61.03 |
| 9* | 804.875 | 0.95 | 1.88300 | 40.8 | 26.24 |
| 10 | 13.904 | 6.28 | | | 20.40 |
| 11 | −38.917 | 6.12 | 1.80809 | 22.8 | 20.17 |
| 12 | −12.570 | 0.71 | 1.88300 | 40.8 | 20.16 |
| 13 | −112.709 | 0.17 | | | 20.67 |
| 14 | 29.756 | 2.05 | 1.66680 | 33.0 | 20.71 |
| 15 | 50.381 | (Variable) | | | 20.37 |
| 16 | −30.657 | 0.71 | 1.75700 | 47.8 | 18.44 |
| 17 | 48.100 | 2.58 | 1.84649 | 23.9 | 19.68 |
| 18 | −17017.414 | (Variable) | | | 20.23 |
| 19 | −115.541 | 3.18 | 1.64000 | 60.1 | 25.15 |
| 20 | −41.034 | 0.14 | | | 26.01 |
| 21 | 118.092 | 3.19 | 1.51633 | 64.1 | 27.18 |
| 22 | −104.777 | (Variable) | | | 27.43 |
| 23 | ∞ | 1.90 | | | 28.54 |
| (Stop) | | | | | |
| 24 | 47.423 | 6.58 | 1.51742 | 52.4 | 29.03 |
| 25 | −45.172 | 0.95 | 1.83400 | 37.2 | 28.75 |
| 26 | −5163.262 | 36.00 | | | 28.76 |
| 27 | 252.852 | 4.35 | 1.53172 | 48.8 | 28.72 |
| 28 | −51.705 | 0.15 | | | 28.64 |
| 29 | 188.076 | 0.76 | 1.83400 | 37.2 | 27.61 |
| 30 | 24.393 | 5.22 | 1.50127 | 56.5 | 26.46 |
| 31 | 400.804 | 0.15 | | | 26.57 |
| 32 | 35.434 | 13.95 | 1.48749 | 70.2 | 27.05 |
| 33 | −27.854 | 0.80 | 1.88300 | 40.8 | 25.85 |
| 34 | 219.767 | 0.40 | | | 26.31 |
| 35 | 46.653 | 5.50 | 1.56732 | 42.8 | 26.92 |
| 36 | −51.155 | 4.28 | | | 26.88 |
| 37 | ∞ | 33.00 | 1.60859 | 46.4 | 40.00 |
| 38 | ∞ | 13.20 | 1.51633 | 64.1 | 40.00 |
| 39 | ∞ | | | | 40.00 |
| Image plane | ∞ | | | | |

Aspherical surface data
Ninth surface $\kappa = -7.30269e+004$  $A4 = 2.35118e-005$  $A6 = -1.36122e-007$
$A8 = -5.91701e-010$  $A10 = -5.00012e-012$  $A12 = 1.57249e-014$
$A3 = 1.11462e-005$  $A5 = -7.04812e-007$  $A7 = 1.01416e-008$
$A9 = 1.05593e-010$  $A11 = -2.43833e-013$ Various data
Zoom ratio 20.87

| | Wide angle | Intermediate | Telephoto |
|---|---|---|---|
| Focal length | 8.00 | 14.77 | 166.98 |
| F number | 1.90 | 1.89 | 2.70 |
| Field angle | 34.51 | 20.42 | 1.89 |
| Image height | 5.50 | 5.50 | 5.50 |

-continued (Numerical Embodiment 7)

| Total lens length | 269.38 | 269.38 | 269.38 |
|---|---|---|---|
| BF | 8.00 | 8.00 | 8.00 |
| d8 | 1.07 | 17.78 | 50.23 |
| d15 | 54.39 | 24.79 | 6.75 |
| d18 | 7.94 | 11.85 | 2.13 |
| d22 | 7.62 | 16.60 | 11.91 |
| Entrance pupil position | 43.04 | 82.74 | 817.70 |
| Exit pupil position | 1384.90 | 1384.90 | 1384.90 |
| Front principal point position | 51.08 | 97.68 | 1004.93 |
| Rear principal point position | 0.00 | −6.77 | −158.98 |

Zoom lens unit data

| Unit | First surface | Focal length | Lens structure length | Front principal point position | Rear principal point position |
|---|---|---|---|---|---|
| 1 | 1 | 69.00 | 37.09 | 21.63 | −2.68 |
| 2 | 9 | −13.79 | 16.27 | 0.80 | −11.24 |
| 3 | 16 | −43.88 | 3.30 | −0.04 | −1.84 |
| 4 | 19 | 51.19 | 6.52 | 3.06 | −1.10 |
| 5 | 23 | 53.73 | 127.18 | 55.81 | −58.20 |

Figure 16:
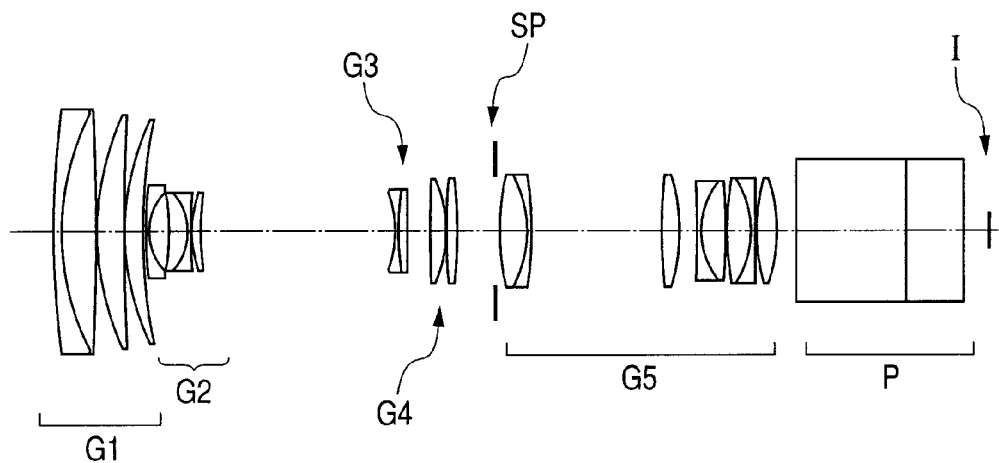
FIG. 16 is a lens cross-sectional view at a wide angle end according to Embodiment 8.
Figure 17A:
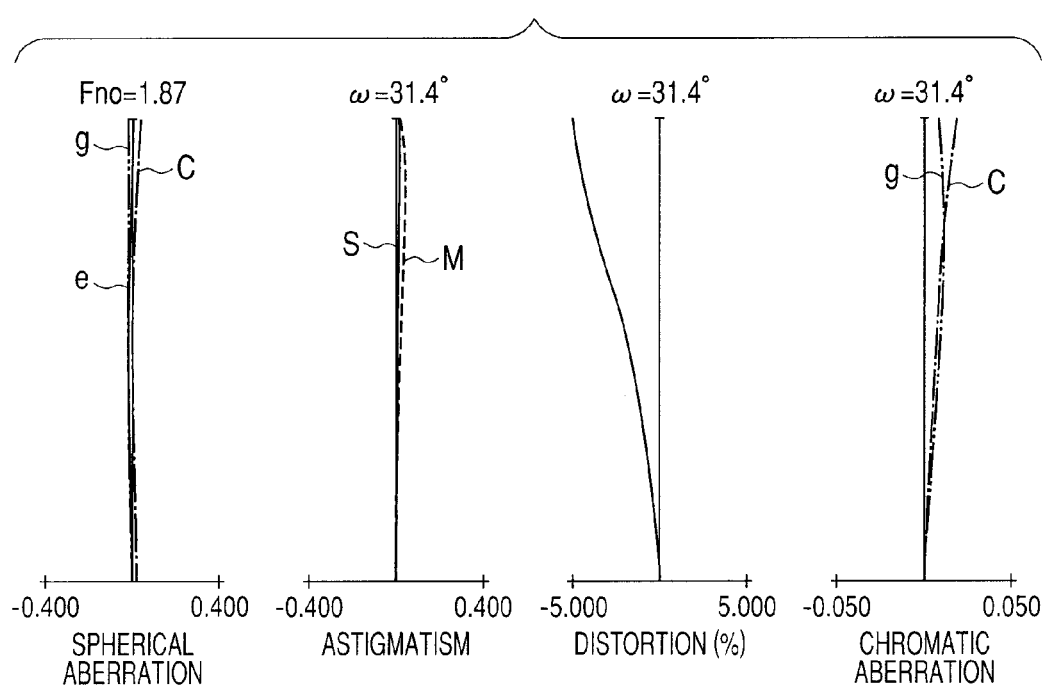
FIGS. 17A, 17B, 17C, 17D, and 17E are aberration diagrams at the wide angle end and an object distance of 3.0 m, at a focal length fz of 17.84 mm and the object distance of 3.0 m, at a telephoto end and the object distance of 3.0 m, at the telephoto end and an object distance of infinity, and at the telephoto end and an object distance of proximity (0.9 m), respectively, according to Embodiment 8.
Figure 17B:
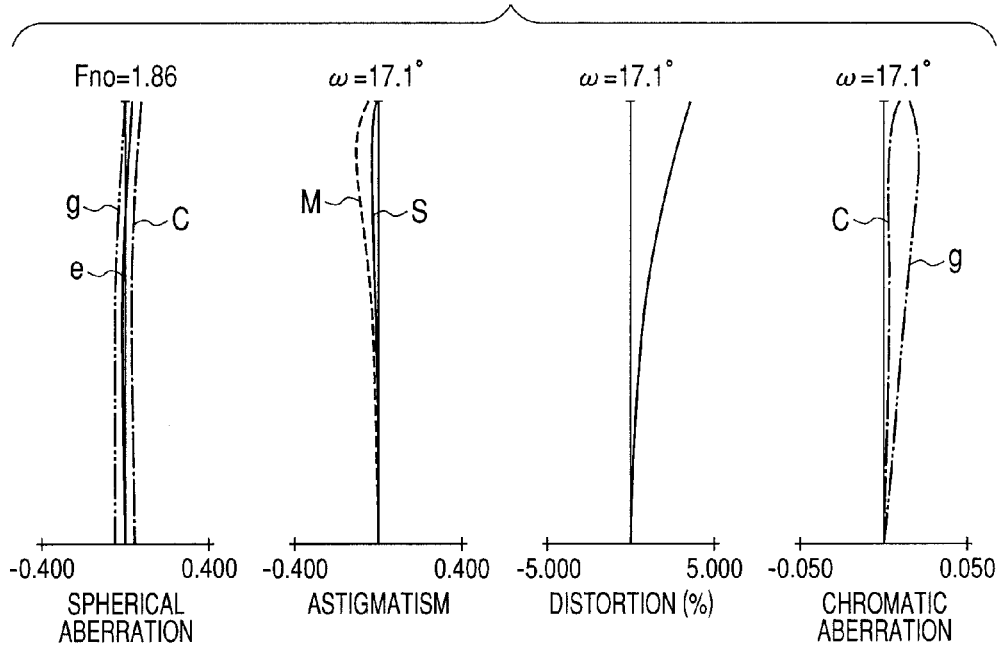
Figure 17C:
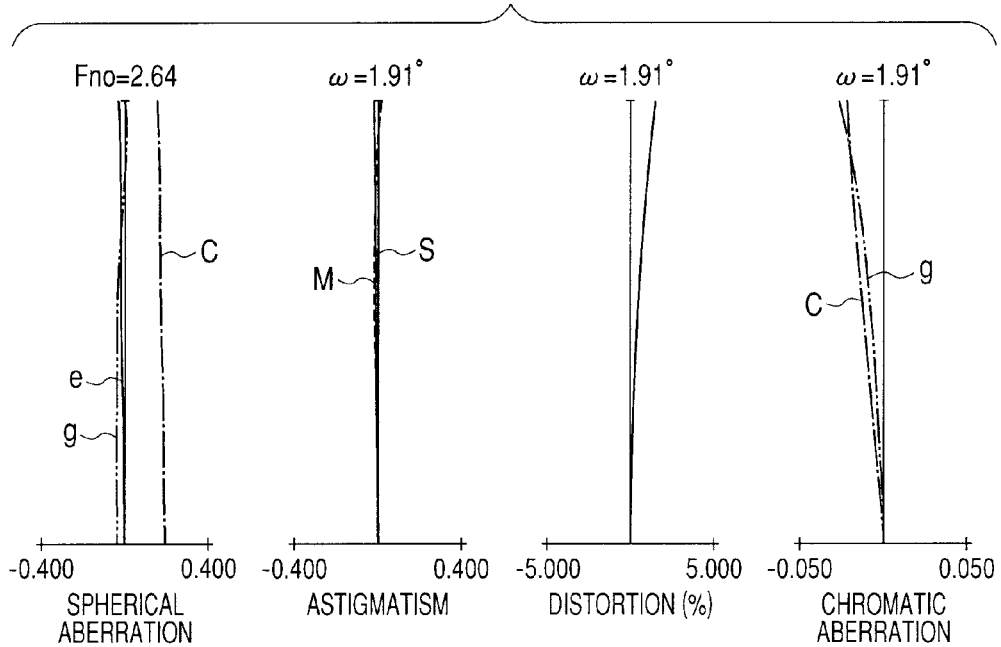
Figure 17D:
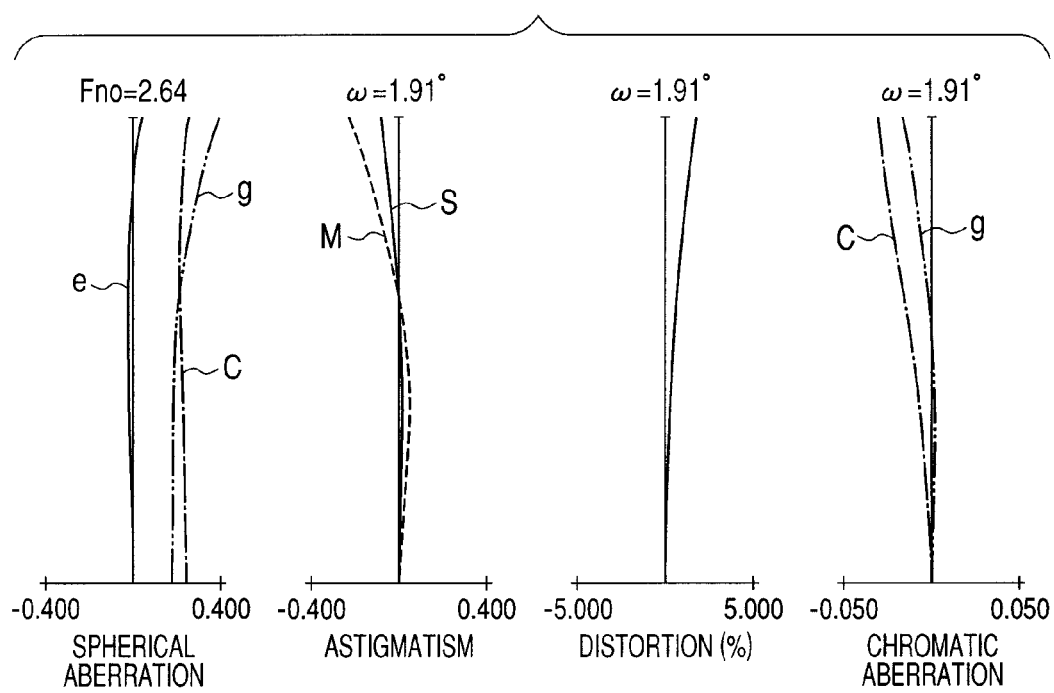
Figure 17E:
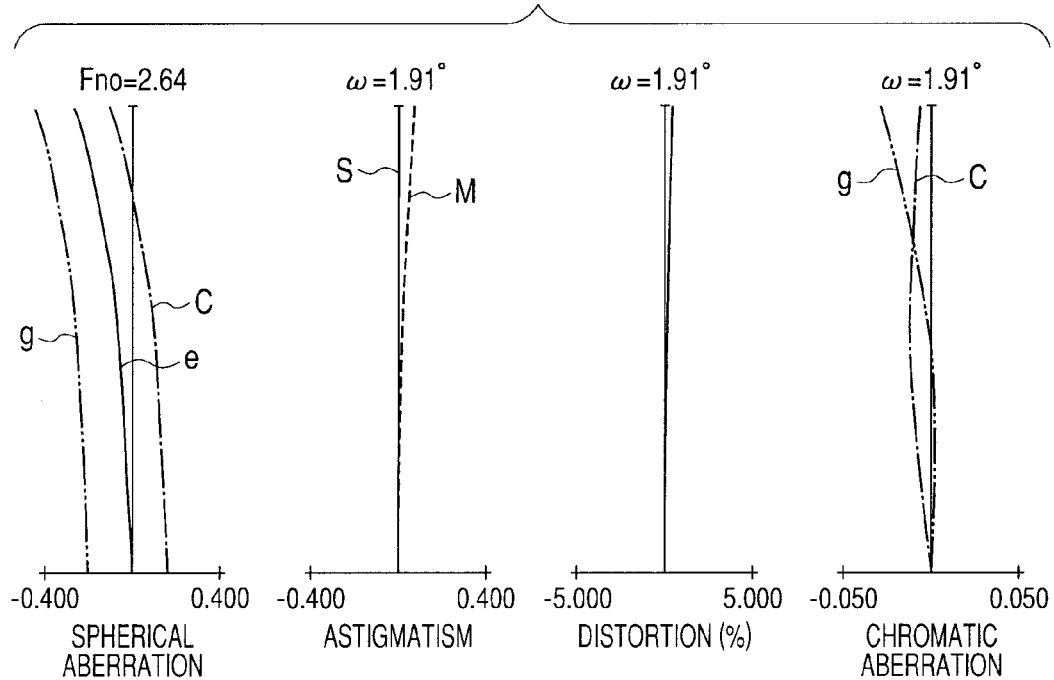

FIG. 16 is a lens cross-sectional view at a wide angle end according to Numerical Embodiment 8 as Embodiment 8 of the present invention. FIGS. 17A, 17B, 17C, 17D, and 17E are aberration diagrams for various conditions at the wide angle end, at a focal length fz of 17.84 mm, and at a telephoto end of Numerical Embodiment 8.

In FIG. 16, the zoom lens includes: a first lens unit G1 which is a lens unit having a positive refractive power; a second lens unit G2 which is a variator having a negative refractive power for zooming and is moved on the optical axis to the image plane side, so that zooming from the wide angle end to the telephoto end is performed; a third lens unit G3 which is a variator having a negative refractive power for zooming and moves so as to take a locus convex toward the object side from the wide angle end to the telephoto end; and a fourth lens unit G4 which is a compensator having a negative refractive power, which moves non-linearly on the optical axis for compensating for image plane variation due to zooming. In this embodiment of the present invention, the lens unit which compensates for the image plane variation is the fourth lens unit G4, but the third lens unit G3 may be the lens unit for compensating for image plane variation. By moving the fourth lens unit G4 by 8.56 mm to the image side for focusing, it is possible to perform a focusing operation from the vertex of the first lens unit G1 to the object distance of 0.9 m at the telephoto end. The zoom lens further includes: an aperture stop SP; and a fifth lens unit G5 which is a relay unit having a positive refractive power with an imaging function. A converter for converting a focal length may be disposed in an air interval of the fifth lens unit G5. The zoom lens further includes: a color separation prism or an optical filter P, which is illustrated as a glass block in the diagram; and an image plane I.

Table 2 shows correspondence values of conditional expressions in this embodiment. In this numerical embodiment, all the conditional expressions are satisfied, and hence good optical performance is achieved while achieving reductions in size and weight with the wide angle and high magnification measured as the focal length at the wide angle end of 9.0 mm and the zoom ratio of 18.30.

(Numerical Embodiment 8)

| Surface number | r | d | nd | vd | Effective diameter |
|---|---|---|---|---|---|
| 1 | 239.363 | 2.20 | 1.75520 | 27.5 | 64.57 |
| 2 | 69.351 | 9.58 | 1.48749 | 70.2 | 62.30 |
| 3 | −602.651 | 0.15 | | | 62.17 |
| 4 | 72.682 | 7.26 | 1.60300 | 65.4 | 61.79 |
| 5 | 480.378 | 0.15 | | | 61.34 |
| 6 | 67.458 | 4.92 | 1.77250 | 49.5 | 58.62 |
| 7 | 143.393 | (Variable) | | | 57.84 |
| 8 | 152.912 | 0.75 | 2.00069 | 25.5 | 23.70 |
| 9 | 14.726 | 5.69 | | | 19.68 |
| 10 | −53.114 | 4.84 | 1.92286 | 18.9 | 19.34 |
| 11 | −15.744 | 0.70 | 1.88300 | 40.8 | 19.38 |
| 12 | 75.034 | 0.45 | | | 19.27 |
| 13 | 29.992 | 2.37 | 1.80809 | 22.8 | 19.55 |
| 14 | 88.684 | (Variable) | | | 19.29 |
| 15 | −31.536 | 0.75 | 1.80440 | 39.6 | 19.05 |
| 16 | 65.500 | 2.39 | 1.92286 | 18.9 | 20.29 |
| 17 | −1479.230 | (Variable) | | | 20.86 |
| 18 | 372.243 | 4.34 | 1.50127 | 56.5 | 25.63 |
| 19 | −35.011 | 0.15 | | | 26.31 |
| 20 | 326.759 | 2.94 | 1.51633 | 64.1 | 27.08 |
| 21 | −120.463 | (Variable) | | | 27.35 |
| 22 (Stop) | ∞ | 1.50 | | | 28.38 |
| 23 | 72.445 | 7.23 | 1.50127 | 56.5 | 28.66 |
| 24 | −31.096 | 1.10 | 1.83400 | 37.2 | 28.49 |
| 25 | −99.101 | 35.57 | | | 28.94 |
| 26 | 97.678 | 4.97 | 1.51633 | 64.1 | 28.48 |
| 27 | −53.578 | 4.86 | | | 28.26 |
| 28 | −249.970 | 1.20 | 1.83400 | 37.2 | 25.21 |
| 29 | 21.347 | 6.48 | 1.56732 | 42.8 | 24.78 |
| 30 | −194.066 | 0.50 | | | 25.11 |
| 31 | 75.579 | 6.53 | 1.51633 | 64.1 | 25.45 |
| 32 | −25.110 | 1.20 | 1.83400 | 37.2 | 25.43 |
| 33 | 959.411 | 0.30 | | | 26.37 |
| 34 | 49.106 | 5.58 | 1.57501 | 41.5 | 27.19 |
| 35 | −42.099 | 5.00 | | | 27.23 |
| 36 | ∞ | 30.00 | 1.60342 | 38.0 | 40.00 |
| 37 | ∞ | 16.20 | 1.51633 | 64.2 | 40.00 |
| 38 | ∞ | | | | 40.00 |
| Image plane | ∞ | | | | |

Various data
Zoom ratio 18.30

| | Wide angle | Intermediate | Telephoto |
|---|---|---|---|
| Focal length | 9.00 | 17.84 | 164.70 |
| F number | 1.87 | 1.86 | 2.64 |
| Field angle | 31.43 | 17.13 | 1.91 |
| Image height | 5.50 | 5.50 | 5.50 |
| Total lens length | 254.98 | 254.98 | 254.98 |
| BF | 7.00 | 7.00 | 7.00 |
| d7 | 1.02 | 20.37 | 51.39 |
| d14 | 52.53 | 23.62 | 5.95 |
| d17 | 6.36 | 10.40 | 2.44 |
| d21 | 10.22 | 15.74 | 10.36 |
| Entrance pupil position | 36.54 | 89.78 | 798.05 |
| Exit pupil position | 419.15 | 419.15 | 419.15 |
| Front principal point position | 45.74 | 108.40 | 1028.56 |
| Rear principal point position | −2.00 | −10.84 | −157.70 |

Zoom lens unit data

| Unit | First surface | Focal length | Lens structure length | Front principal point position | Rear principal point position |
|---|---|---|---|---|---|
| 1 | 1 | 75.00 | 24.26 | 8.55 | −6.67 |
| 2 | 8 | −14.09 | 14.80 | 0.72 | −10.01 |
| 3 | 15 | −43.34 | 3.14 | −0.08 | −1.73 |
| 4 | 18 | 46.77 | 7.43 | 3.15 | −1.85 |
| 5 | 22 | 54.07 | 128.22 | 60.98 | −57.96 |

Figure 18:
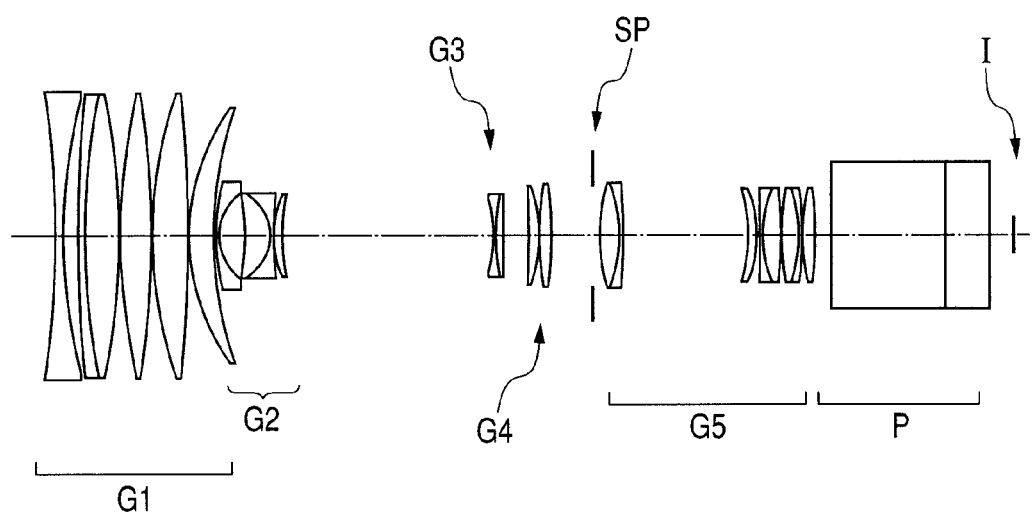
FIG. 18 is a lens cross-sectional view at a wide angle end according to Embodiment 9.
Figure 19A:
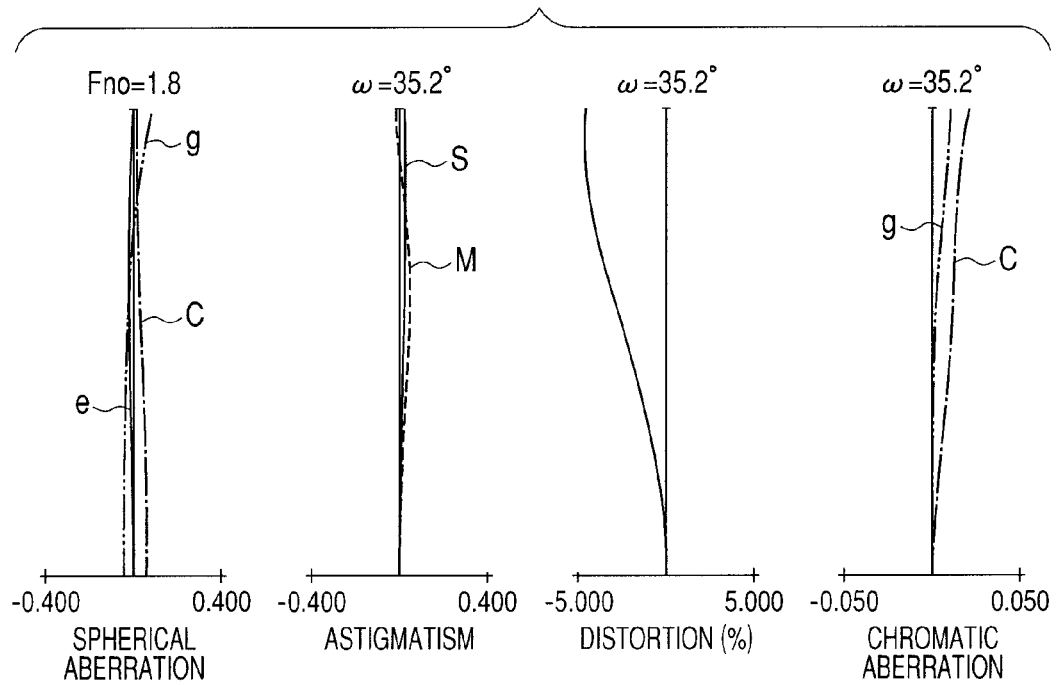
FIGS. 19A, 19B, 19C, 19D, and 19E are aberration diagrams at the wide angle end and an object distance of 2.5 m, at a focal length fz of 16.41 mm and the object distance of 2.5 m, at a telephoto end and the object distance of 2.5 m, at the telephoto end and an object distance of infinity, and at the telephoto end and an object distance of proximity (0.8 m), respectively, according to Embodiment 9.
Figure 19B:
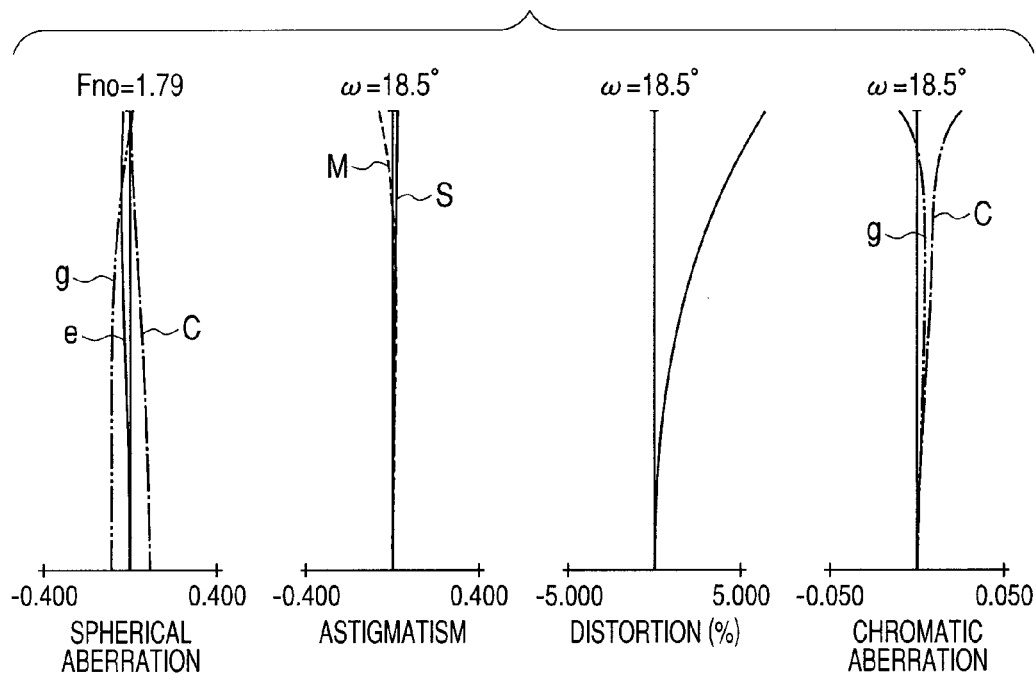
Figure 19C:
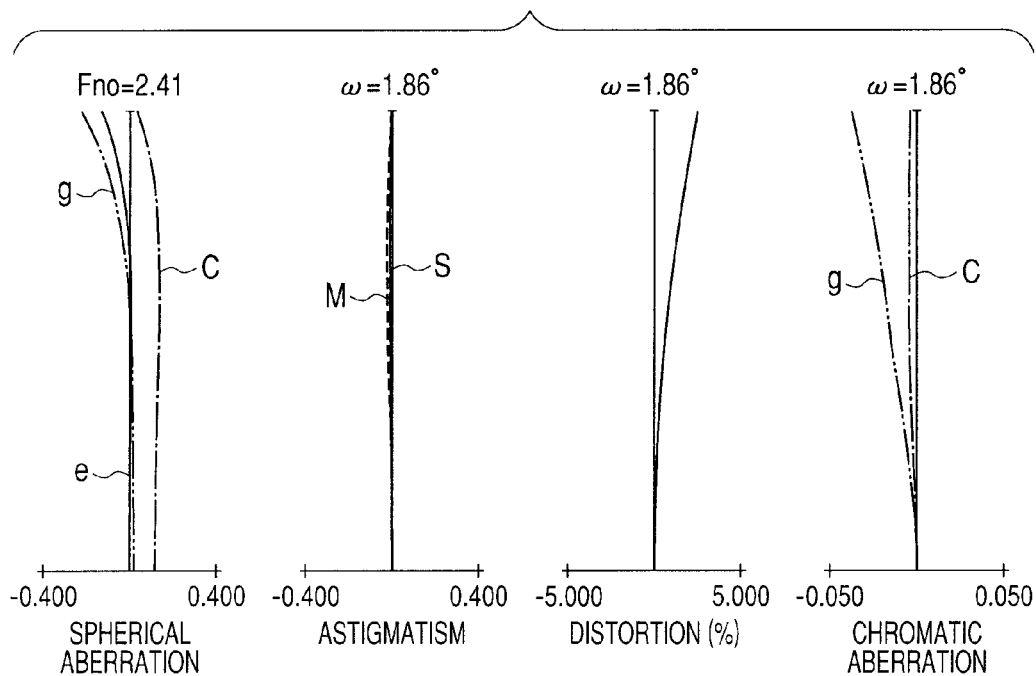
Figure 19D:
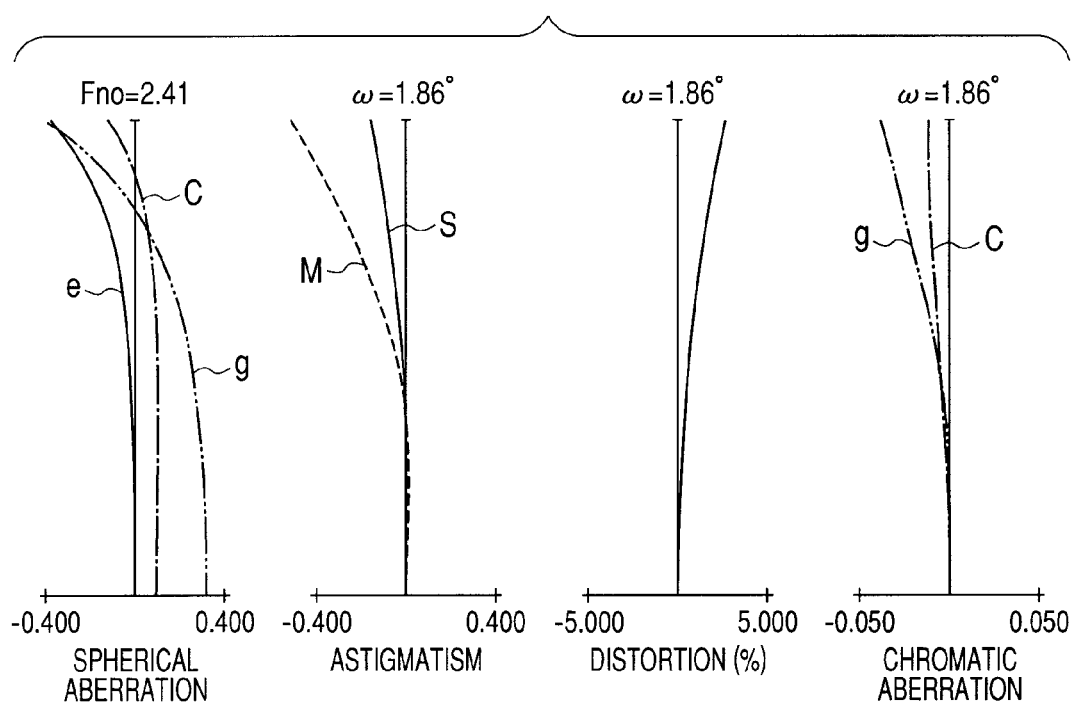
Figure 19E:
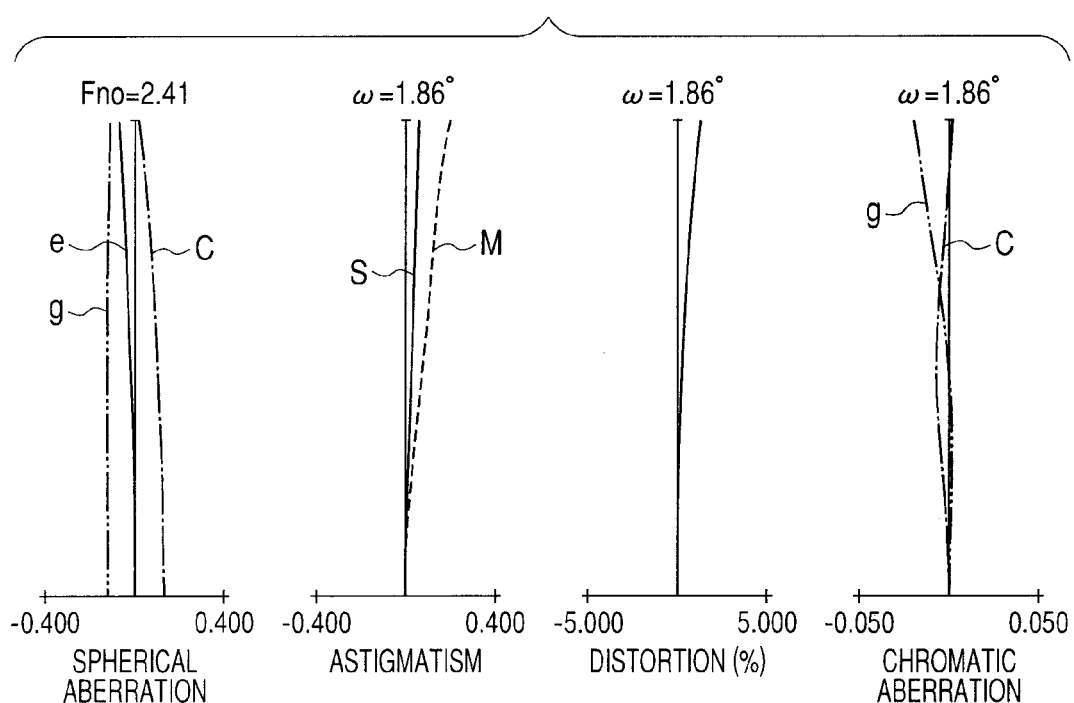

FIG. 18 is a lens cross-sectional view at a wide angle end according to Numerical Embodiment 9 as Embodiment 9 of the present invention. FIGS. 19A, 19B, 19C, 19D, and 19E are aberration diagrams for various conditions at the wide angle end, at a focal length fz of 16.41 mm, and at a telephoto end of Numerical Embodiment 9.

In FIG. 18, the zoom lens includes: a first lens unit G1 which is a lens unit having a positive refractive power; a second lens unit G2 which is a variator having a negative refractive power for zooming and is moved on the optical axis to the image plane side, so that zooming from the wide angle end to the telephoto end is performed; a third lens unit G3 which is a variator having a negative refractive power for zooming and moves so as to take a locus convex toward the object side from the wide angle end to the telephoto end; and a fourth lens unit G4 which is a compensator having a negative refractive power, which moves non-linearly on the optical axis for compensating for image plane variation due to zooming. In this embodiment of the present invention, the lens unit which compensates for the image plane variation is the fourth lens unit G4, but the third lens unit G3 may be the lens unit for compensating for image plane variation. By moving the fourth lens unit G4 by 10.12 mm to the image side for focusing, it is possible to perform a focusing operation from the vertex of the first lens unit G1 to the object distance of 0.8 m at the telephoto end. The zoom lens further includes: an aperture stop SP; and a fifth lens unit G5 which is a relay unit having a positive refractive power with an imaging function. A converter for converting a focal length may be disposed in an air interval of the fifth lens unit G5. The zoom lens further includes: a color separation prism or an optical filter P, which is illustrated as a glass block in the diagram; and an image plane I.

Table 2 shows correspondence values of conditional expressions in this embodiment. In this numerical embodiment, all the conditional expressions are satisfied, and hence good optical performance is achieved while achieving reductions in size and weight with the wide angle and high magnification measured as the focal length at the wide angle end of 7.8 mm and the zoom ratio of 21.71.

(Numerical Embodiment 9)

| Surface number | r | d | nd | vd | Effective diameter |
|---|---|---|---|---|---|
| 1 | −264.864 | 2.30 | 1.72047 | 34.7 | 79.72 |
| 2 | 154.672 | 4.15 | | | 78.46 |
| 3 | 376.534 | 2.20 | 1.84666 | 23.8 | 78.66 |
| 4 | 198.226 | 9.93 | 1.43875 | 94.9 | 78.64 |
| 5 | −191.683 | 0.40 | | | 78.86 |
| 6 | 175.631 | 8.85 | 1.43387 | 95.1 | 79.45 |
| 7 | −274.451 | 0.48 | | | 79.56 |
| 8 | 118.633 | 10.40 | 1.59240 | 68.3 | 79.38 |
| 9 | −358.134 | 0.15 | | | 79.00 |
| 10 | 60.146 | 7.15 | 1.72916 | 54.7 | 70.80 |
| 11 | 115.839 | (Variable) | | | 69.85 |
| 12 | 66.475 | 1.00 | 1.88300 | 40.8 | 29.32 |
| 13 | 14.865 | 7.25 | | | 22.80 |
| 14 | −52.846 | 7.26 | 1.80809 | 22.8 | 22.27 |
| 15 | −13.333 | 0.75 | 1.88300 | 40.8 | 21.78 |

-continued (Numerical Embodiment 9)

| | | | | | |
|---|---|---|---|---|---|
| 16 | 88.035 | 0.18 | | | 21.43 |
| 17 | 29.180 | 2.35 | 1.66680 | 33.0 | 21.64 |
| 18 | 61.230 | (Variable) | | | 21.34 |
| 19 | −38.685 | 0.75 | 1.75700 | 47.8 | 20.34 |
| 20 | 78.410 | 2.05 | 1.84649 | 23.9 | 21.39 |
| 21 | −963.952 | (Variable) | | | 21.80 |
| 22 | −145.703 | 3.00 | 1.64000 | 60.1 | 26.12 |
| 23 | −43.281 | 0.15 | | | 26.77 |
| 24 | 99.795 | 3.46 | 1.51633 | 64.1 | 27.78 |
| 25 | −99.576 | (Variable) | | | 27.94 |
| 26 (Stop) | ∞ | 2.00 | | | 28.15 |
| 27 | 65.397 | 5.50 | 1.51742 | 52.4 | 28.19 |
| 28 | −39.725 | 1.00 | 1.83400 | 37.2 | 27.99 |
| 29 | −235.590 | 36.00 | | | 28.04 |
| 30 | −39.576 | 2.38 | 1.51633 | 64.1 | 25.61 |
| 31 | −34.024 | 0.81 | | | 25.97 |
| 32 | 295.462 | 0.80 | 1.80100 | 35.0 | 25.43 |
| 33 | 33.171 | 5.33 | 1.50127 | 56.5 | 25.08 |
| 34 | −92.205 | 0.15 | | | 25.12 |
| 35 | 79.874 | 4.91 | 1.48749 | 70.2 | 25.00 |
| 36 | −41.371 | 0.85 | 1.88300 | 40.8 | 24.98 |
| 37 | −116.183 | 0.29 | | | 25.23 |
| 38 | 60.283 | 3.66 | 1.51633 | 64.1 | 25.32 |
| 39 | −86.753 | 4.50 | | | 25.16 |
| 40 | ∞ | 33.00 | 1.60859 | 46.4 | 40.00 |
| 41 | ∞ | 13.20 | 1.51633 | 64.1 | 40.00 |
| 42 | ∞ | | | | 40.00 |
| Image plane | ∞ | | | | |

Various data
Zoom ratio 21.71

| | Wide angle | Intermediate | Telephoto |
|---|---|---|---|
| Focal length | 7.80 | 16.41 | 169.34 |
| F number | 1.80 | 1.79 | 2.41 |
| Field angle | 35.19 | 18.53 | 1.86 |
| Image height | 5.50 | 5.50 | 5.50 |
| Total lens length | 275.49 | 275.49 | 275.49 |
| BF | 6.99 | 6.99 | 6.99 |
| d11 | 0.47 | 21.39 | 53.06 |
| d18 | 59.96 | 24.28 | 12.05 |
| d21 | 7.45 | 14.28 | 1.44 |
| d25 | 12.04 | 19.98 | 13.36 |
| Entrance pupil position | 47.88 | 100.45 | 934.51 |
| Exit pupil position | 642.41 | 642.41 | 642.41 |
| Front principal point position | 55.78 | 117.28 | 1148.99 |
| Rear principal point position | −0.81 | −9.42 | −162.35 |

Zoom lens unit data

| Unit | First surface | Focal length | Lens structure length | Front principal point position | Rear principal point position |
|---|---|---|---|---|---|
| 1 | 1 | 72.50 | 46.01 | 26.97 | −0.89 |
| 2 | 12 | −13.80 | 18.79 | 2.91 | −9.84 |
| 3 | 19 | −57.00 | 2.80 | −0.11 | −1.64 |
| 4 | 22 | 48.00 | 6.61 | 2.83 | −1.42 |
| 5 | 26 | 50.33 | 114.38 | 54.31 | −45.19 |

Figure 20:
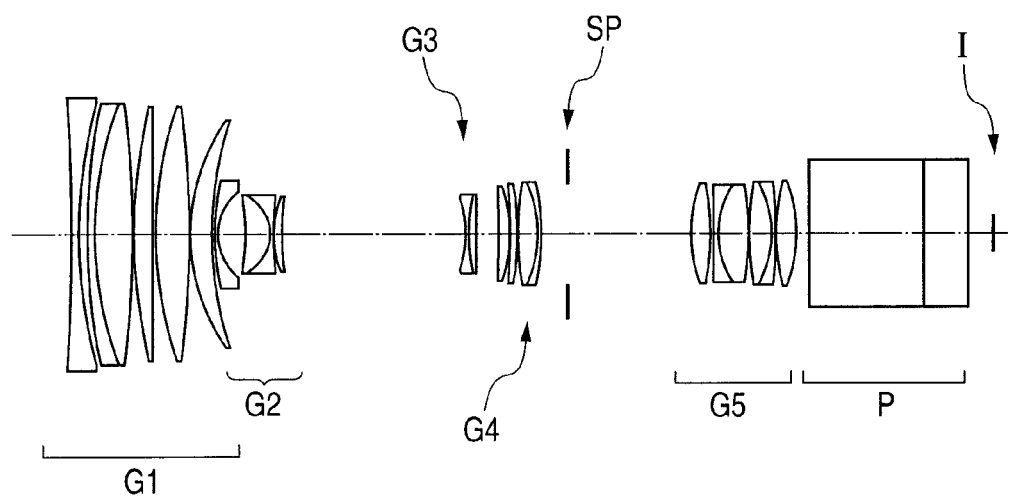
FIG. 20 is a lens cross-sectional view at a wide angle end according to Embodiment 10.
Figure 21A:
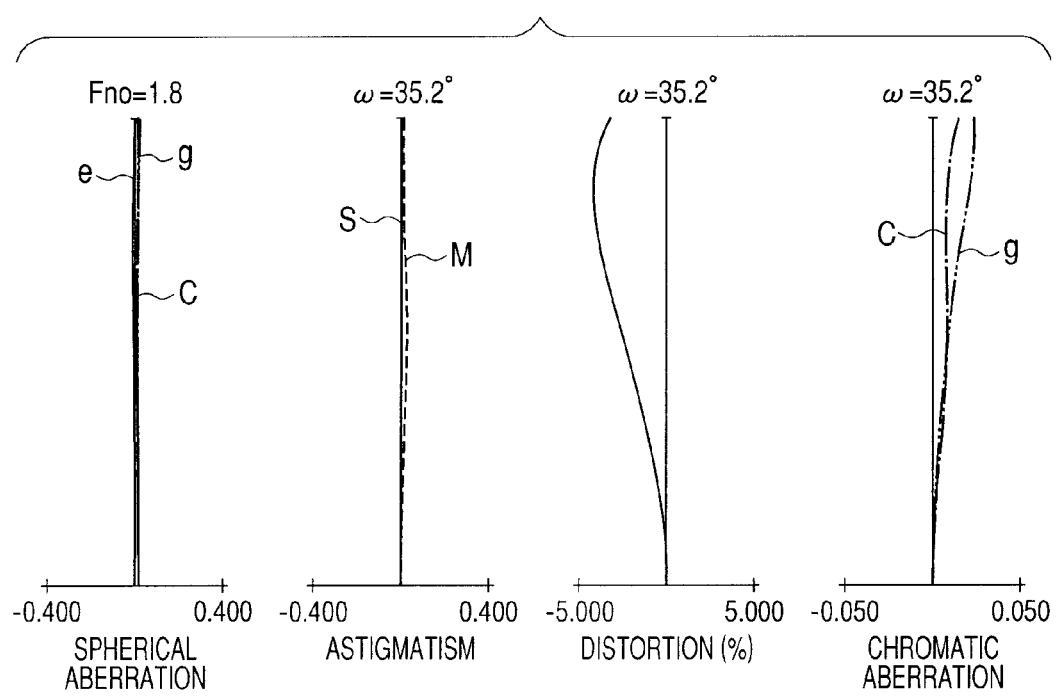
FIGS. 21A, 21B, 21C, 21D, and 21E are aberration diagrams at the wide angle end and an object distance of 2.5 m, at a focal length fz of 11.26 mm and the object distance of 2.5 m, at a telephoto end and the object distance of 2.5 m, at the telephoto end and an object distance of infinity, and at the telephoto end and an object distance of proximity (0.8 m), respectively, according to Embodiment 10.
Figure 21B:
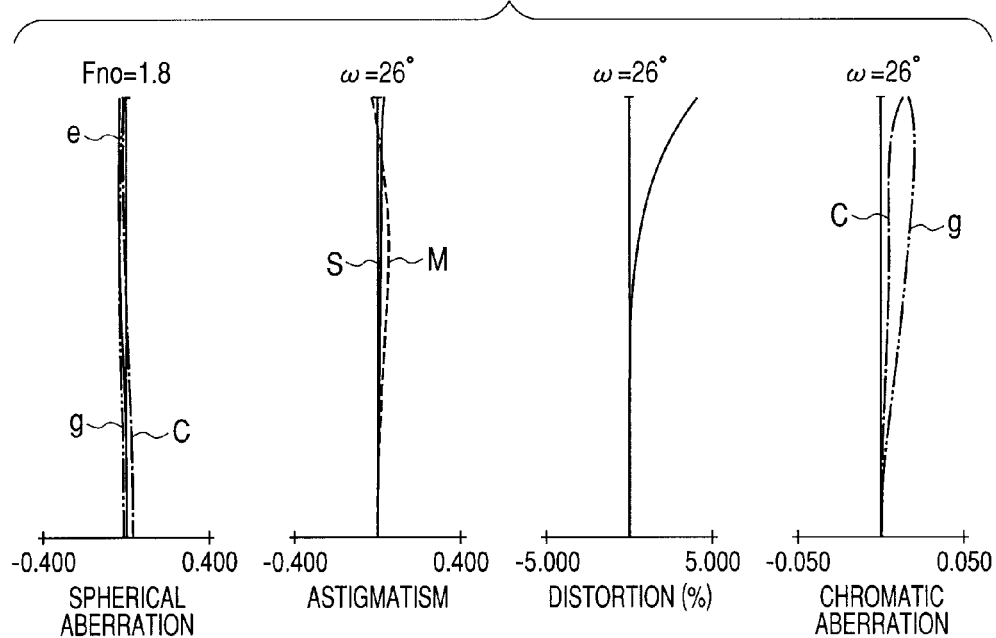
Figure 21C:
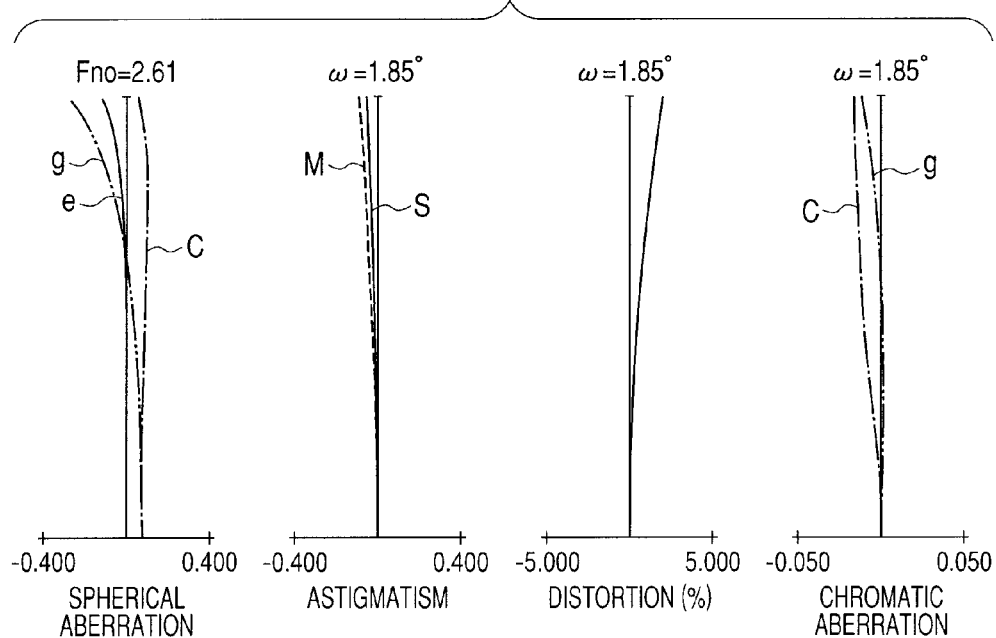
Figure 21D:
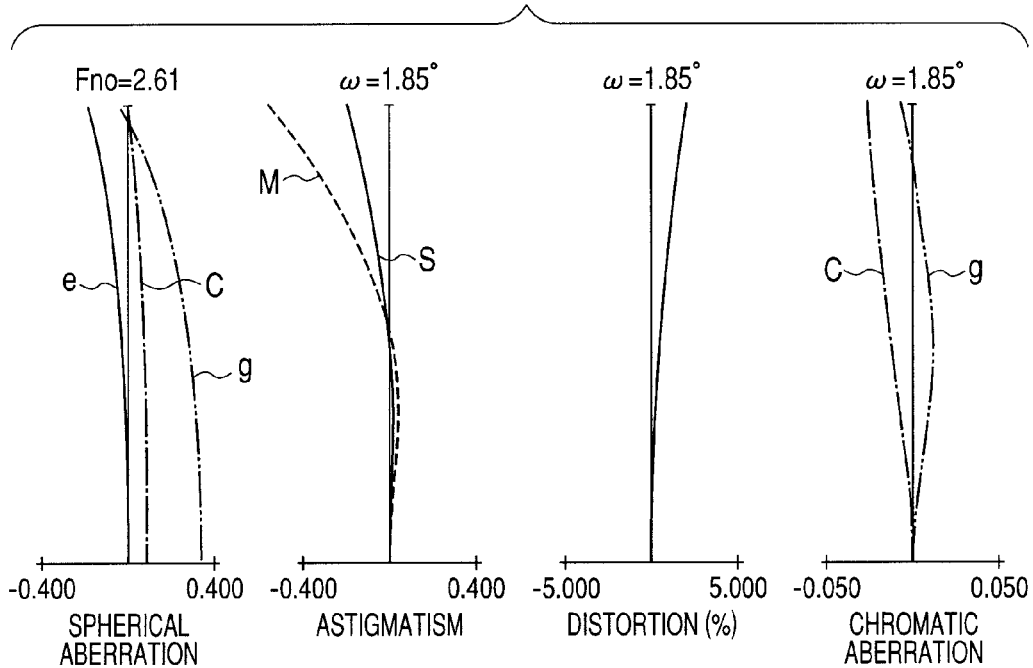
Figure 21E:
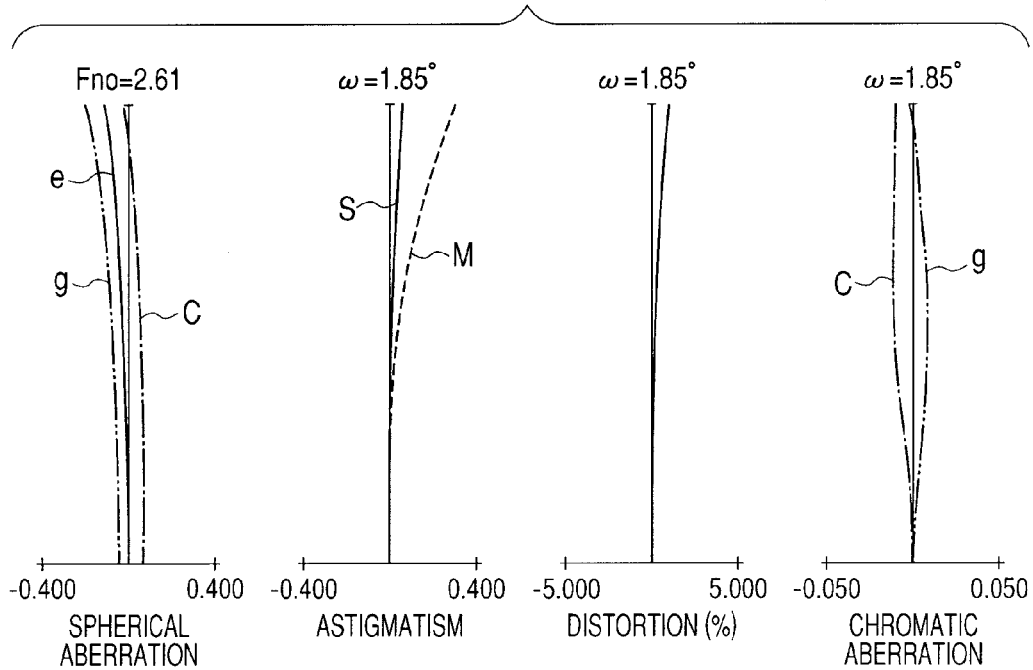

FIG. 20 is a lens cross-sectional view at a wide angle end according to Numerical Embodiment 10 as Embodiment 10 of the present invention. FIGS. 21A, 21B, 21C, 21D, and 21E are aberration diagrams for various conditions at the wide angle end, at a focal length fz of 11.26 mm, and at a telephoto end of Numerical Embodiment 10.

In FIG. 20, the zoom lens includes: a first lens unit G1 which is a lens unit having a positive refractive power; a second lens unit G2 which is a variator having a negative refractive power for zooming and is moved on the optical axis to the image plane side, so that zooming from the wide angle end to the telephoto end is performed; a third lens unit G3 which is a variator having a negative refractive power for zooming and moves so as to take a locus convex toward the object side from the wide angle end to the telephoto end; and a fourth lens unit G4 which is a compensator having a negative refractive power, which moves non-linearly on the optical axis for compensating for image plane variation due to zooming. In this embodiment of the present invention, the lens unit which compensates for the image plane variation is the fourth lens unit G4, but the third lens unit G3 may be the lens unit for compensating for image plane variation. By moving the fourth lens unit G4 by 9.61 mm to the image side for focusing, it is possible to perform a focusing operation from the vertex of the first lens unit G1 to the object distance of 0.8 m at the telephoto end. The zoom lens further includes: an aperture stop SP; a fifth lens unit G5 which is a relay unit having a positive refractive power with an imaging function; a color separation prism or an optical filter P, which is illustrated as a glass block in the diagram; and an image plane I.

Table 2 shows correspondence values of conditional expressions in this embodiment. In this numerical embodiment, all the conditional expressions are satisfied, and hence good optical performance is achieved while achieving reductions in size and weight with the wide angle and high magnification measured as the focal length at the wide angle end of 7.8 mm and the zoom ratio of 21.87.

(Numerical Embodiment 10)

| Surface number | r | d | nd | vd | Effective diameter |
|---|---|---|---|---|---|
| 1 | −680.431 | 2.00 | 1.72047 | 34.7 | 77.16 |
| 2 | 129.165 | 2.73 | | | 73.41 |
| 3 | 181.676 | 2.00 | 1.75520 | 27.5 | 73.37 |
| 4 | 100.762 | 11.09 | 1.43875 | 94.9 | 72.47 |
| 5 | −281.572 | 0.40 | | | 72.39 |
| 6 | 155.990 | 5.67 | 1.43387 | 95.1 | 71.55 |
| 7 | −5232.758 | 0.53 | | | 71.49 |
| 8 | 106.900 | 9.86 | 1.59240 | 68.3 | 71.66 |
| 9 | −277.870 | 0.15 | | | 71.32 |
| 10 | 56.125 | 6.34 | 1.75500 | 52.3 | 64.16 |
| 11 | 107.372 | (Variable) | | | 63.23 |
| 12 | 72.356 | 1.00 | 1.88300 | 40.8 | 29.23 |
| 13 | 14.917 | 8.29 | | | 22.52 |
| 14 | −43.730 | 6.76 | 1.80809 | 22.8 | 20.87 |
| 15 | −12.427 | 0.75 | 1.88300 | 40.8 | 20.32 |
| 16 | 98.780 | 0.18 | | | 19.85 |
| 17 | 30.907 | 2.17 | 1.66680 | 33.0 | 19.91 |
| 18 | 72.268 | (Variable) | | | 19.61 |
| 19 | −28.934 | 0.75 | 1.74320 | 49.3 | 18.90 |
| 20 | 49.837 | 2.49 | 1.84649 | 23.9 | 20.36 |
| 21 | −2461.973 | (Variable) | | | 20.89 |
| 22 | −343.561 | 3.41 | 1.65844 | 50.9 | 25.43 |
| 23 | −41.308 | 0.15 | | | 26.12 |
| 24 | −141.322 | 2.03 | 1.53172 | 48.8 | 26.63 |
| 25 | −78.049 | 0.15 | | | 27.03 |
| 26 | 77.330 | 6.02 | 1.48749 | 70.2 | 27.62 |
| 27 | −31.695 | 1.00 | 1.88300 | 40.8 | 27.67 |
| 28 | −58.222 | (Variable) | | | 28.21 |
| 29 (Stop) | ∞ | 36.00 | | | 27.99 |
| 30 | 44.519 | 5.42 | 1.48749 | 70.2 | 27.41 |
| 31 | −74.737 | 1.31 | | | 26.96 |
| 32 | −162.457 | 1.00 | 1.88300 | 40.8 | 26.12 |
| 33 | 25.040 | 8.65 | 1.48749 | 70.2 | 25.72 |
| 34 | −76.098 | 0.15 | | | 26.61 |
| 35 | 74.840 | 6.72 | 1.48749 | 70.2 | 27.04 |
| 36 | −27.347 | 1.00 | 1.88300 | 40.8 | 27.02 |
| 37 | −195.243 | 0.29 | | | 27.94 |
| 38 | 66.614 | 5.87 | 1.56732 | 42.8 | 28.64 |

-continued (Numerical Embodiment 10)

| 39 | −40.862 | 4.00 |  |  | 28.69 |
| 40 | ∞ | 33.00 | 1.60859 | 46.4 | 40.00 |
| 41 | ∞ | 13.20 | 1.51633 | 64.1 | 40.00 |
| 42 | ∞ |  |  |  | 40.00 |
| Image plane | ∞ |  |  |  |  |

Various data
Zoom ratio 21.87

|  | Wide angle | Intermediate | Telephoto |
|---|---|---|---|
| Focal length | 7.80 | 11.26 | 170.58 |
| F number | 1.80 | 1.80 | 2.61 |
| Field angle | 35.19 | 26.03 | 1.85 |
| Image height | 5.50 | 5.50 | 5.50 |
| Total lens length | 268.03 | 268.03 | 268.03 |
| BF | 8.01 | 8.01 | 8.01 |
| d11 | 0.61 | 9.17 | 48.80 |
| d18 | 53.24 | 33.06 | 5.85 |
| d21 | 6.32 | 9.16 | 1.44 |
| d28 | 7.30 | 16.09 | 11.40 |
| Entrance pupil position | 46.29 | 63.98 | 893.43 |
| Exit pupil position | 653.50 | 653.50 | 653.50 |
| Front principal point position | 54.19 | 75.44 | 1109.09 |
| Rear principal point position | 0.21 | −3.26 | −162.58 |

Zoom lens unit data

| Unit | First surface | Focal length | Lens structure length | Front principal point position | Rear principal point position |
|---|---|---|---|---|---|
| 1 | 1 | 69.00 | 40.77 | 22.91 | −2.53 |
| 2 | 12 | −13.00 | 19.15 | 3.13 | −10.16 |
| 3 | 19 | −43.00 | 3.24 | −0.07 | −1.84 |
| 4 | 22 | 39.00 | 12.76 | 3.87 | −4.50 |
| 5 | 29 | 48.86 | 116.62 | 52.57 | −39.35 |

Figure 22:
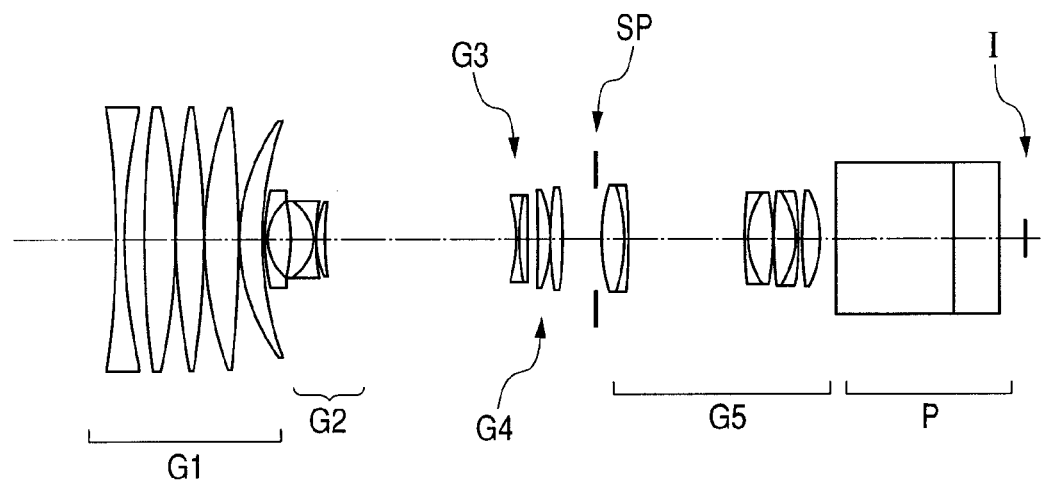
FIG. 22 is a lens cross-sectional view at a wide angle end according to Embodiment 11.
Figure 23A:
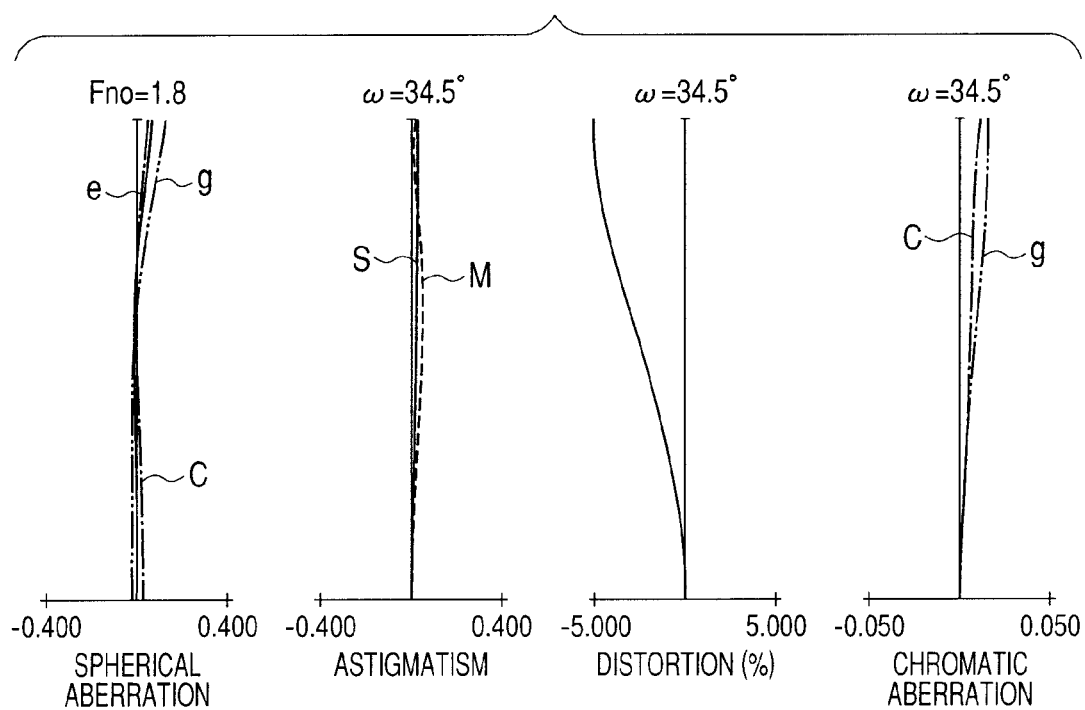
FIGS. 23A, 23B, 23C, 23D, and 23E are aberration diagrams at the wide angle end and an object distance of 2.5 m, at a focal length fz of 18.57 mm and the object distance of 2.5 m, at a telephoto end and the object distance of 2.5 m, at the telephoto end and an object distance of infinity, and at the telephoto end and an object distance of proximity (0.6 m), respectively, according to Embodiment 11.
Figure 23B:
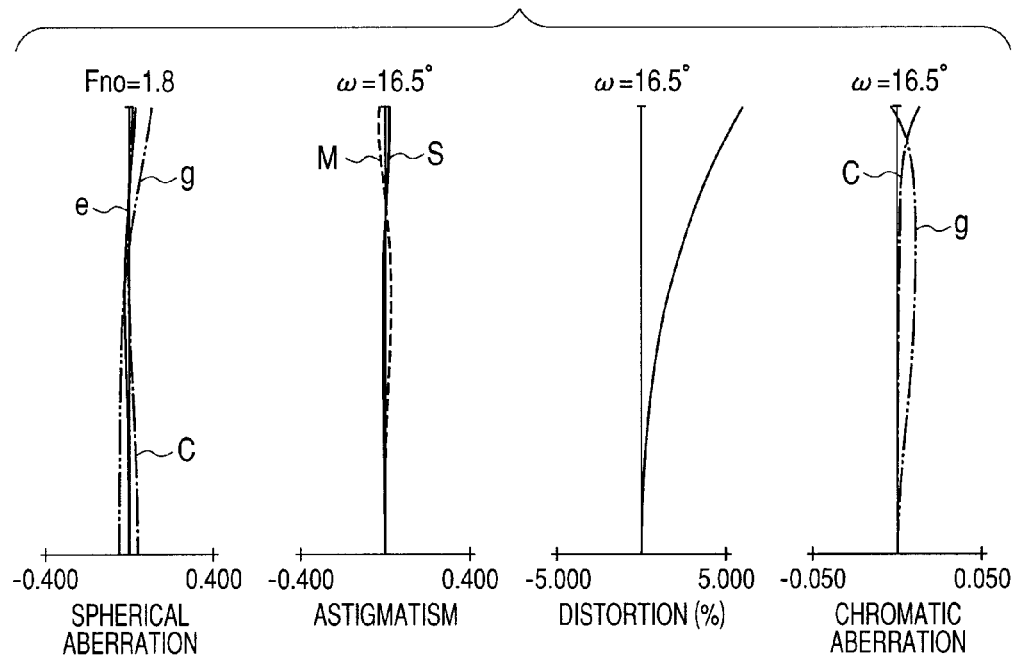
Figure 23C:
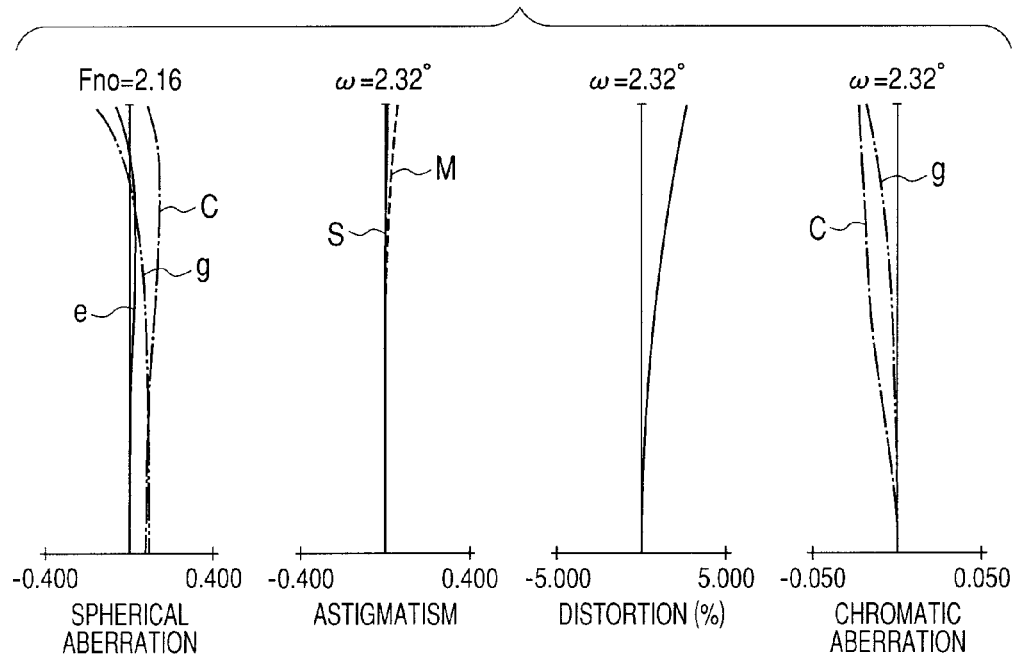
Figure 23D:
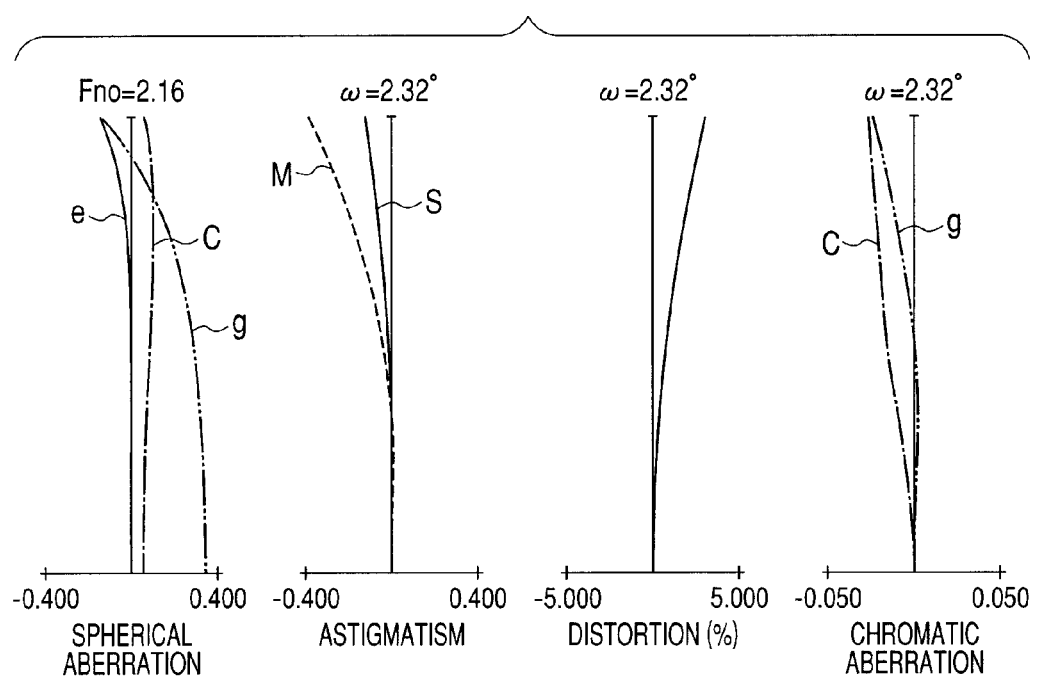
Figure 23E:
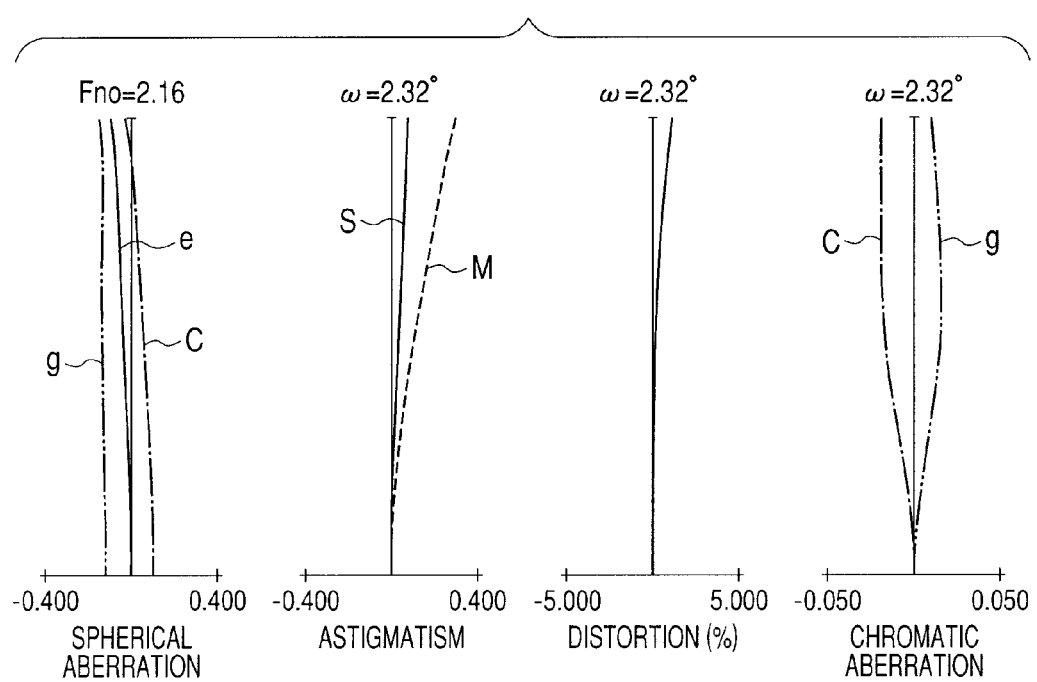

FIG. 22 is a lens cross-sectional view at a wide angle end according to Numerical Embodiment 11 as Embodiment 11 of the present invention. FIGS. 23A, 23B, 23C, 23D, and 23E are aberration diagrams for various conditions at the wide angle end, at a focal length fz of 18.57 mm, and at a telephoto end of Numerical Embodiment 11.

In FIG. 22, the zoom lens includes: a first lens unit G1 which is a lens unit having a positive refractive power; a second lens unit G2 which is a variator having a negative refractive power for zooming and is moved on the optical axis to the image plane side, so that zooming from the wide angle end to the telephoto end is performed; a third lens unit G3 which is a variator having a negative refractive power for zooming and moves so as to take a locus convex toward the object side from the wide angle end to the telephoto end; and a fourth lens unit G4 which is a compensator having a negative refractive power, which moves non-linearly on the optical axis for compensating for image plane variation due to zooming. In this embodiment of the present invention, the lens unit which compensates for the image plane variation is the fourth lens unit G4, but the third lens unit G3 may be the lens unit for compensating for image plane variation. By moving the fourth lens unit G4 by 7.89 mm to the image side for focusing, it is possible to perform a focusing operation from the vertex of the first lens unit G1 to the object distance of 0.6 m at the telephoto end. The zoom lens further includes: an aperture stop SP; and a fifth lens unit G5 which is a relay unit having a positive refractive power with an imaging function. A converter for converting a focal length may be disposed in an air interval of the fifth lens unit G5. The zoom lens further includes: a color separation prism or an optical filter P, which is illustrated as a glass block in the diagram; and an image plane I.

Table 2 shows correspondence values of conditional expressions in this embodiment. In this numerical embodiment, all the conditional expressions are satisfied, and hence good optical performance is achieved while achieving reductions in size and weight with the wide angle and high magnification measured as the focal length at the wide angle end of 8.0 mm and the zoom ratio of 17.00.

(Numerical Embodiment 11)

| Surface number | r | d | nd | vd | Effective diameter |
|---|---|---|---|---|---|
| 1 | −229.715 | 2.20 | 1.78470 | 26.3 | 70.35 |
| 2 | 143.018 | 5.84 |  |  | 69.72 |
| 3 | 336.057 | 8.24 | 1.43387 | 95.1 | 70.68 |
| 4 | −162.654 | 0.40 |  |  | 71.00 |
| 5 | 178.667 | 7.47 | 1.43387 | 95.1 | 70.96 |
| 6 | −243.453 | 0.58 |  |  | 70.79 |
| 7 | 103.048 | 9.34 | 1.59240 | 68.3 | 70.19 |
| 8 | −339.325 | 0.15 |  |  | 69.85 |
| 9 | 52.817 | 6.18 | 1.77250 | 49.6 | 63.10 |
| 10 | 93.780 | (Variable) |  |  | 62.16 |
| 11 | 57.472 | 0.90 | 1.88300 | 40.8 | 25.25 |
| 12 | 13.431 | 6.43 |  |  | 19.92 |
| 13 | −38.436 | 6.18 | 1.80809 | 22.8 | 19.31 |
| 14 | −11.763 | 0.70 | 1.88300 | 40.8 | 18.90 |
| 15 | 91.120 | 0.20 |  |  | 18.69 |
| 16 | 29.050 | 2.13 | 1.66680 | 33.0 | 18.84 |
| 17 | 65.469 | (Variable) |  |  | 18.59 |
| 18 | −34.154 | 0.70 | 1.75700 | 47.8 | 20.90 |
| 19 | 60.542 | 2.31 | 1.84649 | 23.9 | 22.36 |
| 20 | −2958.315 | (Variable) |  |  | 22.85 |
| 21 | −170.120 | 3.20 | 1.63854 | 55.4 | 24.80 |
| 22 | −37.553 | 0.15 |  |  | 25.51 |
| 23 | 83.755 | 3.42 | 1.51633 | 64.1 | 26.77 |
| 24 | −105.150 | (Variable) |  |  | 26.95 |
| 25 (Stop) | ∞ | 1.80 |  |  | 27.53 |
| 26 | 47.805 | 6.42 | 1.51742 | 52.4 | 27.73 |
| 27 | −42.424 | 0.90 | 1.83481 | 42.7 | 27.37 |
| 28 | −344.048 | 32.40 |  |  | 27.31 |
| 29 | 295.423 | 0.80 | 1.80100 | 35.0 | 23.84 |
| 30 | 21.068 | 6.87 | 1.51823 | 58.9 | 23.45 |
| 31 | −59.875 | 0.15 |  |  | 23.75 |
| 32 | 113.087 | 6.24 | 1.49700 | 81.5 | 23.77 |
| 33 | −21.414 | 0.90 | 1.88300 | 40.8 | 23.63 |
| 34 | −82.994 | 0.86 |  |  | 24.40 |
| 35 | 84.592 | 5.00 | 1.54814 | 45.8 | 24.78 |
| 36 | −29.969 | 4.00 |  |  | 24.76 |
| 37 | ∞ | 33.00 | 1.60859 | 46.4 | 40.00 |
| 38 | ∞ | 13.20 | 1.51633 | 64.1 | 40.00 |
| 39 | ∞ |  |  |  | 40.00 |
| Image plane | ∞ |  |  |  |  |

Various data
Zoom ratio 17.00

|  | Wide angle | Intermediate | Telephoto |
|---|---|---|---|
| Focal length | 8.00 | 18.57 | 135.98 |
| F number | 1.80 | 1.80 | 2.16 |
| Field angle | 34.51 | 16.50 | 2.32 |
| Image height | 5.50 | 5.50 | 5.50 |
| Total lens length | 252.20 | 252.20 | 252.20 |
| BF | 7.57 | 7.57 | 7.57 |
| d10 | 0.63 | 21.21 | 45.11 |
| d17 | 52.83 | 19.67 | 8.78 |
| d20 | 3.03 | 9.21 | 1.81 |
| d24 | 8.87 | 15.28 | 9.65 |
| Entrance pupil position | 42.88 | 99.29 | 642.12 |

(Numerical Embodiment 11)

| | | | |
|---|---|---|---|
| Exit pupil position | 368.37 | 368.37 | 368.37 |
| Front principal point position | 51.06 | 118.82 | 829.35 |
| Rear principal point position | −0.43 | −11.00 | −128.41 |

Zoom lens unit data

| Unit | First surface | Focal length | Lens structure length | Front principal point position | Rear principal point position |
|---|---|---|---|---|---|
| 1 | 1 | 63.00 | 40.40 | 24.39 | −0.60 |
| 2 | 11 | −12.00 | 16.54 | 2.70 | −8.62 |
| 3 | 18 | −49.00 | 3.01 | −0.05 | −1.70 |
| 4 | 21 | 41.00 | 6.78 | 2.76 | −1.60 |
| 5 | 25 | 49.59 | 112.54 | 56.30 | −47.65 |

Figure 24:
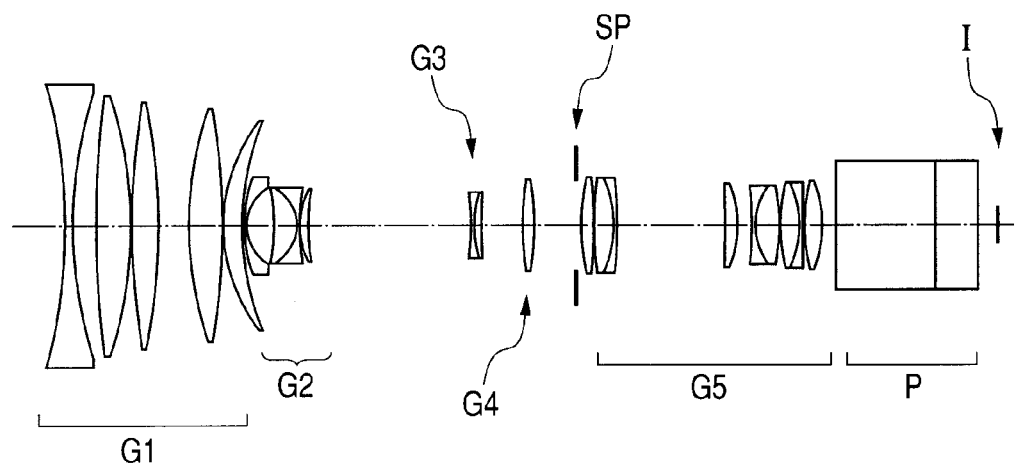
FIG. 24 is a lens cross-sectional view at a wide angle end according to Embodiment 12.
Figure 25A:
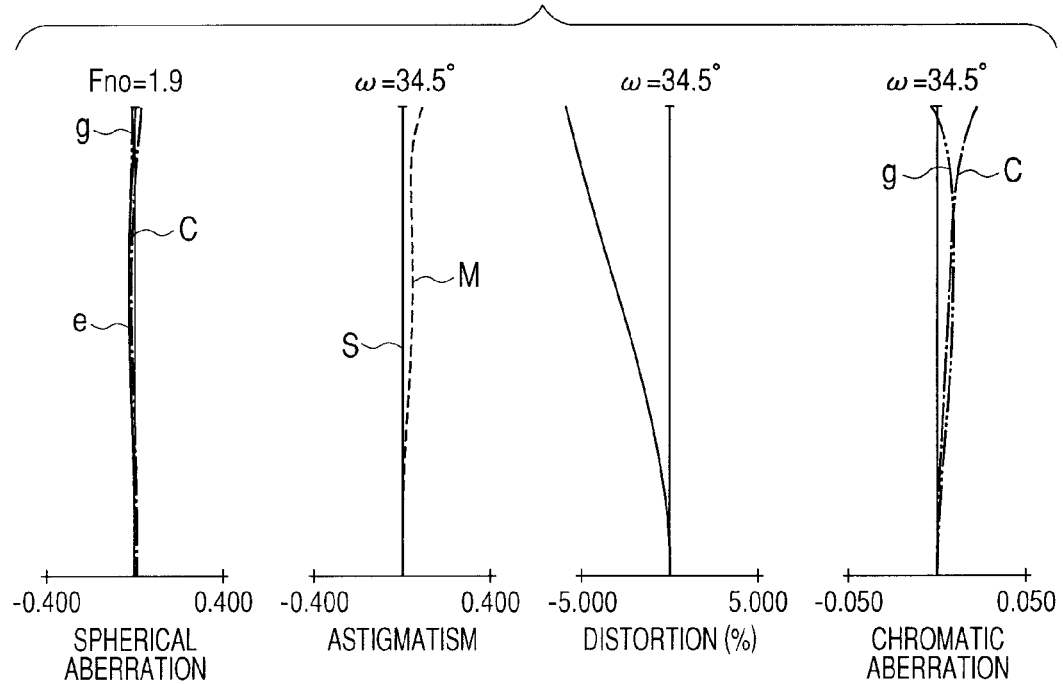
FIGS. 25A, 25B, 25C, 25D, and 25E are aberration diagrams at the wide angle end and an object distance of 2.5 m, at a focal length fz of 10.25 mm and the object distance of 2.5 m, at a telephoto end and the object distance of 2.5 m, at the telephoto end and an object distance of infinity, and at the telephoto end and an object distance of proximity (0.8 m), respectively, according to Embodiment 12.
Figure 25B:
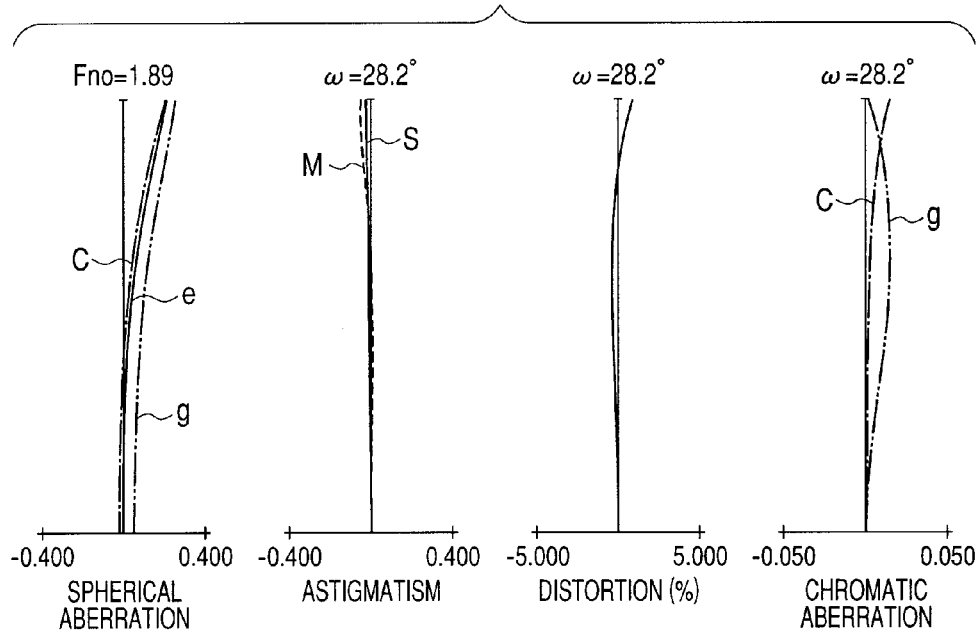
Figure 25C:
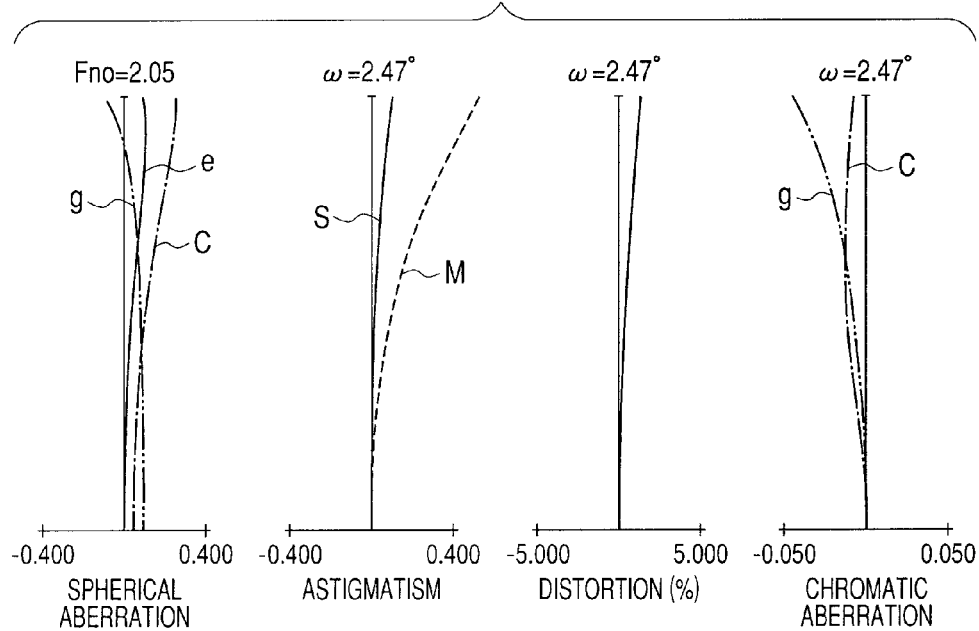
Figure 25D:
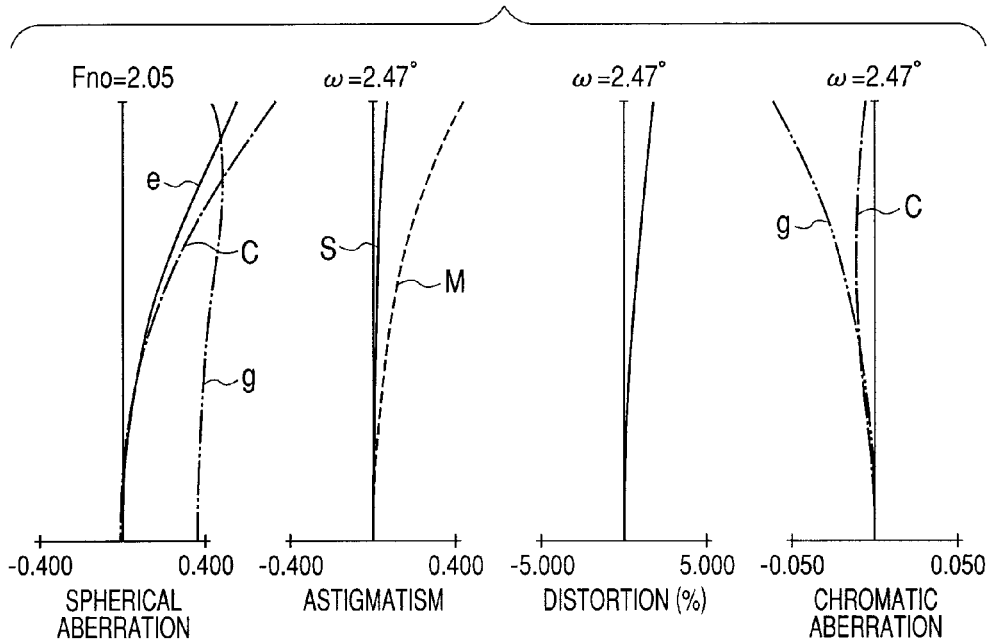
Figure 25E:
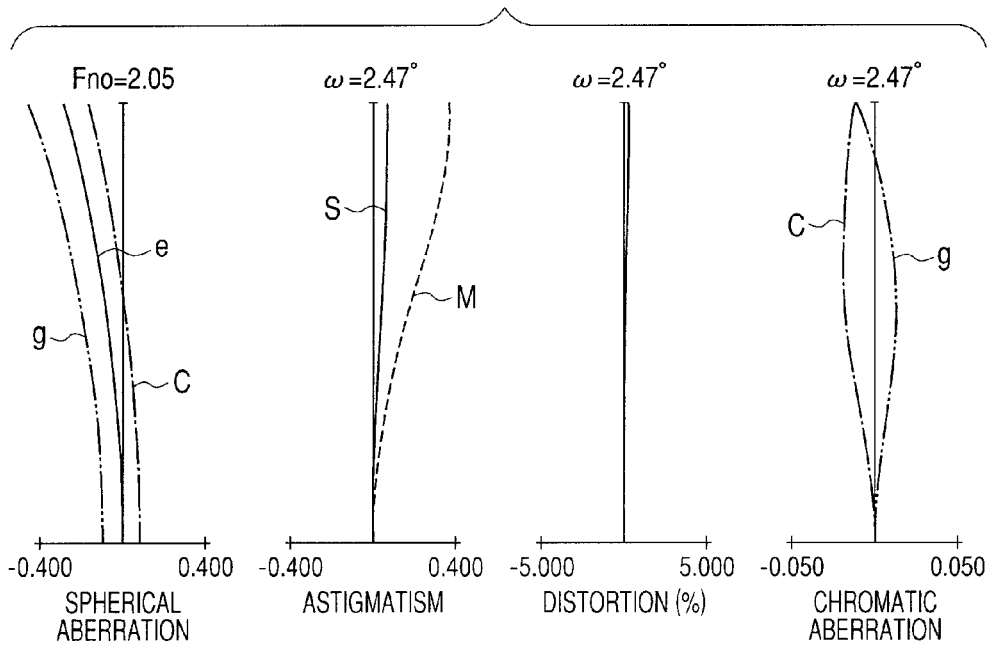

FIG. 24 is a lens cross-sectional view at a wide angle end according to Numerical Embodiment 12 as Embodiment 12 of the present invention. FIGS. 25A, 25B, 25C, 25D, and 25E are aberration diagrams for various conditions at the wide angle end, at a focal length fz of 10.25 mm, and at a telephoto end of Numerical Embodiment 12.

In FIG. 24, the zoom lens includes: a first lens unit G1 which is a lens unit having a positive refractive power; a second lens unit G2 which is a variator having a negative refractive power for zooming and is moved on the optical axis to the image plane side, so that zooming from the wide angle end to the telephoto end is performed; a third lens unit G3 which is a variator having a negative refractive power for zooming and moves so as to take a locus convex toward the object side from the wide angle end to the telephoto end; and a fourth lens unit G4 which is a compensator having a negative refractive power, which moves non-linearly on the optical axis for compensating for image plane variation due to zooming. In this embodiment of the present invention, the lens unit which compensates for the image plane variation is the fourth lens unit G4, but the third lens unit G3 may be the lens unit for compensating for image plane variation. By moving the fourth lens unit G4 by 9.26 mm to the image side for focusing, it is possible to perform a focusing operation from the vertex of the first lens unit G1 to the object distance of 0.8 m at the telephoto end. The zoom lens further includes: an aperture stop SP; and a fifth lens unit G5 which is a relay unit having a positive refractive power with an imaging function. A converter for converting a focal length may be disposed in an air interval of the fifth lens unit G5. The zoom lens further includes: a color separation prism or an optical filter P, which is illustrated as a glass block in the diagram; and an image plane I.

Table 2 shows correspondence values of conditional expressions in this embodiment. In this numerical embodiment, all the conditional expressions are satisfied, and hence good optical performance is achieved while achieving reductions in size and weight with the wide angle and high magnification measured as the focal length at the wide angle end of 8.0 mm and the zoom ratio of 15.92.

(Numerical Embodiment 12)

| Surface number | r | d | nd | vd | Effective diameter |
|---|---|---|---|---|---|
| 1 | −163.326 | 2.30 | 1.75520 | 27.5 | 88.96 |
| 2 | 135.188 | 8.10 | | | 83.26 |
| 3 | 354.309 | 11.41 | 1.43875 | 94.9 | 82.37 |
| 4 | −133.684 | 0.40 | | | 81.86 |
| 5 | 253.110 | 8.80 | 1.43387 | 95.1 | 79.07 |
| 6 | −193.587 | 10.02 | | | 78.85 |
| 7 | 118.587 | 10.94 | 1.59240 | 68.3 | 74.94 |
| 8 | −228.593 | 0.15 | | | 74.57 |
| 9 | 54.147 | 6.27 | 1.75500 | 52.3 | 66.47 |
| 10 | 91.651 | (Variable) | | | 65.47 |
| 11 | 48.328 | 1.00 | 1.88300 | 40.8 | 30.88 |
| 12 | 14.954 | 8.78 | | | 24.09 |
| 13 | −60.438 | 7.62 | 1.80809 | 22.8 | 22.92 |
| 14 | −13.587 | 0.75 | 1.88300 | 40.8 | 22.36 |
| 15 | 70.376 | 0.18 | | | 21.87 |
| 16 | 27.454 | 2.37 | 1.66680 | 33.0 | 22.13 |
| 17 | 53.130 | (Variable) | | | 21.83 |
| 18 | −48.773 | 0.75 | 1.74320 | 49.3 | 19.32 |
| 19 | 41.859 | 2.50 | 1.84649 | 23.9 | 20.13 |
| 20 | 150.750 | (Variable) | | | 20.51 |
| 21 | 101.812 | 4.01 | 1.77250 | 49.6 | 27.98 |
| 22 | −84.362 | (Variable) | | | 28.34 |
| 23 (Stop) | ∞ | 1.50 | | | 29.55 |
| 24 | 76.376 | 3.97 | 1.53172 | 48.8 | 29.78 |
| 25 | −184.227 | 0.40 | | | 29.62 |
| 26 | 137.843 | 6.39 | 1.48749 | 70.2 | 29.22 |
| 27 | −33.920 | 1.00 | 1.88300 | 40.8 | 28.69 |
| 28 | −179.819 | 36.00 | | | 28.80 |
| 29 | −776.735 | 4.19 | 1.48749 | 70.2 | 25.68 |
| 30 | −37.380 | 4.83 | | | 25.58 |
| 31 | −88.291 | 1.00 | 1.83489 | 42.6 | 22.83 |
| 32 | 20.098 | 8.24 | 1.48749 | 70.2 | 22.93 |
| 33 | −61.065 | 0.15 | | | 24.25 |
| 34 | 51.078 | 6.50 | 1.49700 | 81.5 | 25.35 |
| 35 | −29.677 | 1.00 | 1.88300 | 40.8 | 25.49 |
| 36 | −51610.863 | 0.29 | | | 26.44 |
| 37 | 43.139 | 6.10 | 1.57501 | 41.5 | 27.65 |
| 38 | −40.441 | 4.50 | | | 27.70 |
| 39 | ∞ | 33.00 | 1.60859 | 46.4 | 40.00 |
| 40 | ∞ | 13.20 | 1.51633 | 64.1 | 40.00 |
| 41 | ∞ | | | | 40.00 |
| Image plane | ∞ | | | | |

Various data
Zoom ratio 15.92

| | Wide angle | Intermediate | Telephoto |
|---|---|---|---|
| Focal length | 8.00 | 10.25 | 127.35 |
| F number | 1.90 | 1.89 | 2.05 |
| Field angle | 34.51 | 28.23 | 2.47 |
| Image height | 5.50 | 5.50 | 5.50 |
| Total lens length | 307.66 | 307.66 | 307.66 |
| BF | 7.00 | 7.00 | 7.00 |
| d10 | 0.56 | 6.73 | 46.73 |
| d17 | 54.09 | 35.20 | 7.88 |
| d20 | 13.45 | 16.34 | 8.51 |
| d22 | 13.95 | 23.78 | 18.93 |
| Entrance pupil position | 54.80 | 65.32 | 640.65 |
| Exit pupil position | 184.23 | 184.23 | 184.23 |
| Front principal point position | 63.16 | 76.15 | 859.51 |
| Rear principal point position | −1.00 | −3.25 | −120.36 |

-continued (Numerical Embodiment 12)

Zoom lens unit data

| Unit | First surface | Focal length | Lens structure length | Front principal point position | Rear principal point position |
|---|---|---|---|---|---|
| 1 | 1 | 63.50 | 58.39 | 38.58 | 3.90 |
| 2 | 11 | −14.50 | 20.70 | 3.84 | −10.16 |
| 3 | 18 | −54.00 | 3.25 | 0.48 | −1.28 |
| 4 | 21 | 60.00 | 4.01 | 1.24 | −1.03 |
| 5 | 23 | 59.08 | 132.26 | 77.54 | −63.94 |

Figure 26:
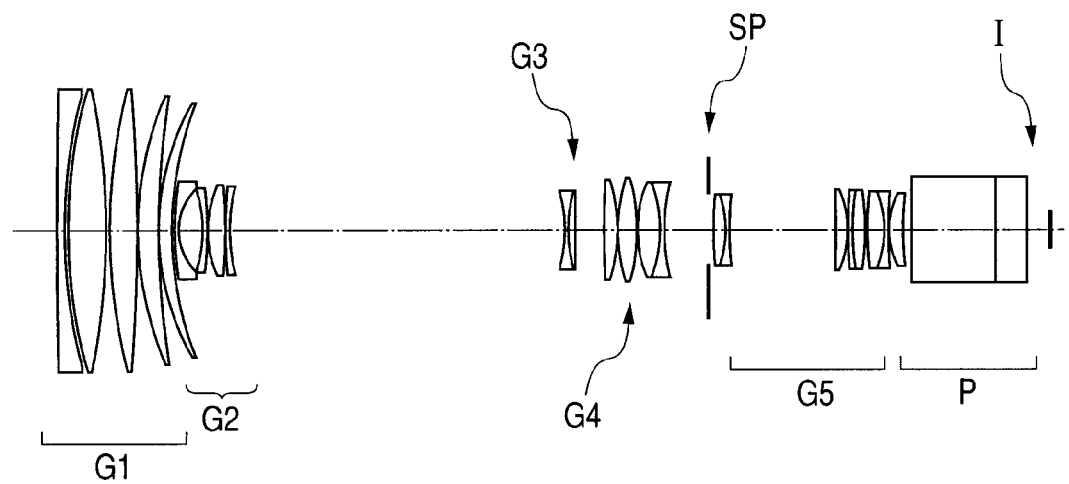
FIG. 26 is a lens cross-sectional view at a wide angle end according to Embodiment 13.
Figure 27A:
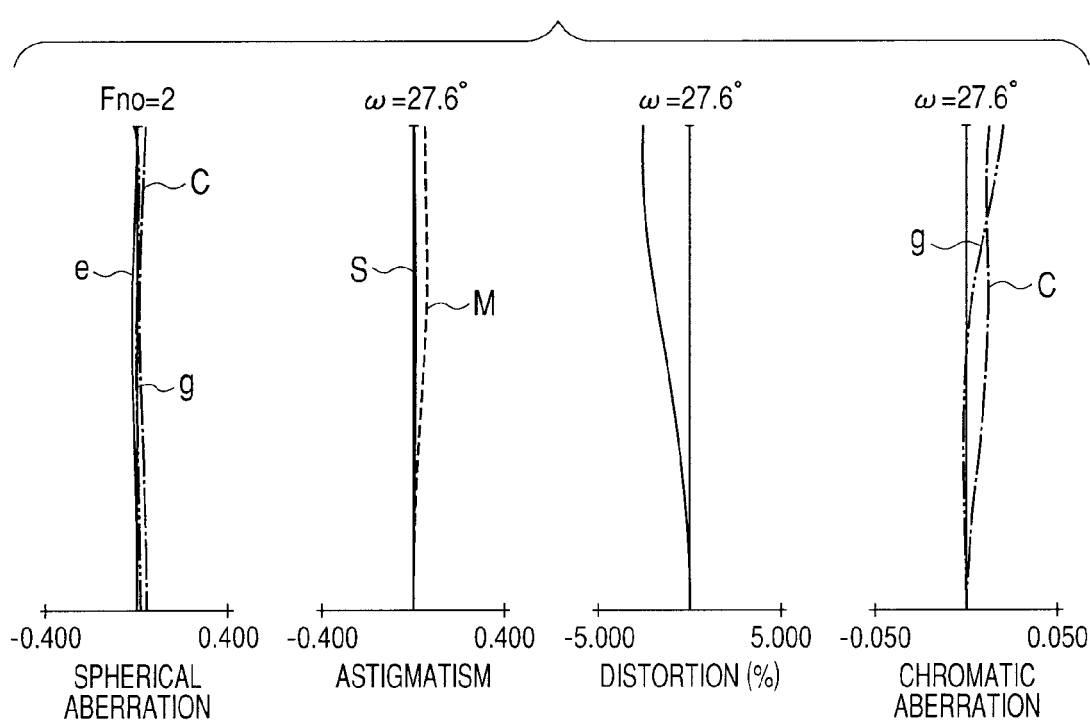
FIGS. 27A, 27B, 27C, 27D, and 27E are aberration diagrams at the wide angle end and an object distance of 6.0 m, at a focal length fz of 63.13 mm and the object distance of 6.0 m, at a telephoto end and the object distance of 6.0 m, at the telephoto end and an object distance of infinity, and at the telephoto end and an object distance of proximity (2.8 m), respectively, according to Embodiment 13.
Figure 27B:
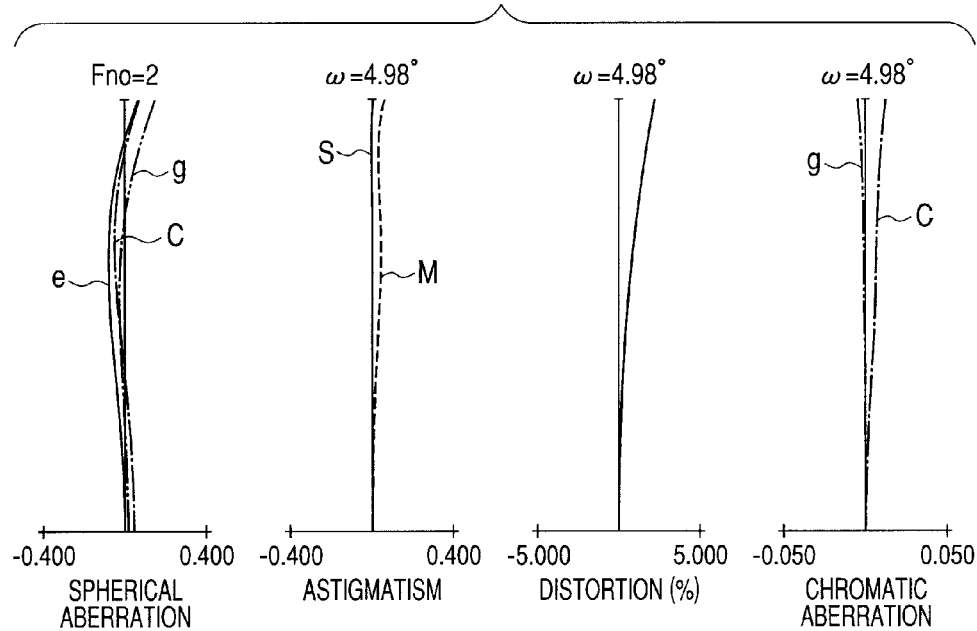
Figure 27C:
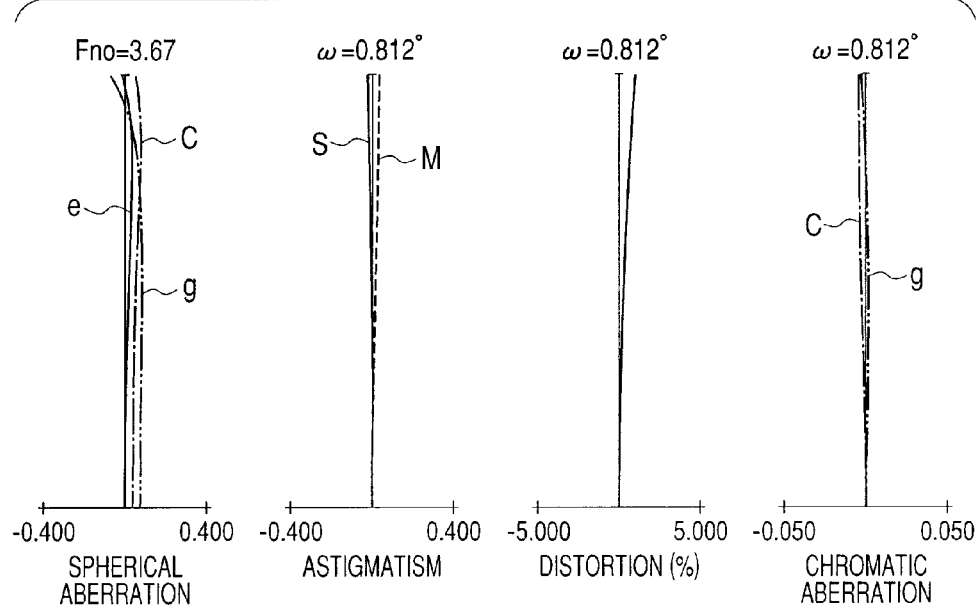
Figure 27D:
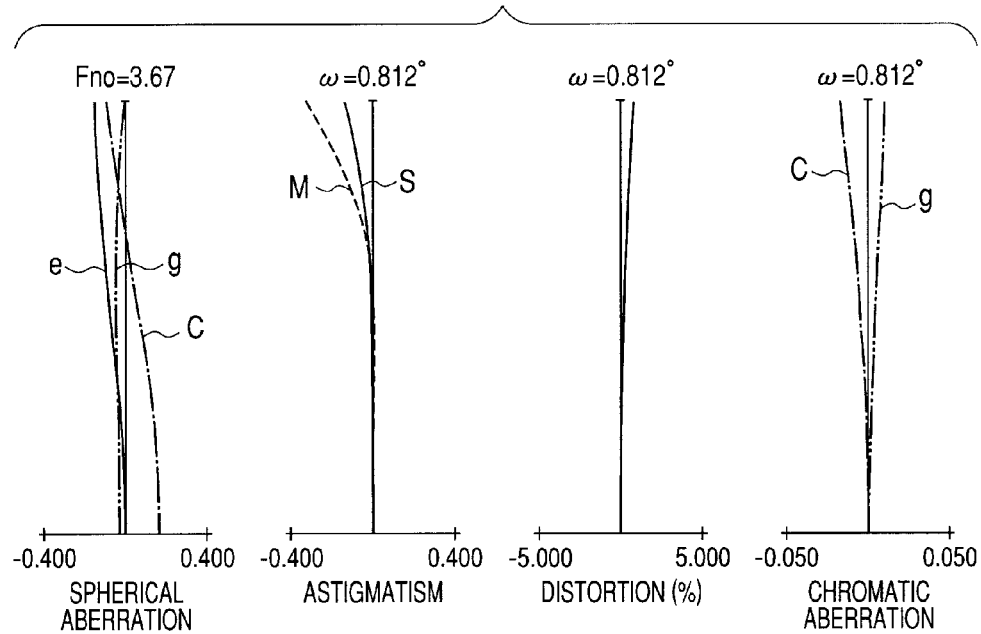
Figure 27E:
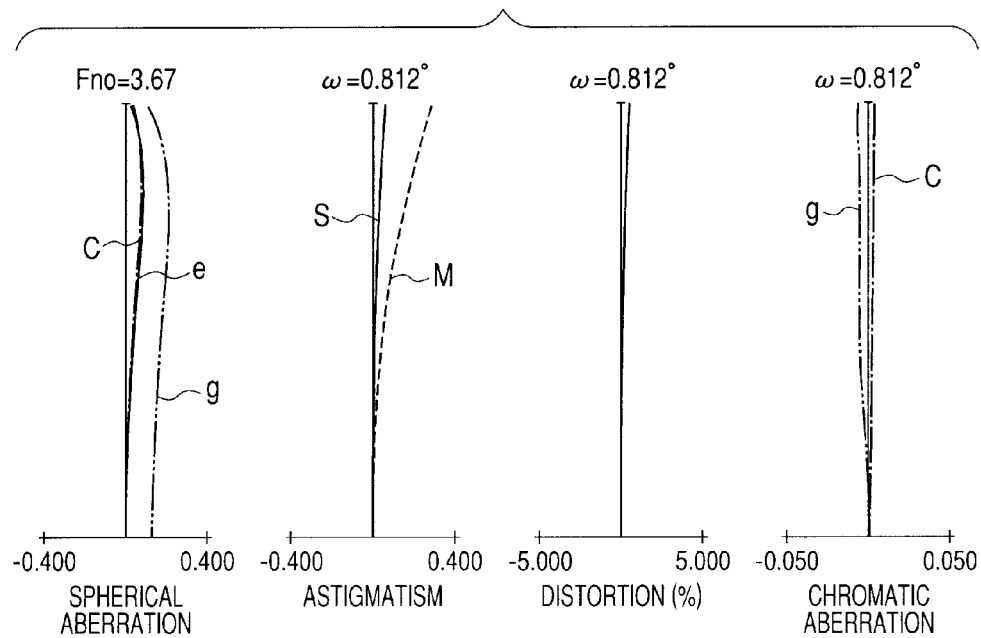

FIG. 26 is a lens cross-sectional view at a wide angle end according to Numerical Embodiment 13 as Embodiment 13 of the present invention. FIGS. 27A, 27B, 27C, 27D, and 27E are aberration diagrams for various conditions at the wide angle end, at a focal length fz of 63.13 mm, and at a telephoto end of Numerical Embodiment 13.

In FIG. 26, the zoom lens includes: a first lens unit G1 which is a lens unit having a positive refractive power; a second lens unit G2 which is a variator having a negative refractive power for zooming and is moved on the optical axis to the image plane side, so that zooming from the wide angle end to the telephoto end is performed; a third lens unit G3 which is a variator having a negative refractive power for zooming and moves so as to take a locus convex toward the object side from the wide angle end to the telephoto end; and a fourth lens unit G4 which is a compensator having a negative refractive power, which moves non-linearly on the optical axis for compensating for image plane variation due to zooming. In this embodiment of the present invention, the lens unit which compensates for the image plane variation is the fourth lens unit G4, but the third lens unit G3 may be the lens unit for compensating for image plane variation. By moving the fourth lens unit G4 by 21.26 mm to the image side for focusing, it is possible to perform a focusing operation from the vertex of the first lens unit G1 to the object distance of 2.8 m at the telephoto end. The zoom lens further includes: an aperture stop SP; and a fifth lens unit G5 which is a relay unit having a positive refractive power with an imaging function. A converter for converting a focal length may be disposed in an air interval of the fifth lens unit G5. The zoom lens further includes: a color separation prism or an optical filter P, which is illustrated as a glass block in the diagram; and an image plane I.

Table 2 shows correspondence values of conditional expressions in this embodiment. In this numerical embodiment, all the conditional expressions are satisfied, and hence good optical performance is achieved while achieving reductions in size and weight with the wide angle and high magnification measured as the focal length at the wide angle end of 10.5 mm and the zoom ratio of 36.97.

(Numerical Embodiment 13)

| Surface number | r | d | nd | vd | Effective diameter |
|---|---|---|---|---|---|
| 1 | 2652.061 | 3.00 | 1.80610 | 40.9 | 107.88 |
| 2 | 204.831 | 1.05 | | | 107.49 |
| 3 | 197.497 | 15.28 | 1.43387 | 95.1 | 108.03 |
| 4 | −271.180 | 1.25 | | | 108.22 |
| 5 | 208.026 | 10.98 | 1.43387 | 95.1 | 107.45 |
| 6 | −761.727 | 0.20 | | | 107.04 |
| 7 | 131.175 | 8.25 | 1.43387 | 95.1 | 102.62 |
| 8 | 313.243 | 0.20 | | | 101.64 |
| 9 | 102.231 | 4.95 | 1.43387 | 95.1 | 96.90 |
| 10 | 131.368 | (Variable) | | | 95.64 |
| 11 | 192.381 | 1.50 | 1.88300 | 40.8 | 36.84 |
| 12 | 21.509 | 9.38 | | | 30.73 |
| 13 | −49.445 | 1.50 | 1.81600 | 46.6 | 30.74 |
| 14 | −305.945 | 0.70 | | | 31.77 |
| 15 | 39.516 | 6.67 | 1.80809 | 22.8 | 34.00 |
| 16 | −435.042 | 0.41 | | | 33.51 |
| 17 | 248.900 | 1.50 | 1.81600 | 46.6 | 32.96 |
| 18 | 60.878 | (Variable) | | | 32.06 |
| 19 | −51.193 | 1.30 | 1.71700 | 47.9 | 27.19 |
| 20 | 51.947 | 2.99 | 1.84649 | 23.9 | 28.84 |
| 21 | 344.246 | (Variable) | | | 29.15 |
| 22 | 322.535 | 5.17 | 1.60738 | 56.8 | 37.64 |
| 23 | −71.155 | 0.15 | | | 38.27 |
| 24 | 59.010 | 7.81 | 1.51823 | 58.9 | 39.32 |
| 25 | −79.696 | 0.35 | | | 39.05 |
| 26 | 46.164 | 9.05 | 1.48749 | 70.2 | 35.93 |
| 27 | −51.986 | 1.50 | 1.83400 | 37.2 | 34.44 |
| 28 | 72.123 | (Variable) | | | 32.42 |
| 29 (Stop) | ∞ | 2.00 | | | 27.13 |
| 30 | 133.530 | 4.73 | 1.48749 | 70.2 | 26.59 |
| 31 | −55.172 | 1.50 | 1.88300 | 40.8 | 26.08 |
| 32 | 126.627 | 42.46 | | | 25.87 |
| 33 | −302.336 | 5.00 | 1.51742 | 52.4 | 29.64 |
| 34 | −38.361 | 0.15 | | | 30.11 |
| 35 | 537.796 | 1.50 | 1.77250 | 49.6 | 29.67 |
| 36 | 110.000 | 4.92 | 1.51742 | 52.4 | 29.46 |
| 37 | −98.222 | 0.40 | | | 29.27 |
| 38 | 71.291 | 7.55 | 1.51742 | 52.4 | 28.50 |
| 39 | −34.196 | 1.50 | 1.88300 | 40.8 | 27.49 |
| 40 | 174.577 | 0.14 | | | 27.15 |
| 41 | 28.850 | 5.44 | 1.48749 | 70.2 | 27.18 |
| 42 | 95.804 | 3.80 | | | 26.19 |
| 43 | ∞ | 33.00 | 1.60859 | 46.4 | 40.00 |
| 44 | ∞ | 13.20 | 1.51680 | 64.2 | 40.00 |
| 45 | ∞ | | | | 40.00 |
| Image plane | ∞ | | | | |

Various data
Zoom ratio 36.97

| | Wide angle | Intermediate | Telephoto |
|---|---|---|---|
| Focal length | 10.50 | 63.13 | 388.15 |
| F number | 2.00 | 2.00 | 3.67 |
| Field angle | 27.65 | 4.98 | 0.81 |
| Image height | 5.50 | 5.50 | 5.50 |
| Total lens length | 395.01 | 395.01 | 395.01 |
| BF | 10.01 | 10.01 | 10.01 |
| d10 | 1.19 | 92.71 | 128.70 |
| d18 | 132.74 | 20.96 | 7.58 |
| d21 | 11.13 | 23.55 | 1.41 |
| d28 | 17.52 | 25.37 | 24.89 |
| Entrance pupil position | 67.51 | 512.81 | 3317.14 |
| Exit pupil position | 1245.21 | 1245.21 | 1245.21 |
| Front principal point position | 78.10 | 579.17 | 3827.27 |
| Rear principal point position | −0.49 | −53.13 | −378.15 |

Zoom lens unit data

| Unit | First surface | Focal length | Lens structure length | Front principal point position | Rear principal point position |
|---|---|---|---|---|---|
| 1 | 1 | 170.00 | 45.16 | 19.74 | −11.48 |
| 2 | 11 | −26.00 | 21.66 | 1.69 | −14.13 |
| 3 | 19 | −71.33 | 4.29 | 0.28 | −2.08 |

-continued (Numerical Embodiment 13)

| 4 | 22 | 44.98 | 24.02 | −2.39 | −15.65 |
| 5 | 29 | 52.33 | 127.28 | 54.59 | −21.26 |

As described above, preferred embodiments of the present invention are described, but it is understood that the present invention is not limited to those embodiments, which can be modified and changed variously within the spirit thereof.

TABLE 2

Correspondence values of conditional expressions in Numerical Embodiments 7 to 13

| Number | Conditional expression | Embodiment 7 | Embodiment 8 | Embodiment 9 | Embodiment 10 | Embodiment 11 | Embodiment 12 | Embodiment 13 |
|---|---|---|---|---|---|---|---|---|
| (1) | fz | 14.77 | 17.84 | 16.41 | 11.26 | 18.57 | 10.25 | 63.13 |
| (2) | $\beta 2z/\beta 2w/Z$ | 0.07 | 0.07 | 0.07 | 0.06 | 0.10 | 0.07 | 0.09 |
| (3) | |f1/f2| | 5.00 | 5.32 | 5.25 | 5.31 | 5.25 | 4.38 | 6.54 |
| (4) | |f1/f3| | 1.57 | 1.73 | 1.27 | 1.60 | 1.29 | 1.18 | 2.38 |
| (5) | |f1/f4| | 1.35 | 1.60 | 1.51 | 1.77 | 1.54 | 1.06 | 3.78 |
| (6) | fw/$\phi$ | 0.73 | 0.82 | 0.71 | 0.71 | 0.73 | 0.73 | 0.95 |
| (7) | Z | 20.87 | 18.30 | 21.71 | 21.87 | 17.00 | 15.92 | 36.97 |

Figure 30:
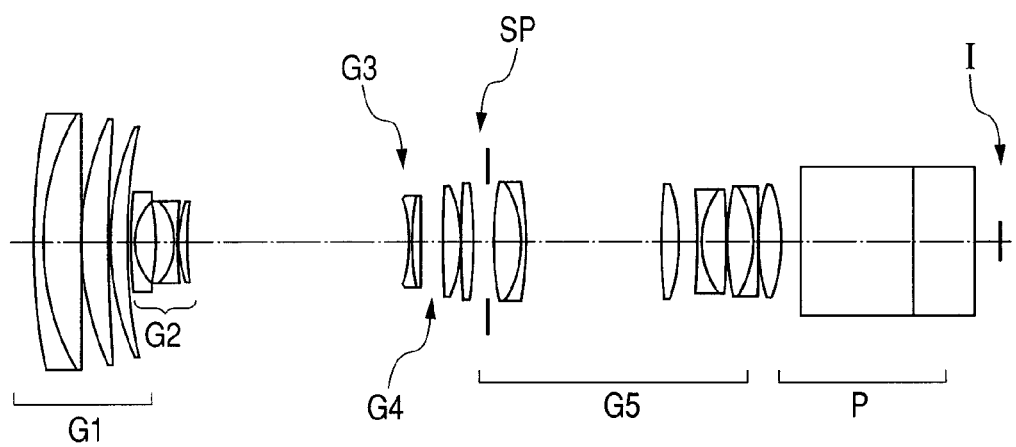
FIG. 30 is a lens cross-sectional view at a wide angle end according to Embodiment 14.
Figure 31A:
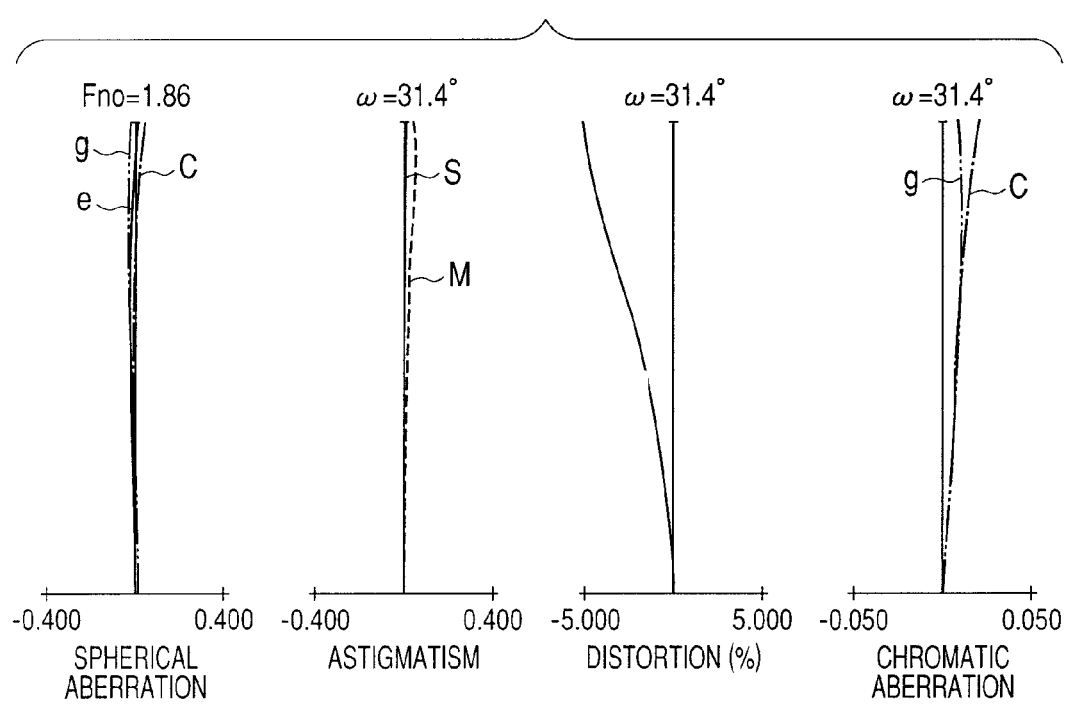
Figure 31B:
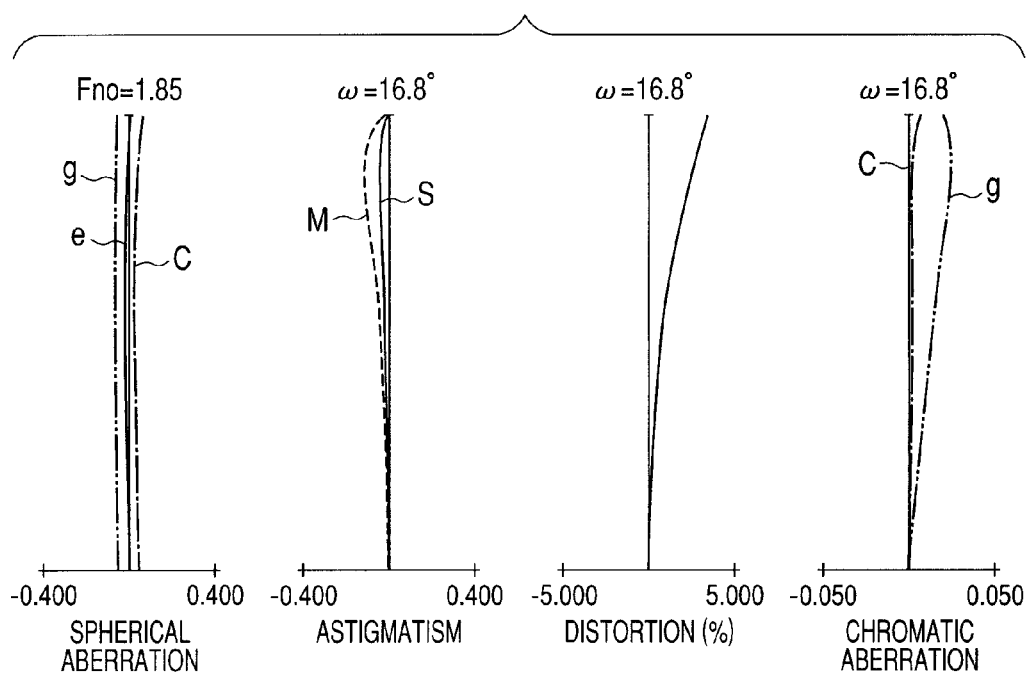
Figure 31C:
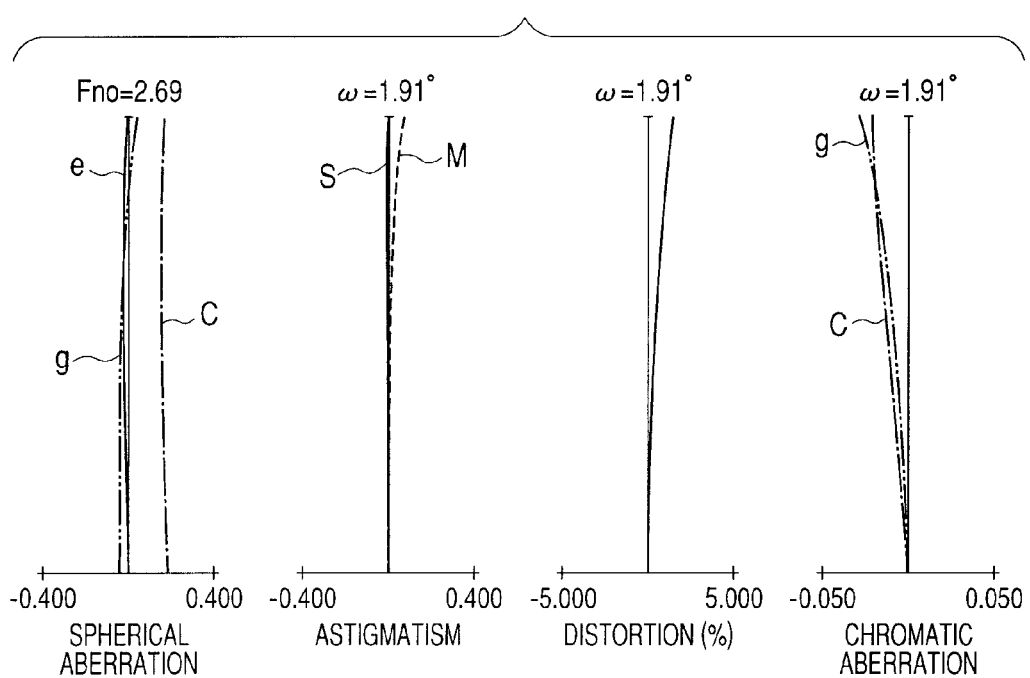

FIG. 30 is a lens cross-sectional view at a wide angle end according to Numerical Embodiment 14 as Embodiment 14 of the present invention. FIGS. 31A, 31B, 31C, 31D, and 31E are aberration diagrams for various conditions at the wide angle end, at a focal length fz of 18.23 mm, and at a telephoto end of Numerical Embodiment 14.

In FIG. 30, the zoom lens includes: a first lens unit G1 which is a lens unit having a positive refractive power; a second lens unit G2 which is a variator having a negative refractive power for zooming and is moved on the optical axis to the image plane side, so that zooming from the wide angle end to the telephoto end is performed; a third lens unit G3 which is a variator having a negative refractive power for zooming and moves so as to take a locus convex toward the object side from the wide angle end to the telephoto end; and a fourth lens unit G4 which is a compensator having a negative refractive power, which moves non-linearly on the optical axis for compensating for image plane variation due to zooming. In this embodiment of the present invention, the lens unit which compensates for the image plane variation is the fourth lens unit G4, but the third lens unit G3 may be the lens unit for compensating for image plane variation. By moving the third lens unit G3 by 9.00 mm to the image side for focusing, it is possible to perform a focusing operation from the vertex of the first lens unit G1 to the object distance of 0.9 m at the telephoto end. The zoom lens further includes: an aperture stop SP; and a fifth lens unit G5 which is a relay unit having a positive refractive power with an imaging function. A converter for converting a focal length may be disposed in an air interval of the fifth lens unit G5. The zoom lens further includes: a color separation prism or an optical filter P, which is illustrated as a glass block in the diagram; and an image plane I.

Table 3 shows correspondence values of conditional expressions in this embodiment. In this numerical embodiment, all the conditional expressions are satisfied, and hence good optical performance is achieved while achieving reductions in size and weight with the wide angle and high magnification measured as the focal length at the wide angle end of 9.0 mm and the zoom ratio of 18.29.

(Numerical Embodiment 14)

| Surface number | r | d | nd | vd | Effective diameter |
|---|---|---|---|---|---|
| 1 | 190.674 | 2.20 | 1.75520 | 27.5 | 65.25 |
| 2 | 64.774 | 9.77 | 1.48749 | 70.2 | 63.24 |
| 3 | −2417.259 | 0.15 | | | 63.09 |
| 4 | 71.217 | 7.35 | 1.60300 | 65.4 | 61.75 |

-continued (Numerical Embodiment 14)

| | | | | | |
|---|---|---|---|---|---|
| 5 | 464.468 | 0.15 | | | 61.13 |
| 6 | 68.095 | 4.76 | 1.77250 | 49.5 | 57.43 |
| 7 | 146.890 | (Variable) | | | 56.56 |
| 8 | 157.701 | 0.75 | 2.00069 | 25.5 | 24.01 |
| 9 | 14.804 | 5.71 | | | 19.90 |
| 10 | −60.456 | 5.08 | 1.92286 | 18.9 | 19.56 |
| 11 | −15.421 | 0.70 | 1.88300 | 40.8 | 19.56 |
| 12 | 81.232 | 0.45 | | | 19.36 |
| 13 | 27.799 | 2.13 | 1.80809 | 22.8 | 19.59 |
| 14 | 55.276 | (Variable) | | | 19.28 |
| 15 | −35.869 | 0.75 | 1.80440 | 39.6 | 20.67 |
| 16 | 64.317 | 2.11 | 1.92286 | 18.9 | 21.97 |
| 17 | 1316.972 | (Variable) | | | 22.39 |
| 18 | 195.143 | 4.63 | 1.50127 | 56.5 | 27.04 |
| 19 | −36.878 | 0.15 | | | 27.66 |
| 20 | 326.759 | 2.94 | 1.51633 | 64.1 | 28.36 |
| 21 | −116.061 | (Variable) | | | 28.57 |
| 22 | ∞ | 1.50 | | | 28.81 |
| (Stop) | | | | | |
| 23 | 8.0346 | 7.26 | 1.50127 | 56.5 | 28.95 |
| 24 | −30.615 | 1.10 | 1.83400 | 37.2 | 28.74 |
| 25 | −101.563 | 35.57 | | | 29.18 |
| 26 | 138.944 | 4.71 | 1.51633 | 64.1 | 28.37 |
| 27 | −51.158 | 4.66 | | | 28.20 |
| 28 | −583.779 | 1.20 | 1.83400 | 37.2 | 25.59 |
| 29 | 20.779 | 6.51 | 1.56732 | 42.8 | 25.06 |
| 30 | −410.757 | 0.50 | | | 25.38 |
| 31 | 65.013 | 6.91 | 1.51633 | 64.01 | 25.77 |
| 32 | −24.675 | 1.20 | 1.83400 | 37.2 | 25.76 |
| 33 | 590.781 | 0.27 | | | 26.76 |
| 34 | 45.389 | 5.83 | 1.57501 | 41.5 | 27.63 |
| 35 | −40.365 | 5.00 | | | 27.68 |
| 36 | ∞ | 30.00 | 1.60342 | 38.0 | 36.00 |
| 37 | ∞ | 16.20 | 1.51633 | 64.2 | 36.00 |
| 38 | ∞ | | | | 38.00 |
| Image plane | ∞ | | | | |

Various data
Zoom ratio 18.29

| | Wide angle | Intermediate | Telephoto |
|---|---|---|---|
| Focal length | 9.00 | 18.23 | 164.58 |
| F number | 1.86 | 1.86 | 2.69 |
| Field angle | 31.43 | 16.79 | 1.91 |
| Image height | 5.50 | 5.50 | 5.50 |

-continued (Numerical Embodiment 14)

| Total lens length | 255.11 | 255.11 | 255.11 |
|---|---|---|---|
| BF | 7.00 | 7.00 | 7.00 |
| d7 | 1.01 | 20.49 | 51.06 |
| d14 | 58.93 | 26.54 | 14.72 |
| d17 | 5.97 | 10.75 | 2.31 |
| d21 | 3.99 | 12.12 | 1.81 |
| Entrance pupil position | 37.03 | 91.74 | 826.41 |
| Exit pupil position | 427.60 | 427.60 | 427.60 |
| Front principal point position | 46.23 | 110.76 | 1055.39 |
| Rear principal point position | −2.00 | −11.23 | −157.58 |

Zoom lens unit data

| Unit | First structure | Focal length | Lens surface length | Front principal point position | Rear principal point position |
|---|---|---|---|---|---|
| 1 | 1 | 75.00 | 24.38 | 8.45 | −6.92 |
| 2 | 8 | −13.88 | 14.82 | 0.93 | −9.60 |
| 3 | 15 | −46.88 | 2.86 | 0.01 | −1.49 |
| 4 | 18 | 45.54 | 7.72 | 3.18 | −2.03 |
| 5 | 22 | 54.31 | 128.42 | 61.21 | −54.28 |

TABLE 3

Correspondence values of conditional expressions in Numerical Embodiments 14

| Number | Conditional expression | Embodiment 14 |
|---|---|---|
| (1) | fz | 18.23 |
| (2) | β2z/β2w/Z | 0.09 |
| (3) | |f1/f2| | 5.41 |
| (4) | |f1/f3| | 1.6 |
| (5) | |f1/f4| | 1.65 |
| (6) | fw/φ | 0.82 |
| (7) | Z | 18.29 |

Next, an image pickup apparatus using each zoom lens described above as an image pickup optical system is described.

Figure 32:
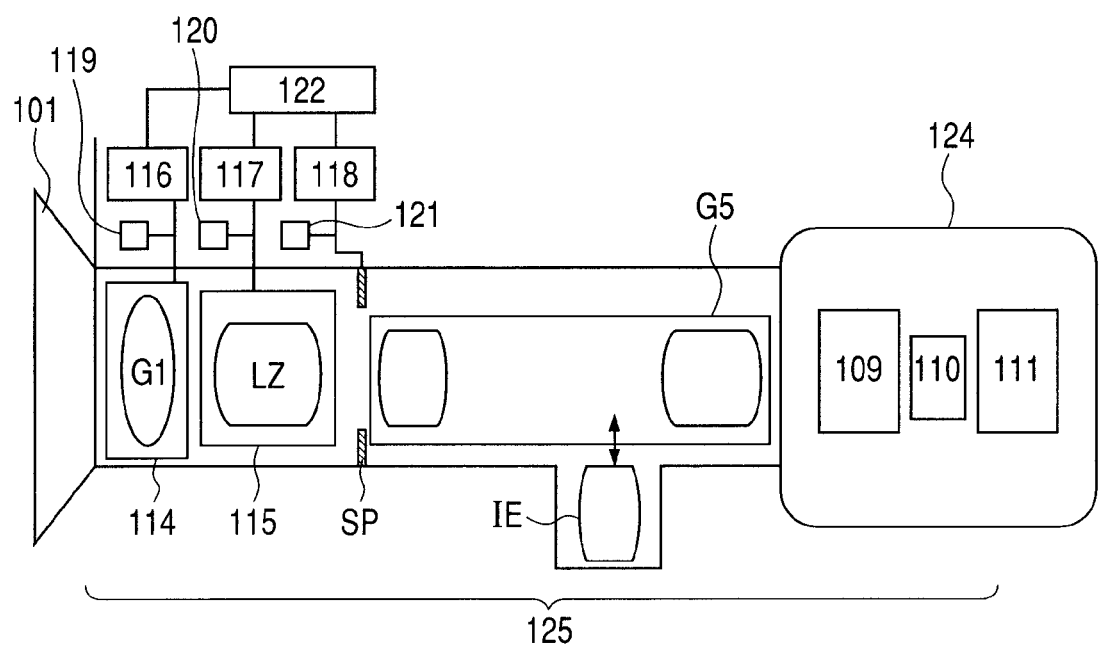
FIG. 32 is a schematic diagram of a main part of an image pickup apparatus according to an embodiment of the present invention.

FIG. 32 is a schematic diagram of a main part of the image pickup apparatus (television camera system) using the zoom lens according to each of the embodiments as the image pickup optical system. In FIG. 32, a zoom lens 101 according to any one of Embodiments 1 to 14 is provided.

A camera 124 is provided. The zoom lens 101 is detachably attached to the camera 124. An image pickup apparatus 125 has a structure in which the zoom lens 101 is attached to the camera 124. The zoom lens 101 includes a first lens unit G1, a zooming section LZ, and a fifth lens unit G5 for imaging. The first lens unit G1 includes a focusing lens unit. The zooming section LZ includes a second lens unit G2 and a third lens unit G3 which move on the optical axis for zooming, and a fourth lens unit G4 which moves on the optical axis so as to compensate for image plane variation due to zooming. The zoom lens 101 includes the aperture stop SP. The fifth lens unit G5 includes a lens unit (zooming optical system) IE which may be inserted into or removed from the optical path. The lens unit IE is provided to shift in the focal length range of the entire system of the zoom lens 101.

Drive mechanisms 114 and 115 such as helicoids or cams drive the first lens unit G1 and the zooming section LZ, respectively, in the optical axis direction. Motors (drive units) 116 to 118 are provided to electrically drive the drive mechanisms 114 and 115 and the aperture stop SP. Detectors 119 to 121 such as encoders, potentiometers, or photosensors detect positions of the first lens unit G1 and the zooming section LZ on the optical axis and a stop diameter of the aperture stop SP. The camera 124 includes a glass block 109 corresponding to an optical filter or a color separation prism in the camera 124, and a solid-state image pickup element (photoelectric transducer) 110 such as a CCD sensor or a CMOS sensor, for receiving a subject image formed by the zoom lens 101. CPUs 111 and 122 perform various drive controls of the camera 124 and the main body of the zoom lens 101, respectively. When the zoom lens according to the present invention is applied to the television camera system as described above, the image pickup apparatus having high optical performance is realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-240325, filed Oct. 19, 2009, which is hereby incorporated by reference herein in its entirety.

What is claimed is:

1. A zoom lens comprising, in order from an object side to an image side:
    a first lens unit having a positive refractive power which does not move for zooming;
    a second lens unit having a negative refractive power which moves during zooming;
    a third lens unit having a negative refractive power which moves during zooming;
    a fourth lens unit having a positive refractive power which moves during zooming; and
    a fifth lens unit having a positive refractive power which does not move for zooming,
    wherein the second lens unit moves to the image side during zooming from a wide angle end to a telephoto end, while the third lens unit moves so as to take a locus convex toward the object side, and
    wherein, when fw denotes a focal length of the entire system at the wide angle end, Z denotes a zoom ratio, and fz denotes a focal length of the entire system at a zoom position where the third lens unit is in the position closest to the object side, the following conditional expression is satisfied:

$$fw \times Z^{0.07} < fz < fw \times Z^{0.5}.$$

2. A zoom lens according to claim 1, wherein, when β2w denotes an imaging magnification at the wide angle end of the second lens unit, and β2z denotes an imaging magnification of the second lens unit at the zoom position of the focal length fz, the following conditional expression is satisfied:

$$0.03 < \beta 2w/\beta 2z/Z < 0.12.$$

3. A zoom lens according to claim 1, wherein, when f1 denotes a focal length of the first lens unit, and f2 denotes a focal length of the second lens unit, the following conditional expression is satisfied:

$$4.0 < |f1/f2| < 7.0.$$

4. A zoom lens according to claim 1, wherein, when f1 denotes a focal length of the first lens unit, and f3 denotes a focal length of the third lens unit, the following conditional expression is satisfied:

$$1.1<|f1/f3|<2.0.$$

5. A zoom lens according to claim 1, wherein, when f1 denotes a focal length of the first lens unit, and f4 denotes a focal length of the fourth lens unit, the following conditional expression is satisfied:

$$0.9<|f1/f4|<4.0.$$

6. A zoom lens according to claim 1, wherein the fourth lens unit moves so as to take a locus convex toward the object side during zooming from the wide angle end to the telephoto end.

7. A zoom lens according to claim 1, wherein a part of the first lens unit is moved to the object side so as to perform a focusing operation from an infinite distance object to a short distance object.

8. A zoom lens according to claim 1, wherein a part of the fifth lens unit is moved to the object side so as to perform a focusing operation from an infinite distance object to a short distance object.

9. A zoom lens according to claim 1, wherein the fourth lens unit is moved to the object side so as to perform a focusing operation from an infinite distance object to a short distance object.

10. A zoom lens according to claim 1, wherein the fourth lens unit is moved from the object side to the image side so as to perform a focusing operation over object distances of infinity to proximity.

11. An image pickup apparatus, comprising:
a zoom lens which forms an image of a subject; and
a solid-state image pickup element which receives a light image formed by the zoom lens,
wherein the zoom lens comprises, in order from an object side to an image side:
  a first lens unit having a positive refractive power which does not move for zooming;
  a second lens unit having a negative refractive power which moves during zooming;
  a third lens unit having a negative refractive power which moves during zooming;
  a fourth lens unit having a positive refractive power which moves during zooming; and
  a fifth lens unit having a positive refractive power which does not move for zooming,
wherein the second lens unit moves to the image side for zooming from a wide angle end to a telephoto end, while the third lens unit moves so as to take a locus convex toward the object side, and
wherein, when fw denotes a focal length of the entire system at the wide angle end, Z denotes a zoom ratio, and fz denotes a focal length of the entire system at a zoom position where the third lens unit is in the position closest to the object side, the following conditional expression is satisfied:

$$fw \times Z^{0.07} < fz < fw \times Z^{0.5}.$$

12. An image pickup apparatus according to claim 11, wherein, when φ denotes a diagonal length of an image size of the solid-state image pickup element, the following conditional expressions are satisfied:

$$0.45 < fw/\phi; \text{ and}$$

$$7 < Z.$$

* * * * *